(12) United States Patent
Harashima et al.

(10) Patent No.: US 7,444,922 B2
(45) Date of Patent: Nov. 4, 2008

(54) FASTENING ASSEMBLY, FASTENER, AND FLUID PRESSURE CYLINDER UNIT

(75) Inventors: Yasuo Harashima, Tokyo (JP); Yoshiaki Nakajima, Tokyo (JP); Hiroshi Gunji, Tokyo (JP)

(73) Assignee: Koganei Corporation, Tokyo (JP)

( * ) Notice: Subject to any disclaimer, the term of this patent is extended or adjusted under 35 U.S.C. 154(b) by 270 days.

(21) Appl. No.: 10/543,457

(22) PCT Filed: Aug. 29, 2003

(86) PCT No.: PCT/JP03/11119

§ 371 (c)(1), (2), (4) Date: Jul. 27, 2005

(87) PCT Pub. No.: WO2004/067972

PCT Pub. Date: Aug. 12, 2004

(65) Prior Publication Data

US 2006/0133893 A1    Jun. 22, 2006

(30) Foreign Application Priority Data

| Jan. 28, 2003 | (JP) | ................. 2003-18983 |
|---|---|---|
| Jan. 28, 2003 | (JP) | ................. 2003-18984 |
| Jan. 28, 2003 | (JP) | ................. 2003-18985 |
| Jan. 28, 2003 | (JP) | ................. 2003-18986 |

(51) Int. Cl.
*F16B 7/00* (2006.01)
*F16B 7/04* (2006.01)
*F15B 15/00* (2006.01)

(52) U.S. Cl. ................... 92/59; 92/88; 92/128; 92/146; 91/508

(58) Field of Classification Search ................ 92/13.5, 92/59, 88, 128, 139, 146, 161, 125; 403/331; 91/508

See application file for complete search history.

(56) References Cited

U.S. PATENT DOCUMENTS 4,516,476 A * 5/1985 Beaton ........................ 92/59

(Continued)

FOREIGN PATENT DOCUMENTS

| DE | 38 29 998 A1 | 3/1990 |
| DE | 41 31 903 A1 | 4/1993 |
| DE | 0837253 A1 * | 4/1998 |

(Continued)

OTHER PUBLICATIONS

European Search Report for SN EP 03 81 5606, dated Feb. 16, 2006 and mailed Feb. 28, 2006.
European Search Report for EP 03 815 606.3.

*Primary Examiner*—Thomas E Lazo
(74) *Attorney, Agent, or Firm*—McCormick, Paulding & Huber LLP

(57) ABSTRACT

Each of two members to be fastened has a connecting surface, a communication groove opening on the connecting surface, and an engagement groove communicating with the communication groove and having an engagement surface parallel to the connecting surface. A fastening assembly has a connecting portion and two engaging pieces, each engaging piece having a fastening surface. The two members are placed with the connecting surfaces opposed, so that the engagement grooves are in communication each with the other through the communication grooves. The fastening assembly is inserted into the engagement grooves and the communication grooves, and the connecting portion is operated to draw together the two engaging pieces, causing the fastening surfaces of the engaging pieces to press upon the engagement surfaces of the engagement grooves, thereby clamping the two members together through their opposed connecting surfaces.

28 Claims, 42 Drawing Sheets

U.S. PATENT DOCUMENTS

| | | | |
|---|---|---|---|
| 4,686,889 A * | 8/1987 | Hall | 92/146 |
| 4,726,283 A * | 2/1988 | Miyamoto | 92/146 |
| 4,736,674 A * | 4/1988 | Stoll | 92/13.5 |
| 5,363,741 A * | 11/1994 | Takada et al. | 92/13.5 |
| 5,445,045 A * | 8/1995 | Nagai et al. | 92/88 |
| 5,489,006 A * | 2/1996 | Saiia et al. | 92/13.5 |
| 5,609,435 A | 3/1997 | Nomura | 403/387 |
| 5,785,359 A * | 7/1998 | Nagai et al. | 403/255 |
| 5,799,543 A * | 9/1998 | Nagai et al. | 403/362 |
| 6,145,404 A * | 11/2000 | Maffeis et al. | 92/13.5 |
| 6,899,511 B2 * | 5/2005 | Gurevich et al. | 414/749.1 |

FOREIGN PATENT DOCUMENTS

| | | | |
|---|---|---|---|
| DE | 197 57 089 C1 | | 4/1999 |
| DE | 201 15 618 U1 | | 1/2002 |
| EP | 0 837 253 A | | 4/1998 |
| JP | 44-9005 | | 4/1969 |
| JP | 50-92509 | | 8/1975 |
| JP | 52-137293 | | 4/1976 |
| JP | 52137293 U | * | 10/1977 |
| JP | 63-80303 | | 5/1988 |
| JP | 6380303 U | * | 5/1988 |
| JP | 63-170608 | | 11/1988 |
| JP | 1-146002 | | 10/1989 |
| JP | 146002 U | * | 10/1989 |
| JP | 04-131506 | | 5/1992 |
| JP | 7-27113 | | 1/1995 |
| JP | 8-128420 | | 5/1996 |
| JP | 11-117911 | | 4/1999 |
| JP | 2002-161903 | | 6/2002 |
| JP | 2002161903 A | * | 6/2002 |
| JP | 2002-295419 | | 10/2002 |
| WO | WO 95/02128 | | 1/1995 |

* cited by examiner

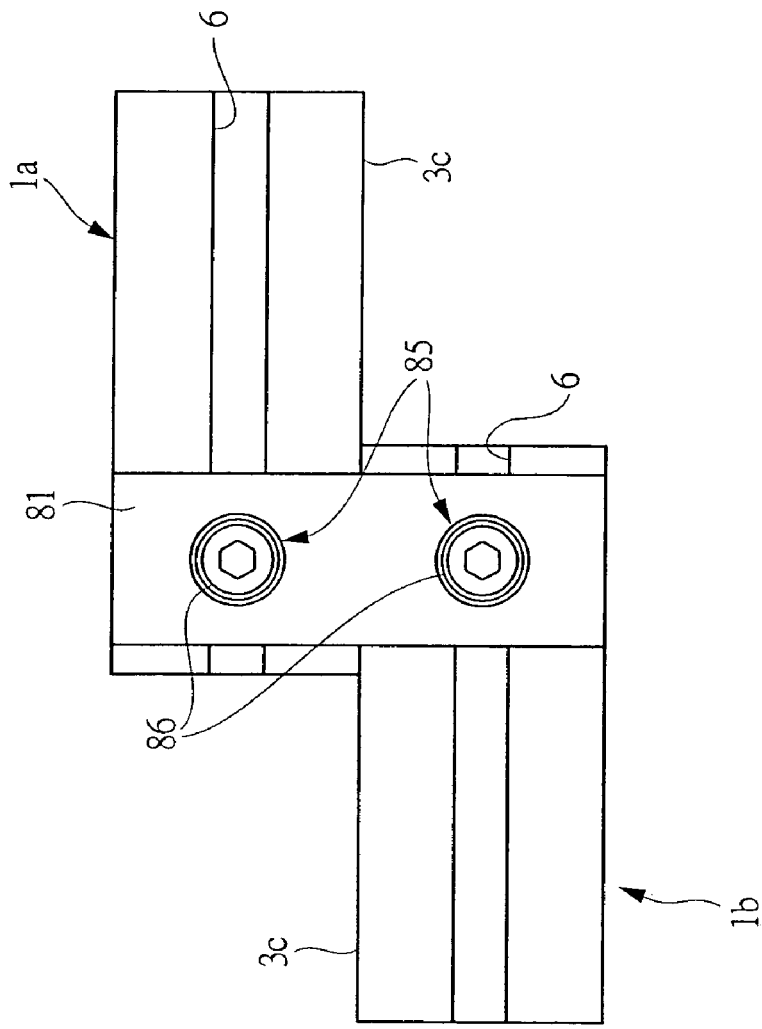
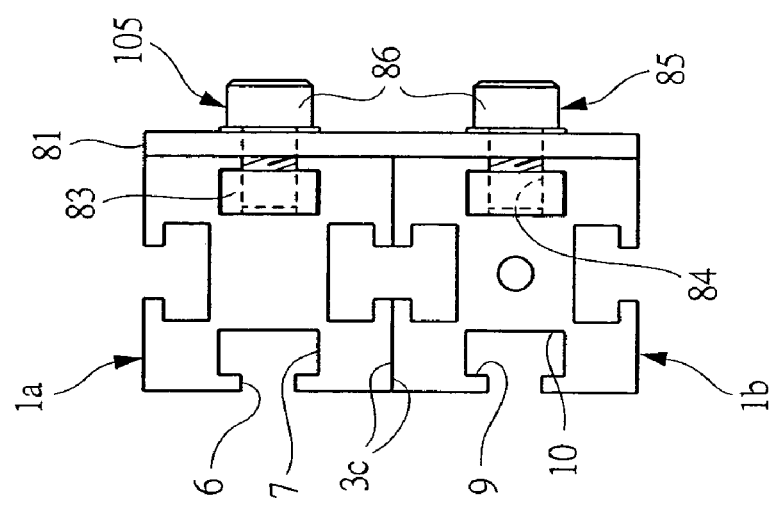

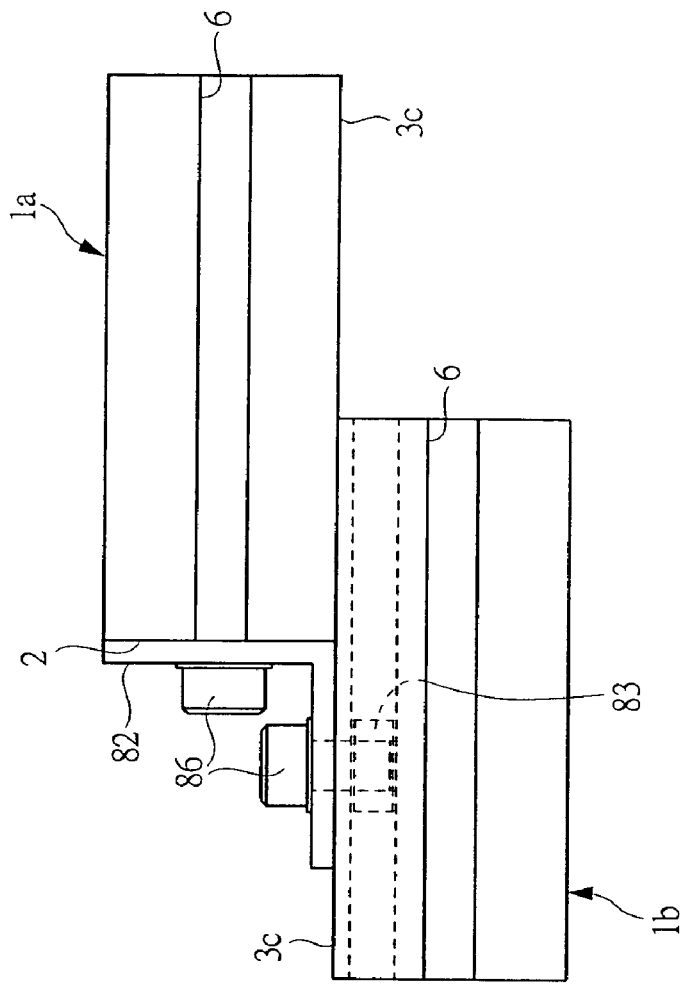
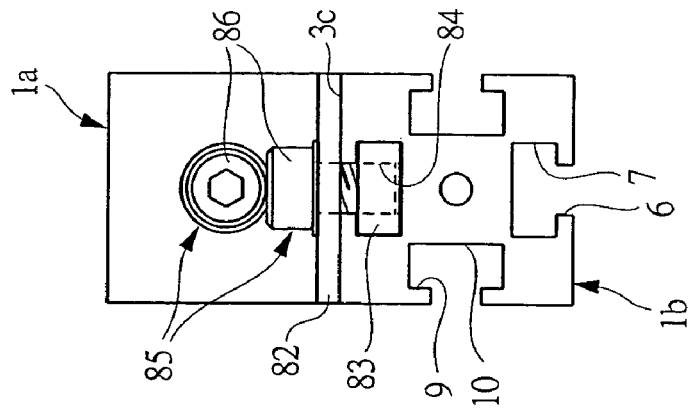

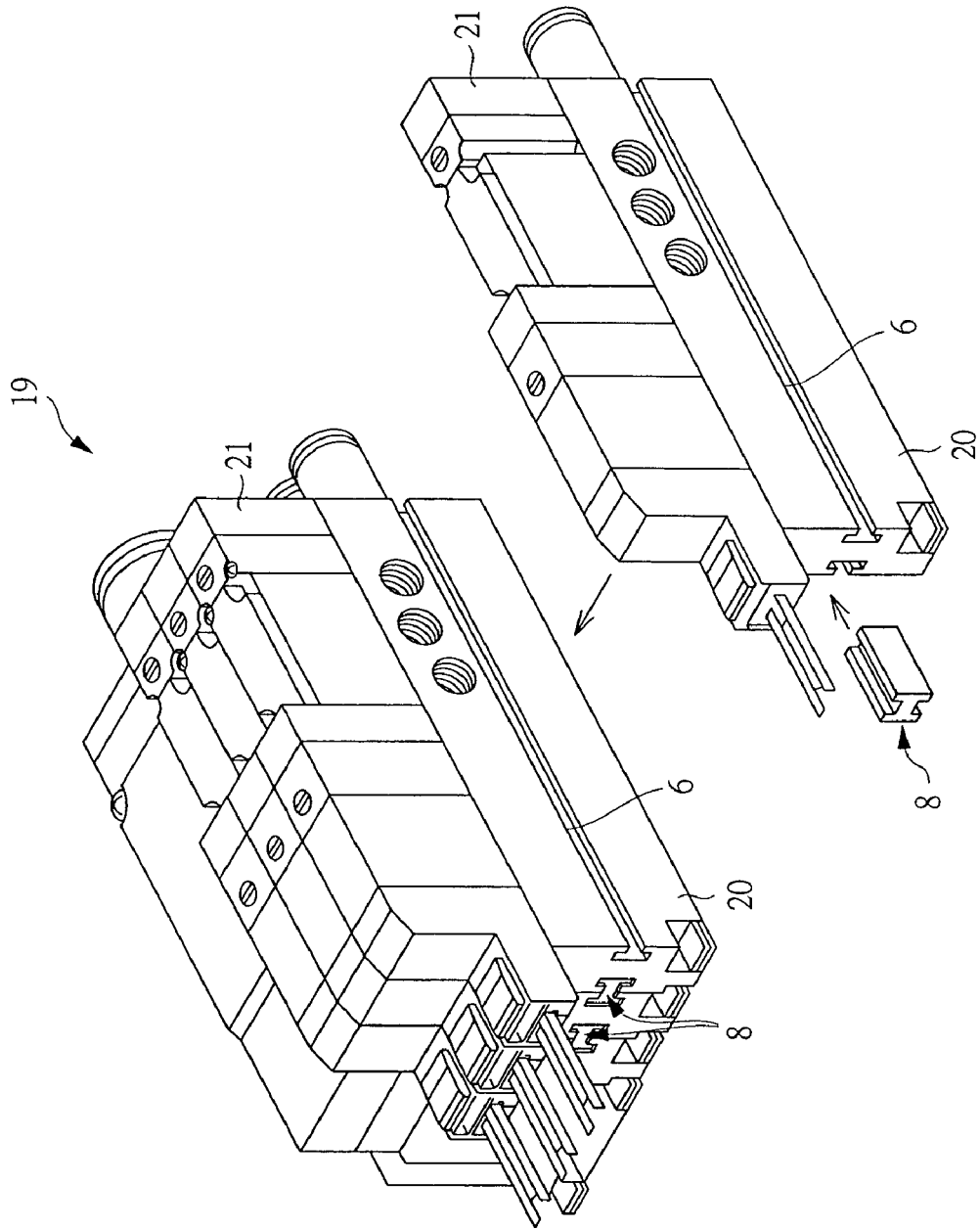

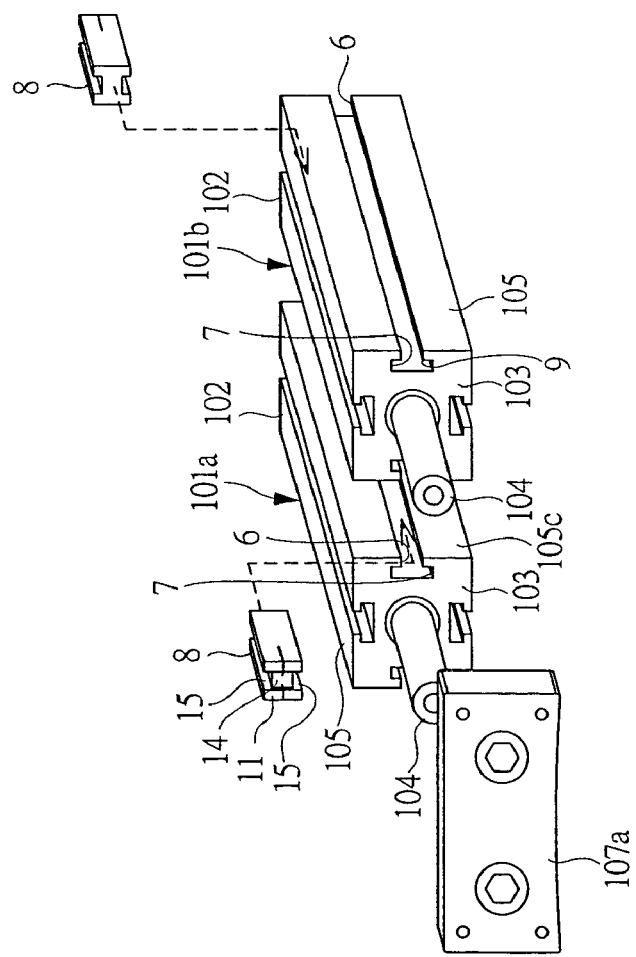
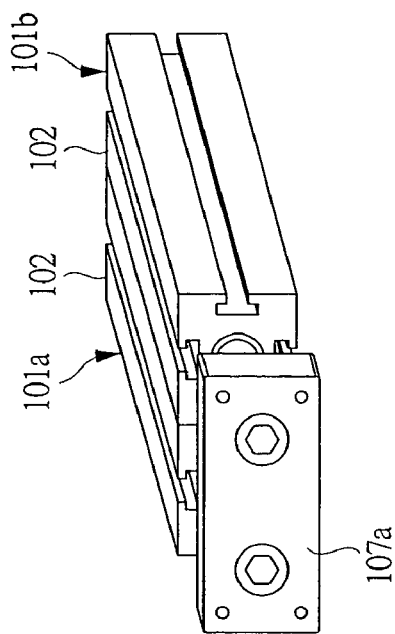
FIG. 16A
FIG. 16B

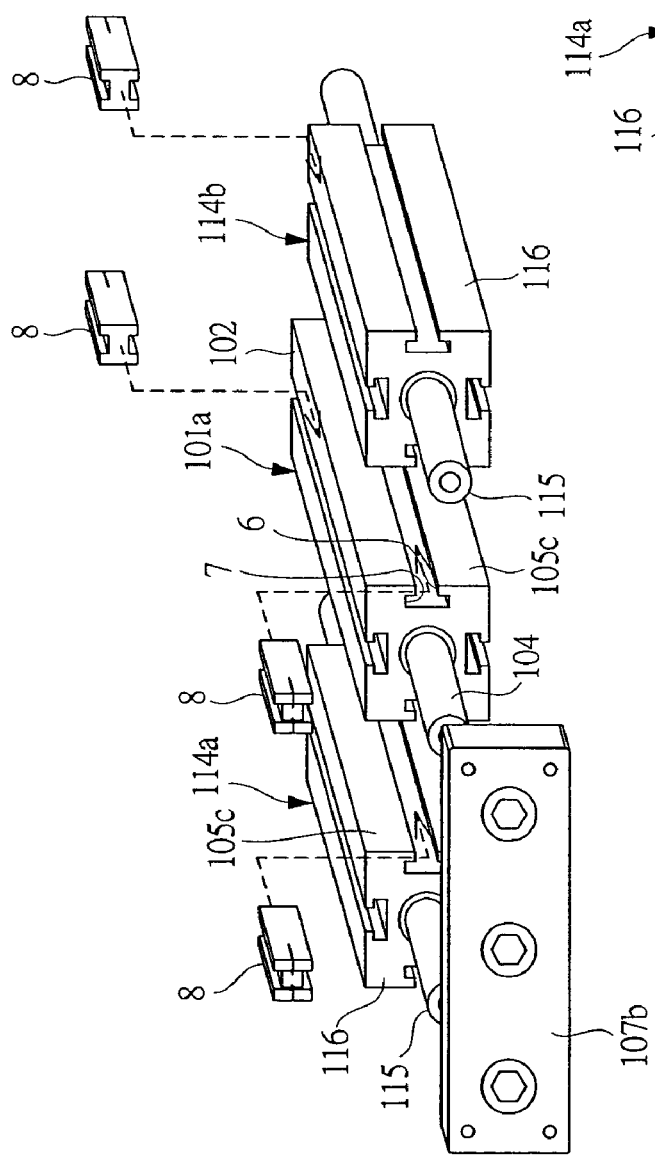
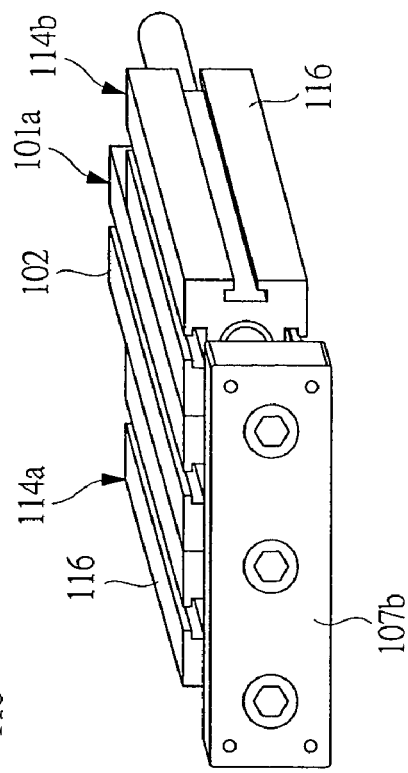
FIG. 17A
FIG. 17B

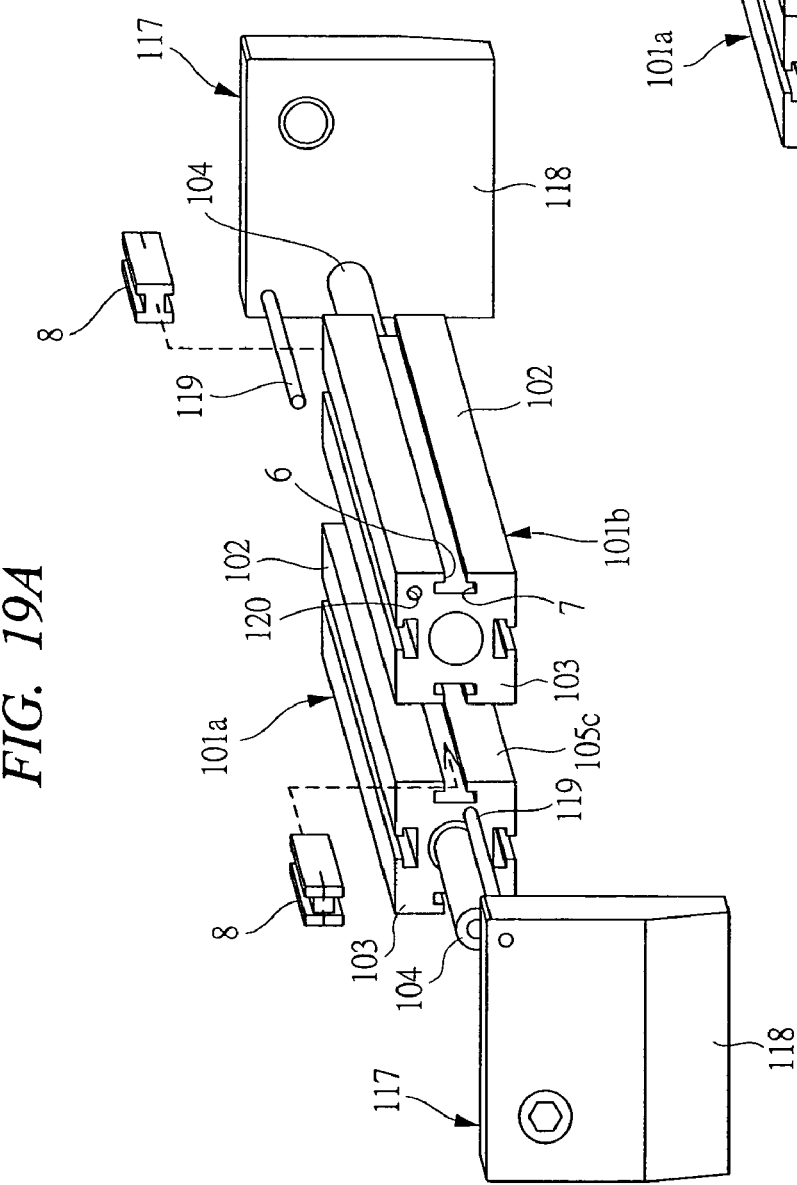
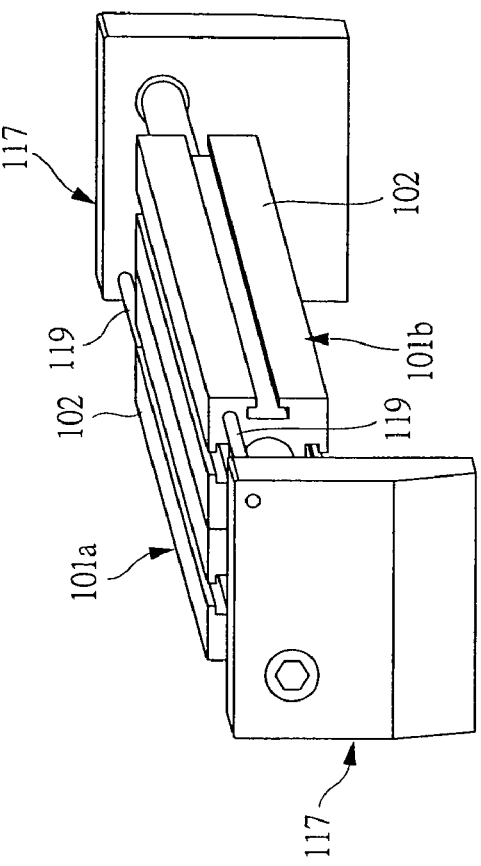
FIG. 19A
FIG. 19B

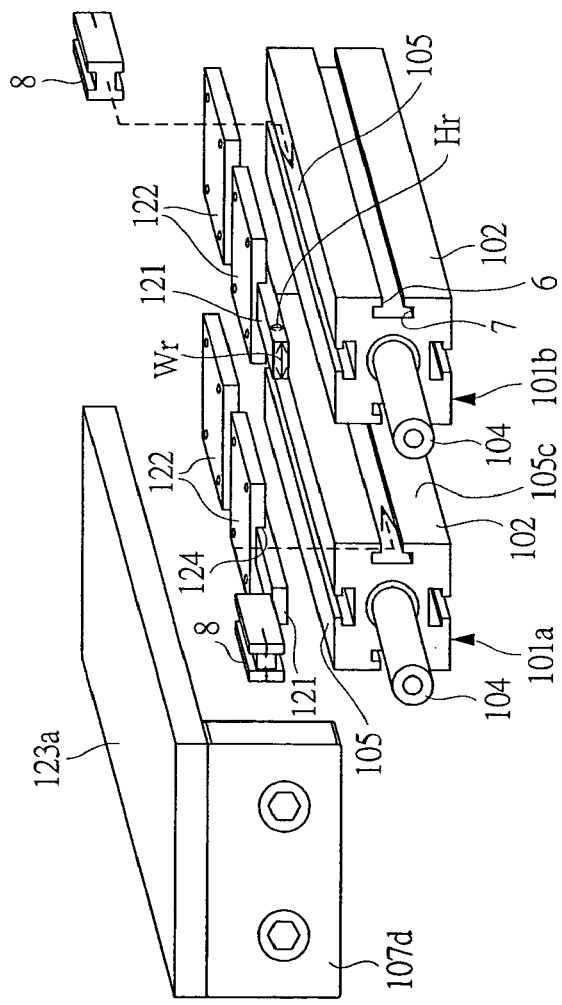
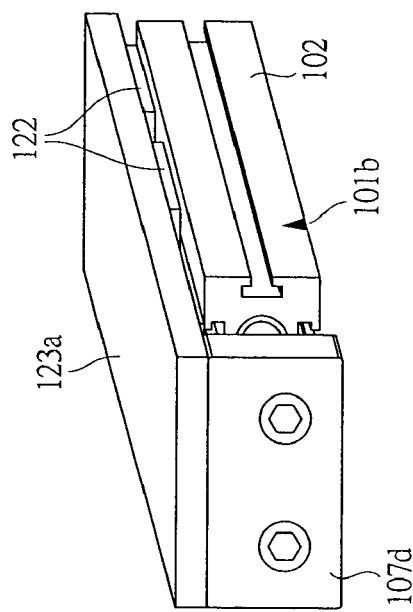
FIG. 20A
FIG. 20B

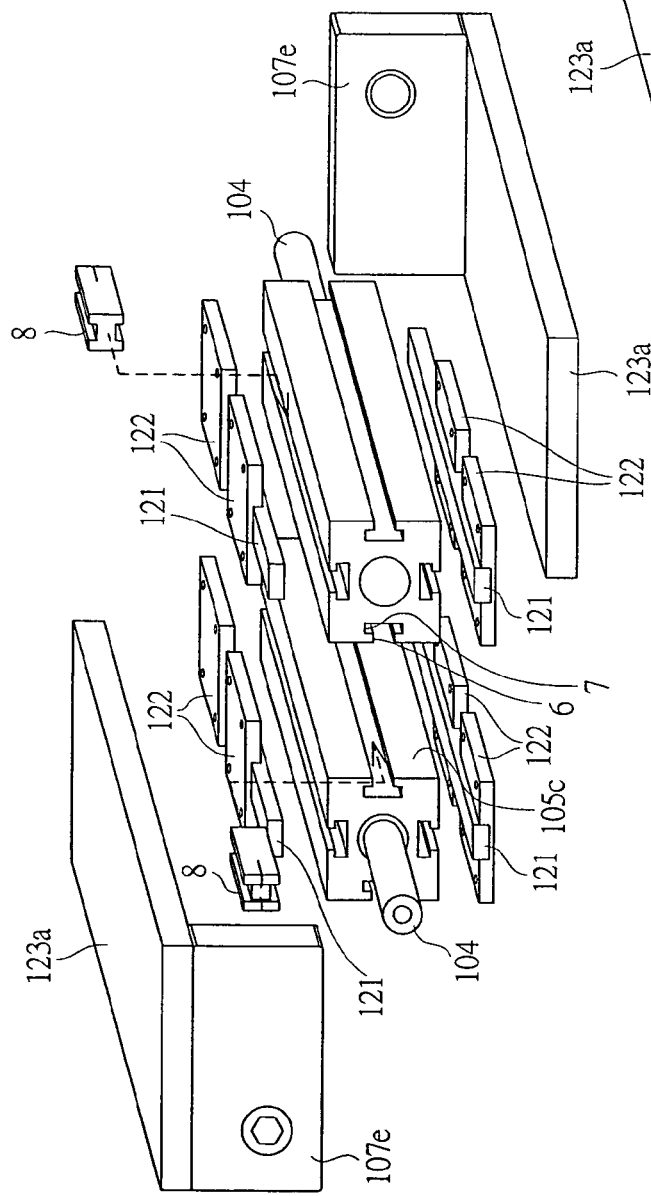
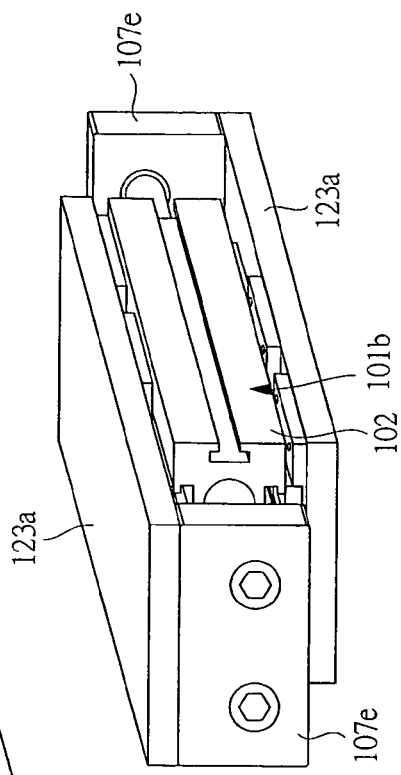
FIG. 22A
FIG. 22B

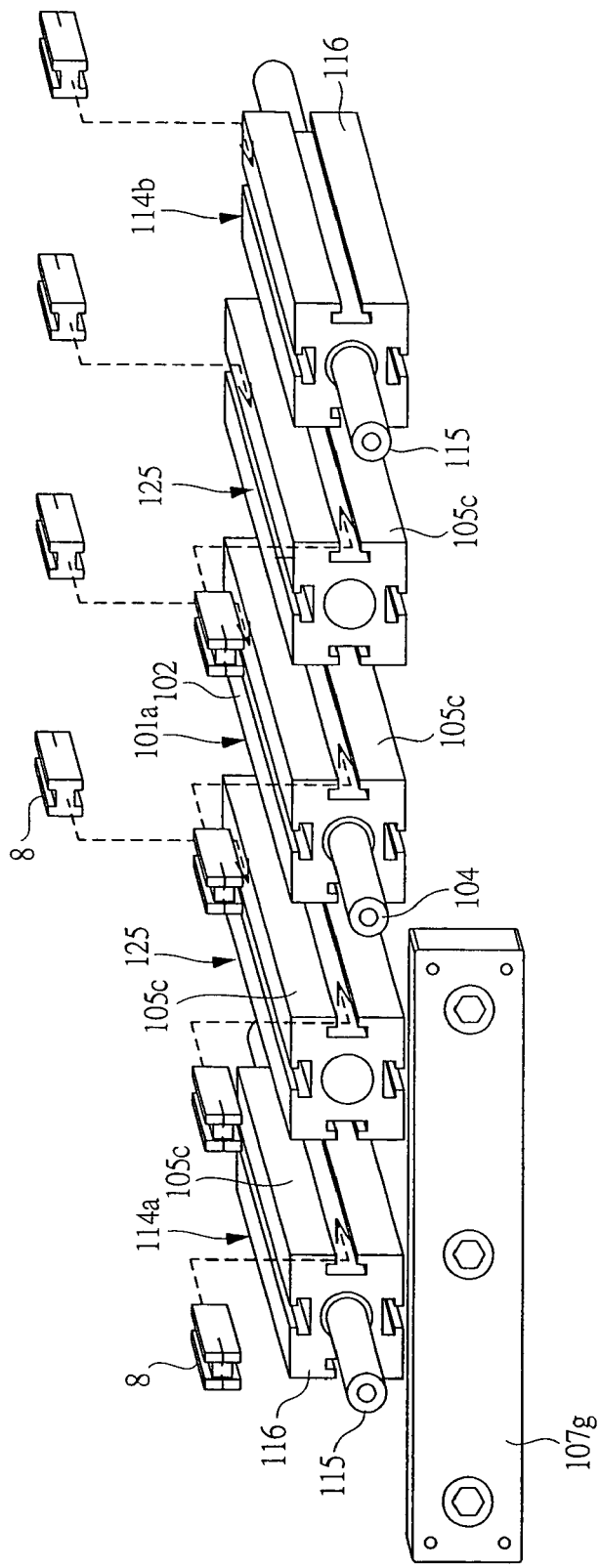
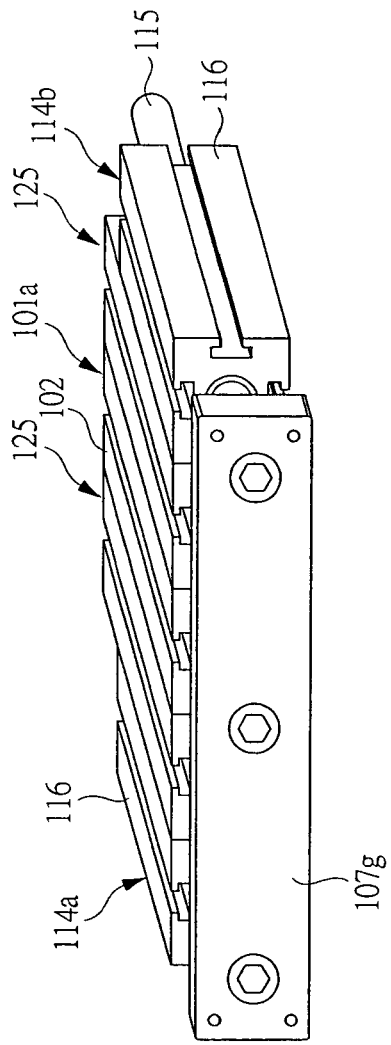
FIG. 25A
FIG. 25B

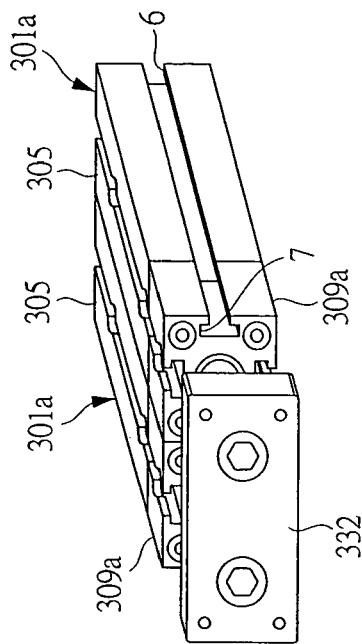
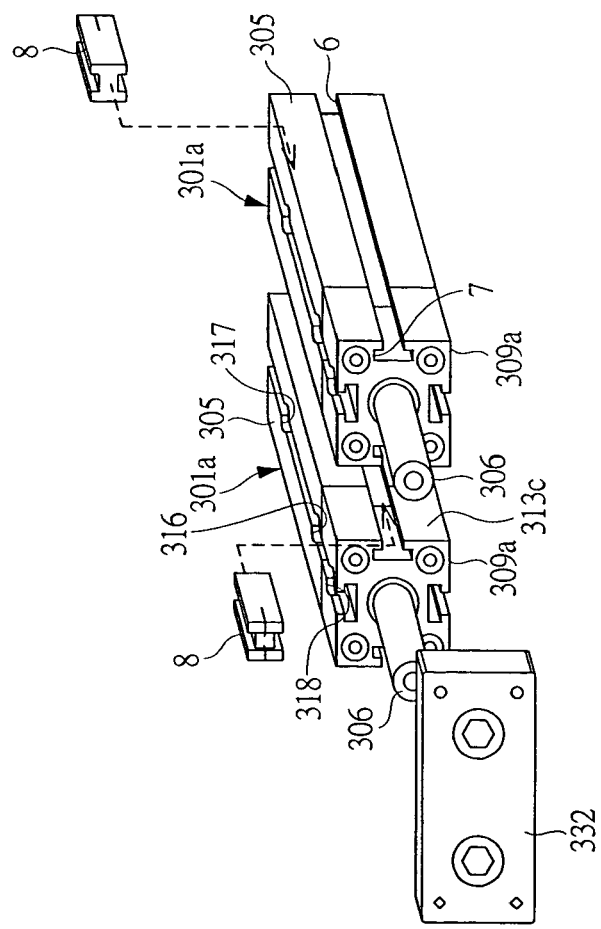
FIG. 34A
FIG. 34B

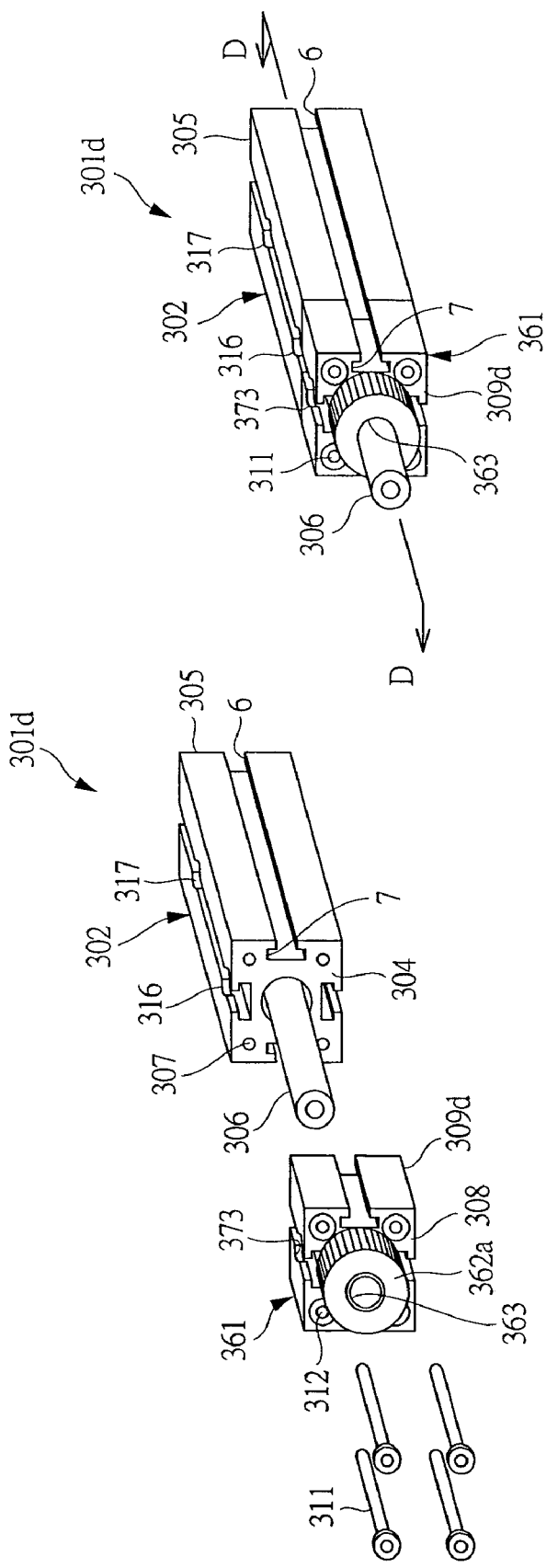

FASTENING ASSEMBLY, FASTENER, AND FLUID PRESSURE CYLINDER UNIT

CROSS REFERENCE TO RELATED APPLICATIONS

This application claims the benefit of PCT Application No. PCT/JP2003/11119, filed on Aug. 29, 2003, Japanese Patent Application No. 2003-18983, filed Jan. 28, 2003, Japanese Patent Application No. 2003-18984, filed Jan. 28, 2003, Japanese Patent Application No. 2003-18985, filed Jan. 28, 2003, and Japanese Patent Application No. 2003-18986, filed Jan. 28, 2003, the disclosures of which are herein incorporated by reference.

TECHNICAL FIELD

The present invention relates to a fastening assembly and a fastener for fastening two members to each other, and to a fluid pressure cylinder unit fastened and assembled with an attachment by the fastener assembly and the fastener.

BACKGROUND OF THE INVENTION

Conventionally, a fastening means for attachably and detachably coupling a plurality of members or parts to one another includes mainly a fastening metal-fitting such as a bolt having a screw, or a pin or cotter utilizing a wedge action, elasticity, or friction.

Also, a fastening means other than one employing the above-described fastening metal-fitting includes, for example, as described in Japanese Patent Laid-Open Publication No. 8-128420, a structure in which: a T-slot is formed in each of connection surfaces of two members to be fastened; a linking member, in which a pair of protrusions and a pair of elastic protrusions are symmetrically formed on a center wall regarded as a center, is used; the protrusion and the elastic protrusion on each side are inserted into the respective T-slots in a direction almost orthogonal to a connection surface and are engaged inside; and the two members are engaged inside and fastened.

One utilization example of the fastening assembly assembled by the above-described fastening means includes a fluid pressure cylinder unit constituting a cylinder tube fastened to an attachment. This fluid pressure cylinder unit can increase a driving force or stroke as an actuator by fastening and assembling a plurality of fluid pressure cylinders to one another, or improve rigidity and actuation accuracy of the entirety by fastening an attachment, such as a guide unit provided with a guide rod for supporting a piston rod, to a fluid pressure cylinder.

In many cases, the cylinder tube serving as a body of the fluid pressure cylinder and an attachment body are members having comparatively large weight and are mutually subjected to reaction forces of the rod during actuation. Therefore, the cylinder tube and the attachment in the fluid pressure cylinder must be certainly fastened, so that such a fastening means includes utilizing a structure in which interior engagement is carried out mutually via the above-described fastening metal-fitting such as a bolt or the above-described linking member.

However, in a fastening structure using the fastening metal-fitting such as a bolt, a large-volume bracket must be interposed on a surface of a constituent member to be fastened. Or, in the case of using the bolt, its head protrudes from a member surface. These are large factors for hindering a space from being saved since the space for installing each member is limited depending on recent device downsizing.

Meanwhile, in a fastening structure in which the interior engagement is carried out via the linking member, since there is nothing protruding from a surface of the member such as the head of the bolt even in a fastened state, this structure is suitable for saving the installation space. Further, mutual relative arrangements or fastening locations of two members can be arbitrarily set and changed since providing a screw hole or pin hole is not required. However, even if each of the protrusion and the elastic protrusion on each side is inserted into the T-shaped groove in a direction almost orthogonal to their connection surface, they can be easily separated by being detached in an opposite direction and therefore it is difficult to fasten them firmly.

An object of the present invention is to provide a fastening assembly and a fastener which are suitable for saving the installation space, capable of arbitrarily and easily setting the mutual relative arrangements and fastening positions of the respective members, and capable of firmly fastening them.

Another object of the present invention is to provide a fluid pressure cylinder unit having various structures in each of which there is nothing protruding from the surfaces while cylinder tubes are firmly fastened to each other.

Another object of the present invention is to provide a fluid pressure cylinder unit in which an arbitrary fluid pressure cylinder is combined with an arbitrary attachment so as to be fastened easily and firmly.

SUMMARY OF THE INVENTION

A fastening assembly according to the present invention comprises: two members, on each of which a connection surface is formed and which a communication groove extending and opened in a longitudinal direction along each of said connection surfaces, and an engagement groove provided with an engagement surface parallel with each of said connection surfaces and communicating with said communication groove are formed; and a fastener including, in a state in which said communication grooves are opposed to each other and said two members are made to contact through each of said connection surfaces, a first engaging piece whose fastening surface is formed in the longitudinal direction and which is inserted into said engagement groove of one of said members in the longitudinal direction, a second engaging piece whose fastening surface is opposed to said fastening surface and formed in the longitudinal direction and which is inserted into said engagement groove of the other of said members in the longitudinal direction, and a connecting portion which has a width smaller than those of said engaging pieces and at whose base end each of the engaging pieces are connected, wherein when said fastener is embedded in said two members and said engagement surfaces and said fastening surfaces contact with each other, said two members are connected.

The fastening assembly according to the preset invention is such that said engagement grooves, said first engaging piece, and said second engaging piece are formed to become wider than said communication groove.

The fastening assembly according to the present invention is such that said fastener is an intermediate fastener which is installed at a longitudinal-directional middle position of said communication groove and said engagement groove.

The fastening assembly according to the present invention is such that said connecting portion is formed into a cylindrical shape with a diameter capable of being inserted into said communication groove, and a width in a state in which at least one of said first engaging piece and said second engaging piece is rotated about a central axis of said connecting portion by a predetermined angle is formed smaller than the width of said communication groove.

A fastener according to the present invention is one for fastening two members and comprises: a first engaging piece whose fastening surface is formed in a longitudinal direction; a second engaging piece whose fastening surface is opposed to said fastening surface and formed in the longitudinal direction; a connecting portion having a width smaller than those of said engaging pieces and connecting the engaging pieces at a base end; and a fastening member for elastically deforming tips of said engaging pieces in a direction in which the respective fastening surfaces approach each other.

The fastener according to present invention is such that said fastening member is a screw member, which penetrates an outer surface parallel to said fastening surfaces and a tip face of said engaging piece, so as to be screw-connected to a screw hole formed in said engaging piece.

The fastener according to the present invention further comprises a cut-in portion formed for dividing respective tips of said engaging pieces into an outer elastically deformable portion and an inner elastically deformable portion, wherein said fastening portion is a screw member to be screwed into a screw hole formed between said outer elastically deformable portion and said inner elastically deformable portion.

The fastener according to the present invention is such that said fastening member is formed by a fastening piece in which an abutting face abutting on an abutting face formed to be inclined is formed at each tip of said engaging pieces and by a screw member to be screw-connected to a screw hole formed in said fastening piece, through a through hole formed in said connecting portion.

A fastener according to the present invention is one for connecting two members and comprises: a first engaging piece integrally provided with a first connecting portion, and having a fastening surface wider than said first connecting portion and formed in a longitudinal direction and an abutting face formed so as to be inclined at a tip thereof; a second engaging piece integrally provided with a second connecting portion, and having a fastening surface wider than said second connecting portion and shifted in the longitudinal direction from and mutually opposed to said fastening surface and formed in the longitudinal direction, and a second engaging piece having an abutting face abutting on said abutting face and formed at a tip thereof; and a screw member screw-connected to a screw hole formed in one of said engaging pieces, penetrating a through hole formed in the other of said engaging piece with a diameter larger than that of said screw hole, and making said engaging pieces move along said abutting face in a direction in which the respective fastening surfaces approach each other.

In the fastening assembly and the fastener of the present invention, the communication groove and the engagement groove having the engagement surface are formed in each of the connection surfaces of the two fastened members, so that the entirety of the fastener can be inserted into their interiors in a state of being opposed to and completely communicating with each other. In this inserted state, since the fastening surfaces of the engaging pieces contact and are engaged respectively with the engagement surfaces, they are not removed from the connection surfaces of the members in the direction orthogonal thereto. Therefore, the two members cannot be separated from each other via the fastener, that is, the two members can obtain a firmly fastened state so that there is nothing protruding from the surfaces thereof. In the two members, the relative arrangements and the positions to be fastened can be arbitrarily and easily set and changed.

A fluid pressure cylinder unit according to the present invention is one for driving an object to be driven in a straight-line direction by a fluid pressure and comprises: a cylinder tube, in which a communication groove extending and opened in a longitudinal direction along a connection surface and an engagement groove provided with an engagement surface parallel to said connection surface and communicating with said communication groove are formed and a piston provided with a piston rod is accommodated axially and reciprocably; an attachment, in which a communication groove extending and opened in the longitudinal direction along a connection surface contacting with said connection surface and an engagement groove provided with an engagement surface parallel to said connection surface and communicating with said communication groove are formed; and a fastener including, in a state in which said communication grooves are opposed to each other and said cylinder tube and said attachment are made to contact by said connection surfaces, a first engaging piece whose fastening surface is formed in the longitudinal direction and which is inserted into said engagement groove of said cylinder tube in the longitudinal direction, a second engaging piece whose fastening surface is opposed to said fastening surface and formed in the longitudinal direction and which is inserted into said engagement groove of said attachment in the longitudinal direction, and a connecting portion having a width smaller than those of said engaging pieces and connecting each of said engaging pieces at a base end thereof, wherein when said fastener is embedded in said cylinder tube and said attachment and said engagement surfaces and said fastening surfaces contact with one another, said cylinder tube and said attachment are connected.

The fluid pressure cylinder unit according to the present invention further comprises a fastening member for elastically deforming tips of said engaging pieces in a direction in which the respective fastening surfaces approach each other.

The fluid pressure cylinder unit according to the present invention is such that a transverse section of said cylinder tube is a quadrangle, and respective mutually adjacent outer circumferential surfaces thereof serve as connection surfaces in which said communication grooves are formed.

The fluid pressure cylinder unit according to the present invention is such that said attachment is a cylinder tube similar to said cylinder tube.

The fluid pressure cylinder unit according to the present invention is such that a piston rod of said cylinder tube and a piston rod of said attachment are connected by a connecting member.

The fluid pressure cylinder unit according to the present invention is such that said two cylinder tubes are fastened so that respective piston rods thereof are directed in reverse to each other, and a chuck member is attached to each of said piston rods.

The fluid pressure cylinder unit according to the present invention is such that a guide rail is attached to each of said cylinder tubes, and a slide table attached to a sliding body which slides along said guide rail is connected to each of said piston rods.

The fluid pressure cylinder unit according to the present invention is such that said attachment serves as a guide block for axially accommodating a guide rod reciprocably, and said guide rod and said piston rod are connected by a connecting member.

The fluid pressure cylinder unit according to the present invention is such that a plurality of said cylinder tubes and a plurality of said attachments are fastened, respectively.

In the fluid pressure cylinder unit of the present invention, since the fluid pressure cylinder and the attachment can be firmly fastened without anything protruding therefrom, the above is the structure suitable for saving the installation space. Concurrently, since the fluid pressure cylinder, guide unit, and spacer block, etc. can be easily and certainly fastened mutually, a cylinder unit of, for example, a single or double guide-attached cylinder, a lifter cylinder, an air chuck, or a double-stroke cylinder can be easily assembled. Further, in the two cylinder tubes, since the relative arrangements and the positions to be fastened can be arbitrarily and easily set and changed, the fastening can be easily obtained by combining an arbitrary fluid pressure cylinder with an arbitrary guide unit.

A fluid pressure cylinder unit according to the present invention is one employing a rodless cylinder for driving a reciprocating body in a straight-line direction by fluid pressure and comprises: a casing of the rodless cylinder in which a piston reciprocated in the straight-line direction by the fluid pressure and connected to said reciprocating body is incorporated and in which a communication groove extending and opened along a connection surface formed at an outer periphery and an engagement groove communicating with said communication groove and being wider than said communication groove are formed; an attachment in which a communication groove extending and opened along a connection surface contacting with said connection surface and an engagement groove communicating with said communication groove and being wider than said communication groove are formed; and a fastener including, in a state in which the respective communication grooves are opposed to each other and said casing and said attachment are made to contact respectively by said connection surfaces, a first engaging piece inserted into said engagement groove of said casing in a longitudinal direction, a second engaging piece inserted into said engagement groove of said attachment in the longitudinal direction, and a connecting portion for connecting those engaging pieces, the fastener being embedded in said casing and said attachment.

The fluid pressure cylinder unit according to the present invention further comprises a fastening member provided to said fastener for applying a fastening force to said casing and said attachment via said fastener.

The fluid pressure cylinder unit according to the present invention further comprises: a piston yoke protruding, through a slit formed in a reciprocation guide surface formed in said casing, outwardly from said reciprocation guide surface and connecting said piston and said reciprocating body; an inner sealing band fixed to both ends of said casing and sealing said slit from inside; and an outer sealing band fixed to the both ends of said casing and sealing said slit from outside.

The fluid pressure cylinder unit according to the present invention is such that said attachment is a guide member provided with a rail for guiding said table. Further, guide members are fastened on both sides of the casing of said rodless cylinder.

The fluid pressure cylinder unit according to the present invention is such that said attachment is a casing of a rodless cylinder of the same type as that of said casing.

In the fluid pressure cylinder unit of the present invention, since the casing of the rodless cylinder and the adjacent attachment can be firmly fastened without anything protruding therefrom, this is suitable for saving the installation space and the rigidity of the rodless cylinder can be enhanced. The attaching position of the fastener to the casing can be arbitrarily set by being moved along the engagement groove. If the attachment is a guide member, the reciprocating body can be moved with higher accuracy by guiding through the guide member the reciprocating body that is driven by the rodless cylinder.

A fluid pressure cylinder unit according to the present invention is one for driving an object to be driven in a straight-line direction by fluid pressure and comprises: a cylinder tube for accommodating a piston; a piston rod attached to said piston and protruding from an end face of said cylinder tube to outside; and a rod cover mounted attachably and detachably on the end face of said cylinder tube, wherein said rod cover is provided with a functional component exhibiting a functional effect in accordance with a use application.

The fluid pressure cylinder unit according to the present invention is such that a communication groove extending and opened in a longitudinal direction along a connection surface and an engagement groove provided with an engagement surface parallel to said connection surface and communicating with said communication groove are formed in said cylindrical tube, there are included: an attachment in which a communication groove extending and opened in the longitudinal direction along a connection surface contacting with said connection surface and an engagement groove having an engagement surface parallel to said connection surface and communicating with said communication groove are formed; and, a fastener provided with, in a state in which the respective communication grooves are opposed to each other and said cylinder tube and said attachment are made to contact respectively by said connection surfaces, a first engaging piece whose fastening surface is formed in the longitudinal direction and which is inserted into said engagement groove of said cylinder tube in the longitudinal direction, a second engaging piece whose fastening surface is opposed to said fastening surface and is formed in the longitudinal direction and which is inserted into said engagement groove of said attachment in the longitudinal direction, and a connecting portion having a width smaller than those of said engaging pieces and connecting the respective engaging pieces at a base end thereof, and when said fastener is embedded in said cylinder tube and said attachment and said engagement surfaces and said fastening surfaces are made to contact with one another, said cylinder tube and said attachment are connected.

The fluid pressure cylinder unit according to the present invention is such that said functional component is a discharge passage, which is connected to a discharge port formed in said rod cover and discharges, to the outside, a dust generated by linear reciprocation of said piston in said fluid pressure cylinder unit.

The fluid pressure cylinder unit according to the present invention is such that said functional component is an oil-impregnated bearing incorporated in said rod cover and contacting with an outer circumferential surface of said piston rod.

The fluid pressure cylinder unit according to the present invention is such that said functional component is a linear ball bearing incorporated in said rod cover, contacting with a outer circumferential surface of said piston rod, and having a ball for guiding axial-directional movement of said piston rod.

The fluid pressure cylinder unit according to the present invention is such that said functional component is an assembly for stroke adjustment, which has a stopper incorporated in said rod cover and restricting a stroke end position of said piston by contacting with said piston and a position adjustment member attached to said rod cover and adjusting a position of said stopper.

The fluid pressure cylinder unit according to the present invention is such that any of a rod cover for discharging dusts provided with said discharging passage, a rod cover for oil-impregnated bearing provided with said oil-impregnated bearing, a linear-ball-bearing rod cover provided with said linear ball bearing, and a rod cover for stroke adjustment provided with said assembly for stroke adjustment can be attached to the end face of said cylinder tube.

In the fluid pressure cylinder unit of the present invention, the fluid pressure cylinder employed therein can selectively attach, in accordance with the use application, a rod cover provided with the functional component such as a dust discharge passage, an oil-impregnated bearing, a ball bearing, or an assembly for stroke adjustment to the basic cylinder provided in common as a main body driving unit. Therefore, the structure capable of being applied to various uses and exhibiting high versatility can be attained.

BRIEF DESCRIPTION OF THE DRAWINGS

FIG. 1 shows two blocks fastened as a fastening assembly according to a first embodiment of the present invention, wherein

FIG. 3 shows a structure in which mutual parallel-disposed side faces of two contacting blocks are fastened via an I-shaped metal-fitting by bolts, wherein FIG. 3A is a front view thereof and FIG. 3B is a side view thereof.

FIG. 4 shows a structure in which a connection surface and an end face of two contacting blocks are joined via an L-shaped metal-fitting by bolts, wherein FIG. 4A is a front view thereof and FIG. 4B is a side view thereof.

FIG. 5 shows an inclined fastening metal-fitting serving as a fastener employed in a fastening assembly according to a second embodiment, wherein

FIG. 6 shows an inclined fastening metal-fitting and a positioning plate used for it, wherein

FIG. 7 shows an enlarging divided metal-fitting which is a fastener used in a fastening assembly according to a third embodiment, wherein

FIG. 8 shows a modification example of the enlarging divided metal-fitting shown in FIG. 7, wherein

FIG. 9 shows a wedge dividing metal-fitting which is a fastener used in a fastening assembly according to a fourth embodiment, wherein

FIG. 10 shows an inclined dividing metal-fitting which is a fastener used in a fastening assembly according to a fifth embodiment, wherein

FIG. 11 shows an H-shaped metal-fitting which is a fastener used in a fastening assembly according to a sixth embodiment, wherein

FIG. 12 shows a flat inclination H-shaped metal-fitting which is a first modification example of an intermediate fastener, wherein

FIG. 13 shows a flat round H-shaped metal-fitting which is a second modification example of the intermediate fastener, wherein

FIG. 14 is a perspective view showing a stacking valve fastened to a manifold by the fastening assembly according to the first embodiment.

FIG. 16 is a perspective view of an entirety of a fluid pressure cylinder unit according to a first embodiment, wherein FIG. 16A is a perspective view showing a before-assembly state and FIG. 16B is a perspective view showing an assembled state.

FIG. 17 is a perspective view of an entirety of a pneumatic cylinder unit according to a second embodiment, wherein FIG. 17A is a perspective view showing a before-assembly state and FIG. 17B is a perspective view showing: an assembled state.

FIG. 18 is a perspective view of an entirety of a pneumatic cylinder unit according to a third embodiment, wherein

FIG. 19 is a perspective view of an entirety of a pneumatic cylinder unit according to a fourth embodiment, wherein FIG.

19A is a perspective view showing a before-assembly state and FIG. 19B is a perspective view showing an assembled state.

FIG. 20 is a perspective view of an entirety of a pneumatic cylinder unit according to a fifth embodiment, wherein FIG. 20A is a perspective view showing a before-assembly state and FIG. 20B is a perspective view showing an assembled state.

FIG. 22 is a perspective view of an entirety of a pneumatic cylinder unit according to a sixth embodiment, wherein FIG. 22A is a perspective view showing a before-assembly state and FIG. 22B is a perspective view showing an assembled state.

FIG. 23 is a perspective view of an entirety of a pneumatic cylinder unit according to a seventh embodiment, wherein

FIG. 25 is a perspective view of an entirety of a pneumatic cylinder unit according to an eighth embodiment, wherein FIG. 25A is a perspective view showing a before-assembly state and FIG. 25B is a perspective view showing an assembled state.

FIG. 26 is a perspective view of an entirety of a pneumatic cylinder unit according to a ninth embodiment, wherein

FIG. 32 is a perspective view of an entirety of a pneumatic cylinder used in a pneumatic cylinder unit according to an eleventh embodiment, wherein

FIG. 34 is a perspective view of an entirety of the pneumatic cylinder unit according to the eleventh embodiment, wherein FIG. 34A is a perspective view showing an exploded state before assembling and FIG. 34B is a perspective view showing an assembled state.

FIG. 35 is a perspective view of an entirety of a pneumatic cylinder used in a pneumatic cylinder unit according to a twelfth embodiment, wherein

FIG. 37 is a perspective view of an entirety of a pneumatic cylinder used in a pneumatic cylinder unit according to a thirteenth embodiment, wherein

FIG. 39 is a perspective view of an entirety of a pneumatic cylinder used in a pneumatic cylinder unit according to a fourteenth embodiment, wherein FIG. 39A is a perspective view showing an exploded state before assembling and FIG. 39B is a perspective view showing an assembled state.

FIG. 40 is an axial-directional cross-sectional view taken along line D-D of the pneumatic cylinder assembled in FIG. 39B, wherein

DESCRIPTION OF PREFERRED EMBODIMENTS

Hereinafter, embodiments of the present invention will be described in detail with reference to drawings.

Figure 1A:
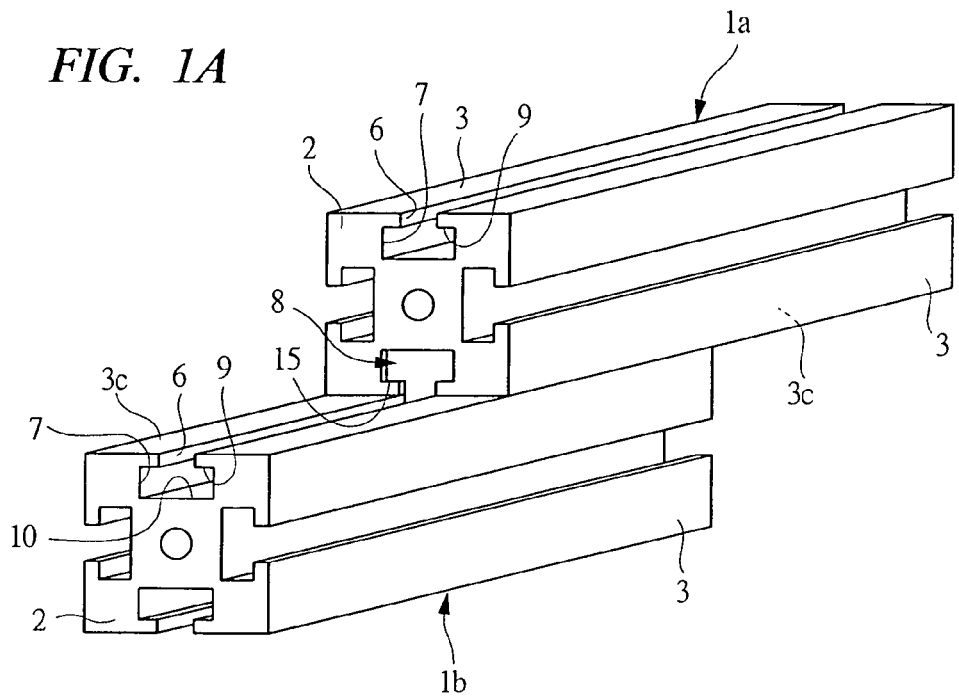
FIG. 1A is a perspective view thereof.
Figure 1B:
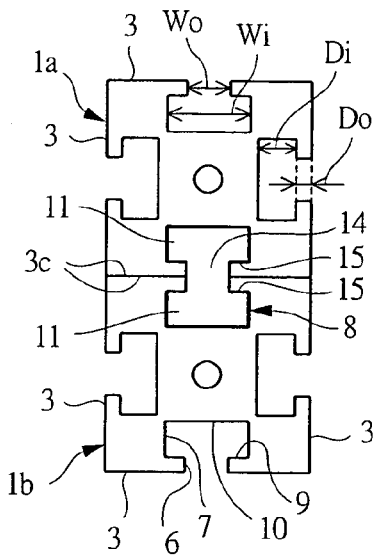
FIG. 1B is a front view thereof.
Figure 1C:
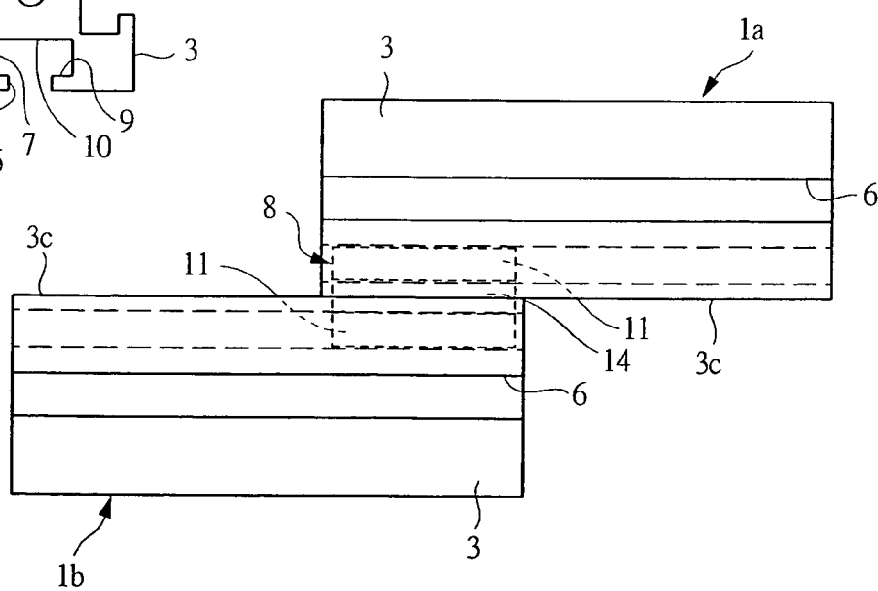
FIG. 1C is a side view thereof.

First, embodiments of a fastening assembly and a fastener will be explained. FIG. 1A is a perspective view showing two blocks fastened as a fastening assembly according to a first embodiment of the present invention, FIG. 1B is a front view of the two blocks, and FIG. 1C is a side view thereof. As shown in FIG. 1, blocks 1a and 1b which are two members to be fastened are fastened at positions shifted in a longitudinal direction and in a state of contacting with each other.

Each of the blocks 1a and 1b, whose end faces 2 are regular tetragons, is formed into a cuboid, wherein a communication groove 6 opened and extending in the longitudinal direction and an engagement groove 7 communicating with it are formed in each of four side faces 3 thereof and wherein the communication groove 6 and the engagement groove 7 in each of connection surfaces 3c, which contact with each other, are fastened via an insertion fastener 8 serving as a fastener. The insertion fastener 8 becomes in a state in which an entirety of the insertion fastener 8 is inserted into and installed in an interior in which the communication groove 6 and the engagement groove 7 formed in each connection surface 3c communicate with each other. In each of the blocks 1a and 1b shown in FIG. 1, the communication groove 6 and the engagement groove 7 are formed in each of the four side faces 3. However, the communication groove 6 and the engagement groove 7 may be formed in at least the connection surface 3c of each of the blocks 1a and 1b. Also, although the end faces 2 of the blocks 1a and 1b are regular tetragons, they may be rectangles.

As shown in the Figure, the communication groove 6 is formed so as to extend along the side face in the longitudinal direction and be opened, and the engagement groove 7 is formed in each interior of the blocks 1a and 1b so as to continue into the communication groove 6, whereby the entirety thereof is formed into a substantially T-shaped section. The communication groove 6 is formed so that its opening width is "Wo" and its opening depth from a surface is "Do". The engagement groove 7 is formed so that its inner width, which is larger than the opening width "Wo", is "Wi" and its inner depth is "Di". Therefore, side faces, which are disposed on both sides of the communication groove 6 and among inner faces of the engagement groove and arranged to be parallel to the connection surfaces 3c, constitute engagement faces 9.

Figure 2:
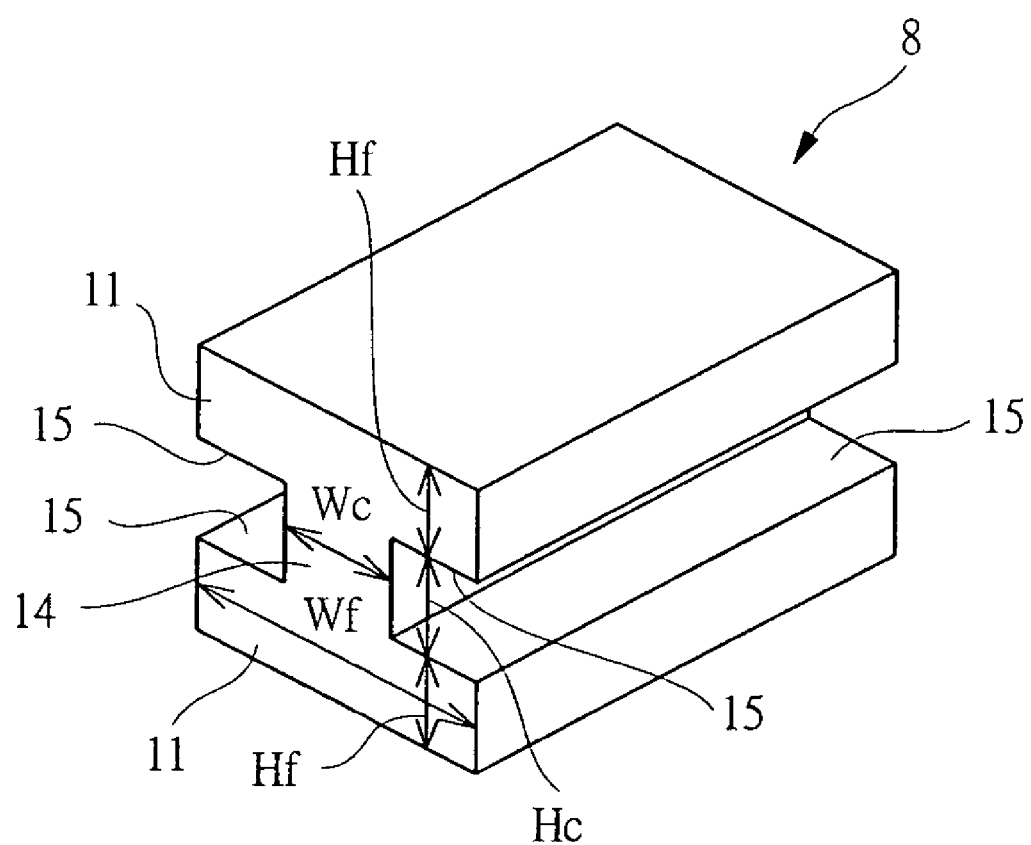
FIG. 2 is a perspective view of an entirety of an insertion fastener.

FIG. 2 is a perspective view of the entirety of the insertion fastener. Note that an upper-right direction of the Figure is a direction of being thrust into the interiors of the communication groove 6 and the engagement groove 7 in insertion direction of the insertion fastener 8 and an opposite lower-left direction is a direction of being pulled out, wherein their directions will be hereinafter referred to as a "thrust direction" and a "pull direction" for convenience of explanations, respectively.

As shown in FIG. 2, the insertion fastener 8, in which two engaging pieces 11 are disposed symmetrically in a vertical direction of the Figure and a connecting portion 14 is integrally connected between the engaging pieces 11, is a molded product made of a resin, and is an insertion fastener with the most fundamental structure. Since one of the engaging pieces 11 and the connecting portion 14 are integrally formed, a sectional shape orthogonal to the insertion direction becomes a T-shaped section (see FIG. 1B). The connecting portion 14 is formed so that its linking width "Wc" is almost equal to or smaller than the opening width "Wo" in order to pierce the communication groove 6. A linking height "Hc" (i.e., length between the two engaging pieces 11) of the connecting portion 14 is formed with a dimension approximately twice larger than the opening depth "Do" of the communication groove 6.

Side faces formed in the longitudinal direction on both sides of the connecting portion 14 among outer surfaces of the engagement pieces 11 constitute fastening surfaces 15. An engagement width "Wf" of the engaging pieces 11 is larger than the opening width "Wo" so that the fastening surfaces 15 can be contacted and engaged with the engagement faces 9 of the engagement grooves 7 and the engagement width "Wf" of the engaging pieces 11 is formed to be almost equal to or smaller than the inner width "Wi" so as to be inserted into the engagement groove 7. An engagement height "Hf" is formed with a dimension almost equal to or smaller than the inner depth "Di" for being inserted into the engagement groove 7. The entirety of the insertion fastener 8 having the above-described structure can be inserted into the interiors of one set of communication groove 6 and engagement groove 7, which are opposed to and communicate with each other as shown in FIG. 1, by being thrust in the insertion direction.

In such a inserted state, the fastening surfaces 15 of the respective engaging pieces 11 contact with the engagement surfaces 9 of the engagement grooves 7, so that the fastening surface 15 cannot be removed from the connection surfaces 3c of the blocks 1a and 1b in the direction orthogonal thereto. Therefore, the two blocks 1a and 1b cannot be separated from each other through the insertion fastener 8, i.e., the two blocks 1a and 1b are firmly fastened to each other via the insertion fastener 8. If each dimension of members constituting the insertion fastener 8 is formed with high accuracy, the two blocks 1a and 1b can be satisfactorily certainly fastened. If they are formed within dimensional tolerances of a tight fit, prevention of extraction and deviation after inserting can be achieved.

FIG. 3A is a front view of a structure, as a comparative example, in which the side faces 3 disposed to be parallel to each other on the two blocks 1a and 1b contacting under the same positional relationship as that of FIG. 1 are fastened by bolts via an I-shaped metal-fitting 81, and FIG. 3B is a side view thereof. FIG. 4A is a front view of a structure in which the connection surfaces 3c and the end faces 2 of the two blocks 1a and 1b contacting with each other are coupled by bolts via an L-shaped metal-fitting 82, and FIG. 4B is a side view thereof. A screw hole 84 is provided in an insertion engaging member 83 capable of being inserted into the engagement groove 7. When bolt screws 85 attached thereto are fastened, heads 86 of the bolt screws and the insertion engaging members 83 strongly clamp and fix the I-shaped metal-fitting 81 or L-shaped metal-fitting 82 and the communication grooves 6 therebetween.

Even in the case of either structures of FIG. 3 and FIG. 4, the thicknesses of the I-shaped metal-fitting 81 or L-shaped metal-fitting 82 and the heads 86 of the bolt screws are exposed from the surfaces of the blocks 1a and 1b, whereby if the entire assembly is installed into an interior of a device etc., an installation space corresponding to the volume of the exposed thicknesses is required. A problem is such that, particularly, when the blocks 1a and 1b constitute a part of a movable body, such exposed thicknesses contact with other members, and electrical wirings, etc.

In contrast, the two blocks 1a and 1b in a state of being fastened by the fastening assembly according to the present embodiment shown in FIG. 1 have a structure in which the insertion fastener 8 serving as a fastener is disposed in the interior thereof and there is nothing protruding from the surfaces of the blocks 1a and 1b in spite of being in the fastened state. Therefore, the fastening assembly according to the present embodiment has a fastening structure suitable for saving the installation space required depending on the recent device downsizing.

In addition, if the communication grooves 6 and the engagement grooves 7 provided in an elongated manner in the two blocks 1a and 1b are each in a state of partially being opposed to and communicating with each other, the insertion fastener 8 can be inserted into and fastened in such a communicating portion. Therefore, even when the relative arrangements of the two blocks 1a and 1b are arbitrarily changed in a direction of forming the communication grooves 6, the insertion fastener 8 can be inserted therein and fastened thereto. Further, only one insertion fastener 8 is inserted in FIG. 1. However, if a range in which the communication grooves 6 are mutually communicated is sufficiently larger, the insertion fastener 8 can be inserted not only into openings formed at two positions of both ends of the communicating range but also into arbitrary positions within the communicating range. Therefore, fastening locations can be also set at arbitrary positions. The insertion fastener 8 shown in FIG. 2 is made of a resin, and may be made of metal.

Figure 5A:
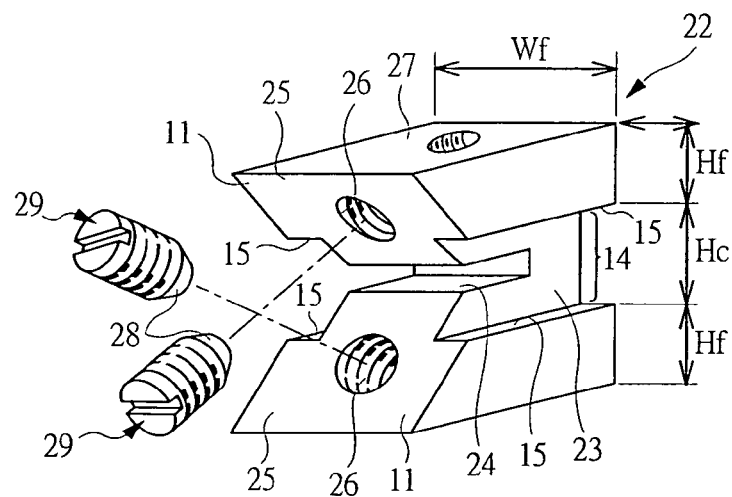
FIG. 5A is a perspective view of an entirety thereof.
Figure 5B:
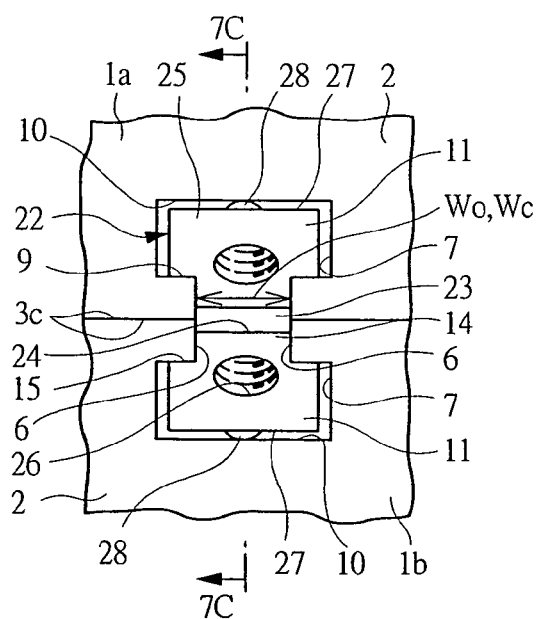
FIG. 5B is a front view of a state in which the inclined fastening metal-fitting is inserted into one set of communication groove and engagement groove which are opposed to each other.
Figure 5C:
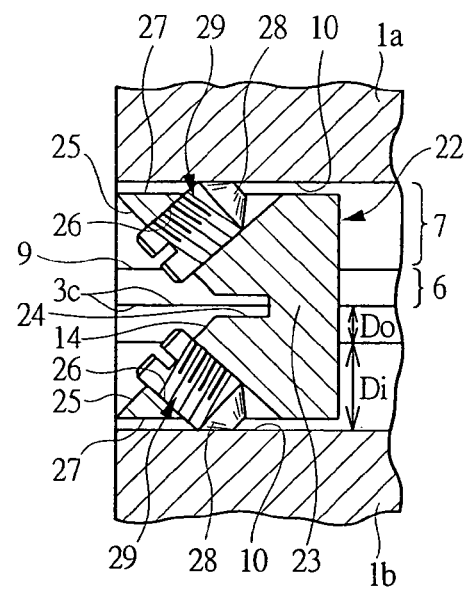
FIG. 5C is an insertion-directional cross-sectional view taken along line 5C-5C of FIG. 5B.

FIG. 5A is a perspective view of an entirety of an inclined fastening metal-fitting which is a fastener used in a fastening assembly according to a second embodiment, FIG. 5B is a front view of a state of inserting the inclined fastening metal-fitting into one set of communication groove 6 and engagement groove 7 which are opposed to each other similarly to that of the above-described first embodiment, and FIG. 5C is an insertion-directional cross-sectional view taken along line 5C-5C of FIG. 5B. In these Figures, members and shapes used in common with the fastening assembly shown in FIG. 1 are denoted by the same reference numerals.

As shown in FIG. 5, the inclined fastening metal-fitting 22 has a spring-steel molded product in which two engaging pieces 11 are disposed symmetrically in the vertical direction of the Figures and a connecting portion 14 is integrally coupled between the engaging pieces 11. At a central position of the connecting portion 14 in the vertical direction of the Figures, a coupling portion 23 on a thrust-directional side thereof is left and a pull-directional side thereof is divided by a linking division groove 24. Since one of the engaging pieces 11 is integrally connected to a base end of the connecting portion 14, a sectional shape orthogonal to the insertion direction becomes a "T" shape (see FIG. 5B). The connecting portion 14 is formed to have the linking width "Wc" almost equal to the opening width "Wo" for being capable of piecing the communication groove 6, and the linking height "Hc" of the connecting portion 14 (i.e., length between the two engaging pieces 11) is formed with a dimension approximately twice larger than the opening depth "Do" of the communication groove 6.

The side faces formed in the longitudinal direction at the positions on both sides of the connecting portion 14, among the outer surfaces of the engaging pieces 11, constitute fastening surfaces 15. The engagement width "Wf" of the engaging piece 11 is formed to be larger than the opening width "Wo" so that the fastening surfaces 15 can be contacted and engaged with the engagement surfaces 9 of the engagement grooves 7. The engagement width "Wf" of the engaging piece 11 is formed to be almost equal to or smaller than the inner width "Wi" to be inserted into the engagement groove 7. The engagement height "Hf" is formed by such a dimension as to be almost equal to or smaller than the inner depth "Di" to be inserted into the engagement groove 7. The entirety of the inclined fastening metal-fitting 22 having the above-described structure can be inserted into the interiors of one set of communication groove 6 and engagement groove 7, which are opposed to and communicate with each other as shown in FIG. 5, by being thrust in the insertion direction.

In this inserted state, the respective fastening surfaces 15 of the engaging pieces 11 contact with the engagement surfaces 9 of the engagement grooves 7, so that the respective fastening surfaces 15 cannot be removed from the connection surfaces 3c of the blocks 1a and 1b in the direction orthogonal thereto. Therefore, the two blocks 1a and 1b cannot be separated from each other via the inclined fastening metal-fitting 22 therebetween, i.e., the two blocks 1a and 1b can be fastened via the inclined fastening metal-fitting 22.

As shown in the Figures, the end faces (tip faces) on a pull-directional side of the engaging pieces 11 form inclined surfaces 25 opposed to each other and forming an acute angle with respect to each of connection surfaces 3c of the blocks 1a and 1b, and the end faces on the thrust-directional side of the entire inclined fastening metal-fitting 22 are formed on the same plane. A screw hole 26 is formed in each engaging piece 11 in a direction substantially orthogonal to the inclined surface 25, and the screw hole 26 pierces up to an outer surface 27 parallel to the fastening surface 15. A setscrew 29 (screw member) whose tip 28 is taped as a fastening member is attached to each screw hole 26.

As shown in FIGS. 5B and 5C, when the setscrews 29 are screwed forward in a state in which the engaging pieces 11 are inserted in the engagement grooves 7, the tips 28 of the setscrews protrude from the outer surfaces 27 of the engaging pieces, thereby abutting on the bottom faces 10 of the engagement grooves. Accordingly, the inclined fastening metal-fitting 22 can be prevented from being pulled out from the engagement groove 7, thereby being certainly installed.

Then, when the setscrews 29 are further screwed forward, the fastening surfaces 15 of the engaging pieces 11 are strongly pressed in a direction of approaching each other due to a reaction force to an abutment force between the tips 28 of the setscrews and the bottom faces 10 of the engagement grooves. The two communication grooves 6 under the opposite states are strongly clamped via the engagement surfaces 9. Therefore, the inclined fastening metal-fitting 22 serving as a fastener applies a fastening force to the two blocks 1a and 1b, thereby becoming capable of further firmly fastening them.

In addition, when the engaging pieces 11 are pressed against the communication grooves 6 due to a reaction force to a force abutting on the bottom faces 10 of the engagement grooves obtained by making the tips 28 of the setscrews protrude, the coupling portion 23 serves as a bending location and the entirety of the inclined fastening metal-fitting 22 can be readily elastically deformed in a direction in which the fastening surfaces 15 approach each other. Therefore, the engaging pieces 11 can be readily pressed against the communication grooves 6. Alternatively, if the fastening of the two blocks 1a and 1b is eliminated so as to separate them, the setscrews 29 are turned backward to eliminate the pressing forces of the engaging pieces 11. Thereafter, the blocks 1a and 1b are slid with respect to each other in the longitudinal direction of the communication groove 6 and the engagement groove 7, thereby being readily separated. In a fastener provided with the above-mentioned fastening member, since friction against wall faces of the engagement grooves 7 can be adjusted after insertion, a dimensional tolerance causing some degree of loose fit is permissible.

Figure 6A:
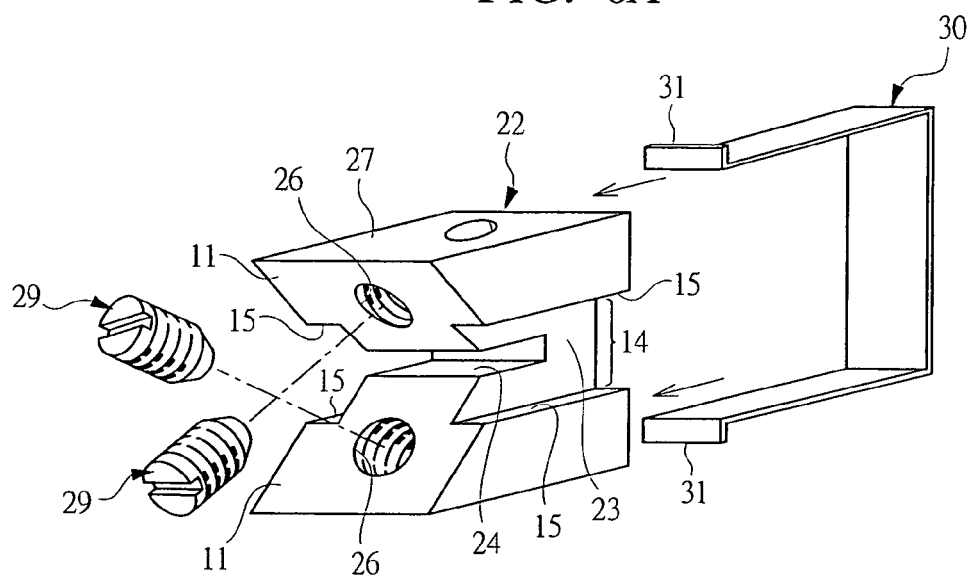
FIG. 6A is a perspective view of an entirety thereof.
Figure 6B:
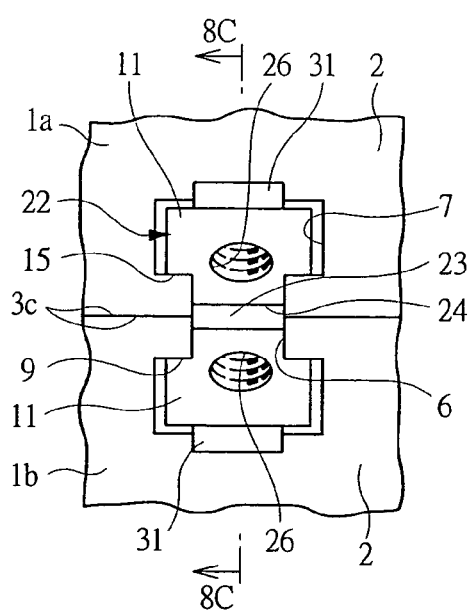
FIG. 6B is a front view of a state in which the positioning plate is fitted in the set of communication groove and engagement groove which are opposed to each other and the inclined fastening metal-fitting is inserted thereto.
Figure 6C:
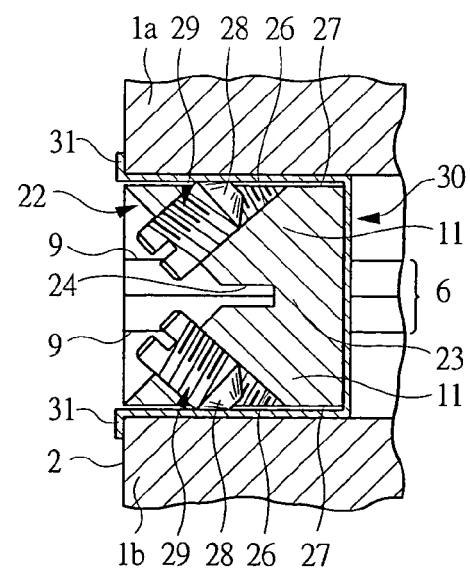
FIG. 6C is an insertion-directional cross-sectional view taken along line 6C-6C of FIG. 6B.

FIG. 6A is a perspective view of an entirety of the inclined fastening metal-fitting 22 and of a positioning plate 30 used for it in the present embodiment, FIG. 6B is a front view of a state of incorporating the positioning plate 30 into one set of communication groove 6 and engagement groove 7 which are opposed to each other and of inserting the inclined fastening metal-fitting 22 therein, and FIG. 6C is an insertion-directional cross-sectional view taken along line 6C-6C of FIG. 6B. In these Figures, members and shapes used in common with the fastening assembly shown in FIG. 5 are denoted by the same reference numerals.

As shown in FIG. 6, the positioning plate 30 is made of a plate material bent into a substantially U shape so as to surround the end face on the thrust-directional side and two outer surfaces 27 of the inclined fastening metal-fitting 22, and has such a shape that locking claws 31 contacting with the end faces of the two members to be fastened are provided at both ends thereof. First, the positioning plate 30 is attached to the inclined fastening metal-fitting 22 in a state in which the two blocks 1a and 1b contact with each other while the end faces 2 thereof are aligned. Then, by being inserted into the interiors of one set of communication groove 6 and engagement groove 7 opposed to each other, excessive insertion therein in the thrust direction can be prevented and also pull-out of the inclined fastening metal-fitting 22 can be readily carried out. The positioning plate 30 may be first inserted into the interiors of the set of communication groove 6 and engagement groove 7 which are opposed to each other, and then the inclined fastening metal-fitting 22 may be installed at the insides thereof.

Figure 7A:
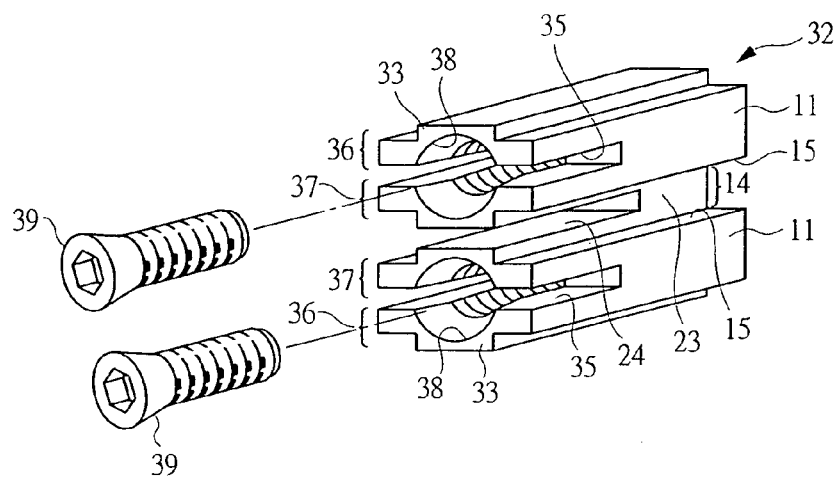
FIG. 7A is a perspective view of an entirety thereof.
Figure 7B:
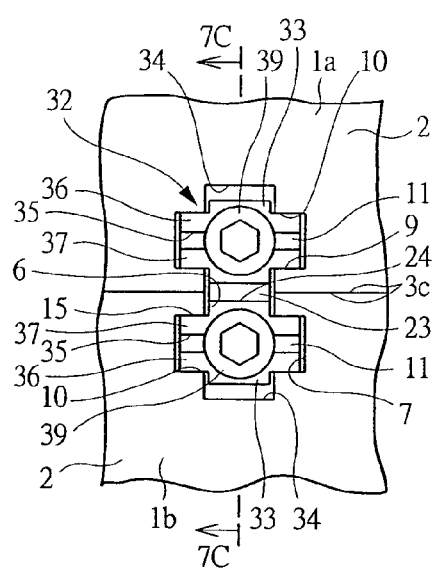
FIG. 7B is a front view of the enlarging divided metal-fitting installed in each interior of the set of communication groove and engagement groove which are opposed to each other.
Figure 7C:
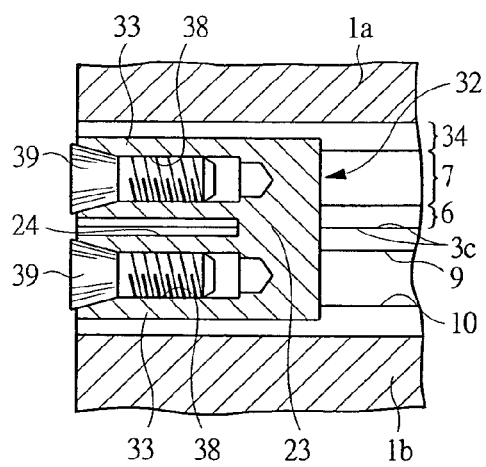
FIG. 7C is an insertion-directional cross-sectional view taken along line 7C-7C of FIG. 7B.

FIG. 7A is a perspective view of the entirety of an enlarging divided metal-fitting serving as a fastener used in a fastening assembly according to a third embodiment, FIG. 7B is a front view of the enlarging divided metal-fitting installed in the interiors of the set of communication groove 6 and engagement groove 7 which are opposed to each other, and FIG. 7C is an insertion-directional cross-sectional view taken along line 7C-7C of FIG. 7B. In these Figures, members and shapes used in common with the fastening assembly shown in FIG. 5 are denoted by the same reference numerals.

As shown in FIG. 7, the enlarging divided metal-fitting 32 integrally has the two engaging pieces 11 which are disposed symmetrically in the vertical direction of the Figures, and the connecting portion 14 between the engaging pieces 11 is integrally formed therewith. At the central position in the vertical direction of the Figures, the coupling position 23 thereof is left on the thrust-directional side, and is divided mostly (about two thirds) on the pull-directional side by the linking dividing groove 24.

A protruding portion 33 is formed on the outer surface 27 of each of the engaging pieces 11 in the longitudinal direction, and a periphery of each engaging piece 11 is such that its sectional shape orthogonal to the insertion direction is substantially cross-like (see FIG. 7B). When this enlarging divided metal-fitting 32 is used, accommodating grooves 34 into which the protruding portions 33 can be inserted are formed in the bottom faces of the engagement grooves on sides of the fastened blocks 1a and 1b. As shown in FIG. 7, the enlarging divided metal-fitting 32 having the above-described structure is thrust in the insertion direction into the interiors of the set of communication groove 6 and engagement groove 7 which are opposed to and communicate with each other, so that the entirety thereof can be inserted thereto.

As shown in the Figures, half of each engaging piece 11 on the pull-directional side is separated into an outer elastic deformation portion 36 and an inner elastic deformation portion 37 respectively in the vertical direction of the Figures, by an engaging-piece dividing groove 35 serving as a cut-in portion. Further, a screw hole 38 is formed at a center of the engaging-piece dividing groove 35. A tapered round surface having no screw thread is formed in each screw hole 38 on the pull-directional side. A flat head screw 39, whose bearing surface has a comparatively large taper, is attached as a fastening member to each screw hole 38.

As shown in FIG. 7, when the flat head screws 39 are screwed forward in a state in which the engaging pieces 11 are inserted in the engagement grooves 7, the tapered bearing surface of the flat head screw 39 penetrates as a wedge-shaped member the engaging-piece dividing groove 35, whereby the engaging-piece dividing groove 35 is spread out. As a result, the fastening surfaces 15 of the two inner elastic deformation portions 37 are strongly pushed in a direction of approaching each other, and the two opposing communication grooves 6 are strongly clamped via the engagement surfaces 9. Accordingly, the enlarging divided metal-fitting 32 serving as a fastener applies a fastening force to the two blocks 1a and 1b, thereby firm fastening them.

In the manner described above, also in the two blocks 1a and 1b in the state of being fastened by the fastening assembly according to the present embodiment, firm fastening without anything protruding from the surfaces of the blocks 1a and 1b can be carried out.

Figure 8A:
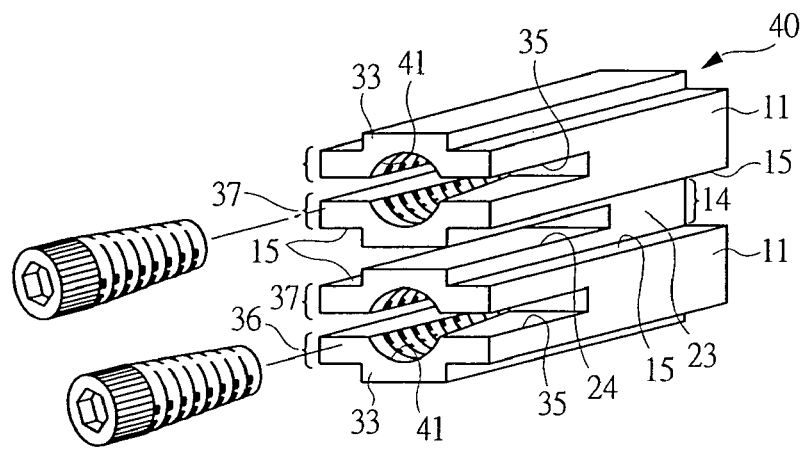
FIG. 8A is a perspective view of an entirety thereof.
Figure 8B:
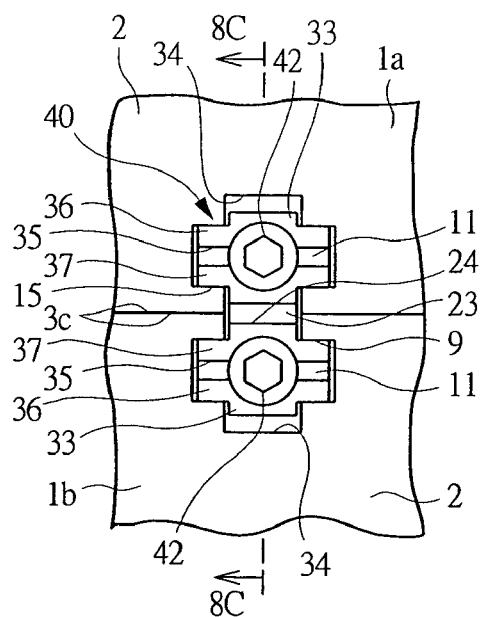
FIG. 8B is a front view of the enlarging divided metal-fitting that is the modification example installed in each interior of the set of communication groove and engagement groove which are opposed to each other.
Figure 8C:
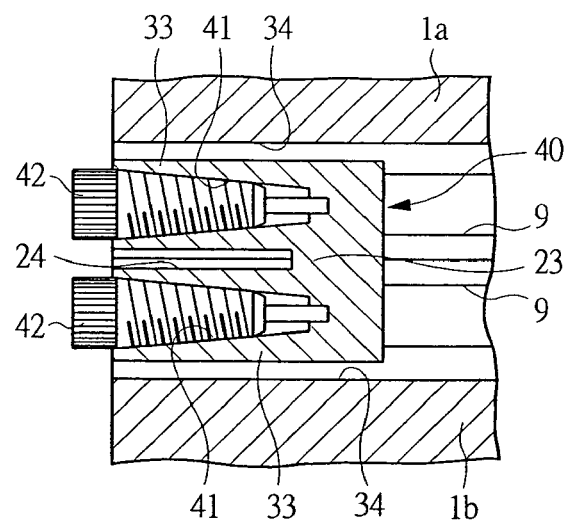
FIG. 8C is an insertion-directional cross-sectional view taken along line 8C-8C of FIG. 8B.

FIG. 8A is a perspective view of an entirety of a modification example of the enlarging divided metal-fitting shown in FIG. 7, FIG. 8B is a front view of the modification example of the enlarging divided metal-fitting installed in the interiors of one set of communication groove 6 and engagement groove 7 which are opposed to each other similarly to the above-described first embodiment, and FIG. 8C is an insertion-directional cross-sectional view taken along line 8C-8C of FIG. 8B. In these Figures, members and shapes used in common with the fastening assembly shown in FIG. 7 are denoted by the same reference numerals.

In a modification example 40 of the enlarging divided metal-fitting shown in FIG. 8, screw threads are formed in a tapered manner over the entirety of the screw hole 41 formed on the engaging-piece dividing groove 35 in the length direction, and a tapered screw is formed in the length direction over the entirety of a screw member 42 (fastening member) to be screw-connected to the screw hole 41. A structure other than this is the same as that of the enlarging divided metal-fitting 32 shown in FIG. 7.

Therefore, as shown in the Figures, when the screw members 42 are screwed in a state of inserting the engaging pieces 11 in the engagement grooves 7, the entirety of the tapered screw 42 penetrates, as a wedge-shaped member, the engaging-piece dividing groove 35, thereby expanding the engaging-piece dividing groove 35. As a result, the fastening surfaces 15 of the two inner elastic deformation portions 37 are strongly pushed in the direction of approaching each other, and the two opposing communication grooves 6 are strongly clamped via the engagement surfaces 9. The modification example of the enlarging divided metal-fitting 32 applies a fastening force to the two blocks 1a and 1b, thereby firmly fastening them.

Figure 9A:
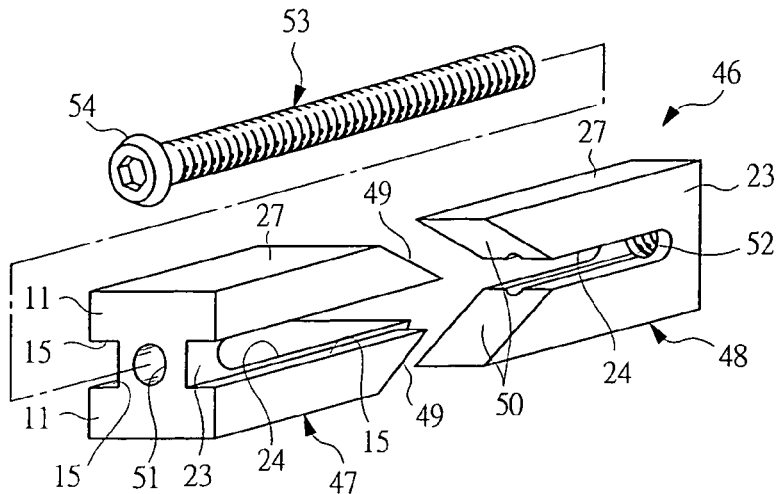
FIG. 9A is a perspective view of an entirety thereof.
Figure 9B:
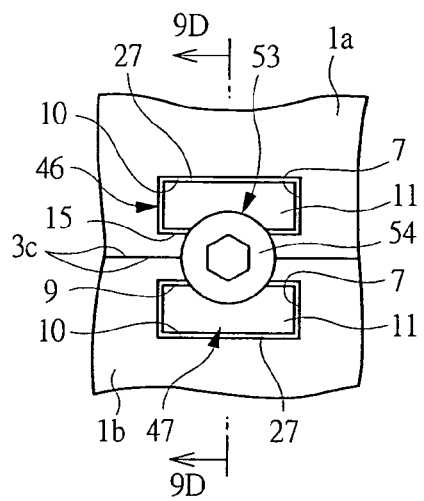
FIG. 9B is a front view of the wedge dividing metal-fitting installed in a fastened state in each interior of the set of communication groove and engagement groove which are opposed to each other.
Figure 9C:
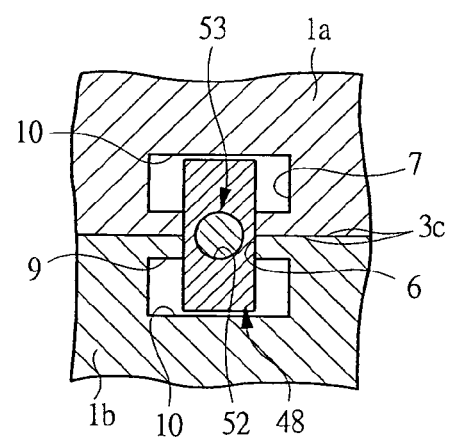
FIG. 9C is a cross-sectional view taken along line 9C-9C in FIG. 9D.
Figure 9D:
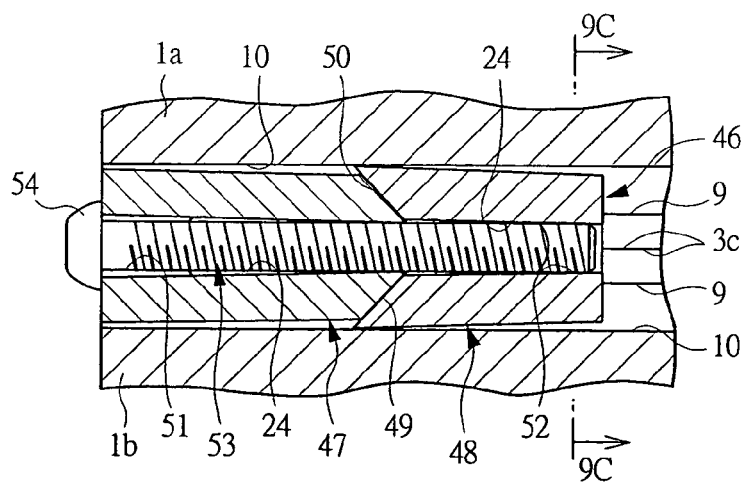
FIG. 9D is an insertion-directional cross-sectional view taken along line 9D-9D of FIG. 9B.

FIG. 9A is a perspective view of an entirety of a wedge dividing metal-fitting serving as a fastener used in a fastening assembly according to a fourth embodiment, FIG. 9B is a front view of the wedge dividing metal-fitting installed in the fastened state in the interiors of one set of communication groove 6 and engagement groove 7 which are opposed to each other, FIG. 9C is a cross-sectional view taken along line 9C-9C of FIG. 9D, and FIG. 9D is an insertion-directional cross-sectional view taken along line 9D-9D of FIG. 9B. In these Figures, members and shapes common used in with the fastening assembly shown in FIG. 5 are denoted by the same reference numerals.

As shown in FIG. 9, the wedge dividing metal-fitting 46 is constituted so that two of a wedge metal-fitting 47 on the pull-directional side and a clamp metal-fitting 48 on the thrust-directional side (fastening pieces) are assembled in the insertion direction via a screw member. Each of the wedge metal-fitting 47 and the clamp metal-fitting 48 has a height almost equal to a distance (2Do+2Di) from the bottom face 10 of one engagement groove of one set of communication groove 6 and engagement groove 7 communicating with each other to the bottom face 10 of the other engagement groove, so that the wedge metal-fitting 47 is formed to have a width almost equal to the inner width "Wi" and the clamp metal-fitting 48 is formed to have a width almost equal to the opening width "Wo".

The wedge metal-fitting 47 integrally includes, at both ends in the vertical direction of the Figures, the engaging pieces 11 which can be inserted into the engagement grooves 7. Between the two upper and lower engaging pieces 11, the coupling portion 23 on the pull-directional side is left and most thereof on the thrust-directional side is divided by the linking dividing groove 24 in the vertical direction of the Figure. Each of end faces on the thrust-directional side of parts divided upper and lower forms an inclined face 49 (abutting face) forming an obtuse angle with respect to the outer surface 27 of each engaging piece 11.

The clamp metal-fitting 48 is such that the coupling portion 23 on the thrust-directional side is left and most thereof on the pull-directional side is divided by the linking dividing groove 24 in the vertical direction of the Figures. End faces of vertically divided parts on the pull-directional side form inclined surfaces 50 (abutting faces), which are formed with such angles that they become parallel to the mutually opposing inclined surfaces 49 serving as end faces of the wedge metal-fitting 47.

A hole penetrated in the insertion direction is formed in each of both the coupling portions 23 of the wedge metal-fitting 47 and the clamp metal-fitting 48, wherein the hole of the wedge metal-fitting 47 is merely a through hole 51 on which no screw thread is formed and the hole of the clamp metal-fitting 48 is a screw hole 52 on which a screw thread is formed. A bolt screw 53 is inserted from the end face of the wedge metal-fitting 47 on the pull-directional side, a bolt-screw head 54 is engaged with the end face on the pull-directional side, and a screw part of the bolt screw 53 is screw-connected to the screw hole 52 of the clamp metal-fitting, so that the wedge metal-fitting 47 and the clamp metal-fitting 48 are assembled.

As shown in FIG. 9, the wedge dividing metal-fitting 46 having the above-mentioned structure is thrust into the interiors of the set of communication groove 6 and engagement groove 7 which are opposed to and communicate with each other, whereby the entirety thereof can be inserted. In a state in which the entirety is inserted, when the bolt screw 53 is turned so that the wedge metal-fitting 47 and the clamp metal-fitting 48 are strongly pressed against each other, pressing component forces in a direction of approaching each other act on the engaging pieces 11 of the wedge metal-fitting 47 due to contact sliding caused between the inclined surfaces 49 and 50 as shown in FIG. 9D. In addition, the outer surfaces 27 of the clamp metal-fitting 48 abut on the bottom faces 10 of the engagement grooves, thereby being not deformed any more. In other words, the clamp metal-fitting 48 and the bolt screw 53 serve as a fastening member in the wedge dividing metal-fitting 46. Accordingly, the fastening surfaces 15 of the engaging pieces 11 of the wedge metal-fitting 47 are strongly pressed in the direction of approaching each other, whereby the two mutually opposed communication grooves 6 are strongly clamped via the engagement surfaces 9.

In the manner described above, also in the two blocks 1a and 1b under the state of being fastened by the fastening assembly according to the present embodiment, the firm fastening without anything protruding from the surfaces of the blocks 1a and 1b can be carried out. Furthermore, the positioning plate 30 shown in FIG. 6 can be applied to the wedge dividing metal-fitting 46 of the present embodiment.

Figure 10A:
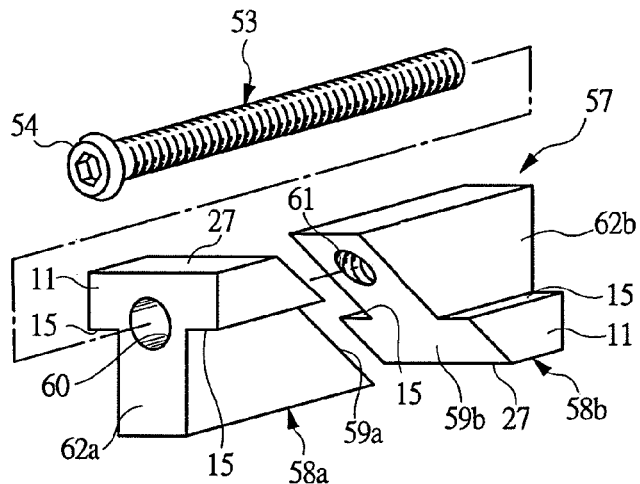
FIG. 10A is a perspective view of an entirety thereof.
Figure 10B:
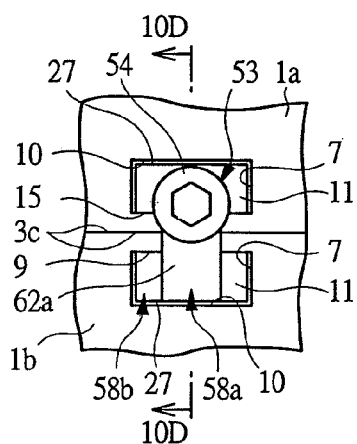
FIG. 10B is a front view of the inclined dividing metal-fitting installed in the fastened state in each interior of the set of communication groove and engagement groove which are opposed to each other.
Figure 10C:
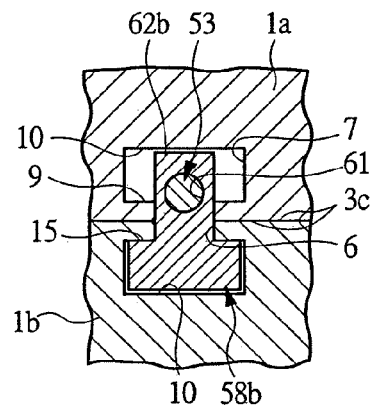
FIG. 10C is a cross-sectional view taken along line 10C-10C in FIG. 10D.
Figure 10D:
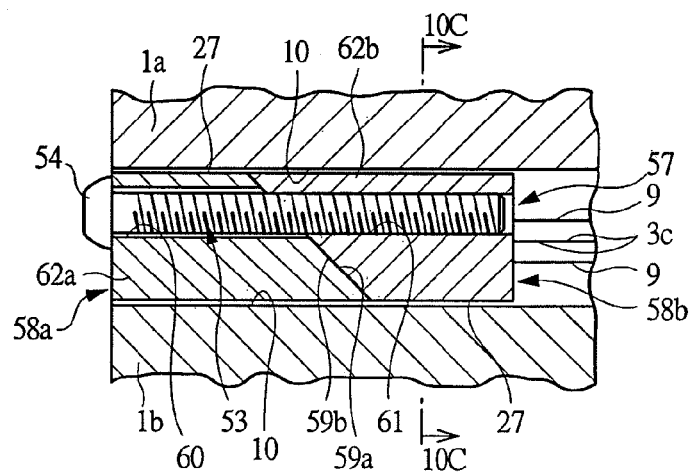
FIG. 10D is an insertion-directional cross-sectional view taken along line 10D-10D of FIG. 10B.

FIG. 10A is a perspective view of an entirety of an inclined dividing metal-fitting serving as a fastener used in a fastening assembly according to a fifth embodiment, FIG. 10B is a front view of the inclined dividing metal-fitting installed in the fastened state in the interiors of one set of communication groove 6 and engagement groove 7 which are opposed to each other, FIG. 10C is a cross-sectional view taken along line 10C-10C in FIG. 10D, and FIG. 10D is an insertion-directional cross-sectional view taken along line 10D-10D of FIG. 10B. In these Figures, members and shapes used in common with the fastening assembly shown in FIG. 9 are denoted by the same reference numerals.

As shown in FIG. 10, the inclined dividing metal-fitting 57 is constituted so that two trapezoidal metal-fittings 58a and 58b thereof on the pull-directional side and the thrust-directional side are assembled in the insertion direction via a screw member. The trapezoidal metal-fittings 58a and 58b have connecting portions 62a and 62b (first connecting portion and second connecting portion), each of which is formed with a height almost equal to a distance (2Do+2Di) from the bottom face 10 of one of the engagement grooves in the set of communication groove 6 and engagement groove 7 communicating with each other to the bottom face 10 of the other engagement groove and with a width almost equal to the opening width "Wo" of the communication groove 6. These connecting portions 62a and 62b are arranged so as to be opposed to each other by mutually parallel inclined surfaces 59a and 59b (abutting faces).

The connecting portion 62b of the trapezoidal metal-fitting 58a on the pull-directional side integrally includes the engaging piece 11 capable of being inserted into the engagement groove 7 at the upper-side end of the Figures, and the connecting portion 62b of the trapezoidal metal-fitting 58b on the thrust-directional side integrally includes the engaging piece 11 capable of being inserted into the engagement groove 7 at the lower-side end of the Figures. Accordingly, the two engaging pieces 11 are arranged so that the respective fastening surfaces 15 are mutually shifted in the longitudinal direction and opposed to each other. Each of the inclined surfaces 59a and 59b of the two trapezoidal metal-fittings 58a and 58b opposed to each other forms an obtuse angle with respect to the outer surface 27 on a side on which the engaging piece 11 is provided.

In a state in which the two trapezoidal metal-fittings 58a and 58b are serially arranged so that the inclined surfaces 59a and 59b are opposed to each other, a hole penetrating the entirety of the inclined dividing metal-fitting 57 in the insertion direction is formed at a height level including the engaging piece 11 of the trapezoidal metal-fitting 58a on the pull-directional side. The hole of the trapezoidal metal-fitting 58a on the pull-directional side is merely a through hole 60 on which no screw thread is formed, and the hole of the trapezoidal metal-fitting 58b on the thrust-directional side is a screw hole 61 on which a screw thread is formed. The bolt screw 53 (screw member) is inserted from the pull-directional-side end face of the trapezoidal metal-fitting 58a on the pull-directional side and the bolt-screw head 54 is engaged with the end face on the pull-directional side and the screw part of the bolt screw 53 is screwed in a screw hole 61 of the trapezoidal metal-fitting 58b on the thrust-directional side, so that the two trapezoidal metal-fittings 58a and 58b are assembled.

As shown in FIG. 10, the inclined dividing metal-fitting 57 having the above-mentioned structure is thrust into the interiors of the set of communication groove 6 and engagement groove 7 which are opposed to and communicate with each other, the entirety thereof can be inserted. In the state in which the entirety is inserted, when the bolt screw 53 is turned to increase the pressing force acting mutually between the two trapezoidal metal-fittings 58a and 58b, as shown in FIG. 10D, the pressing component force in the mutually opposing directions, i.e., in the upward direction and the downward direction of the Figures acts on the trapezoidal metal-fittings 58a and 58b due to the contact sliding between the inclined surfaces 59a and 59b. Since the inclined surfaces 59a and 59b are formed with the above-described angle, the pressing component force directed downward in the Figures acts on the trapezoidal metal-fitting 58a on the pull-directional side and the pressing force directed upward in the Figures acts on the trapezoidal metal-fitting 58b on the thrust-directional side. Accordingly, the fastening surfaces 15 of the engaging pieces 11 of the respective trapezoidal metal-fittings 58a and 58b are strongly pressed in the direction of approaching each other, whereby the two opposing communication grooves 6 are strongly clamped via the engagement surfaces 9.

In the manner described above, also in the two blocks 1a and 1b under the state of being fastened by the fastening assembly according to the present embodiment, the firm fastening without anything protruding from the surfaces of the blocks 1a and 1b can be carried out. Furthermore, the positioning plate 30 shown in FIG. 6 can be applied to the inclined dividing metal-fitting 57 of the present embodiment.

Figure 11A:
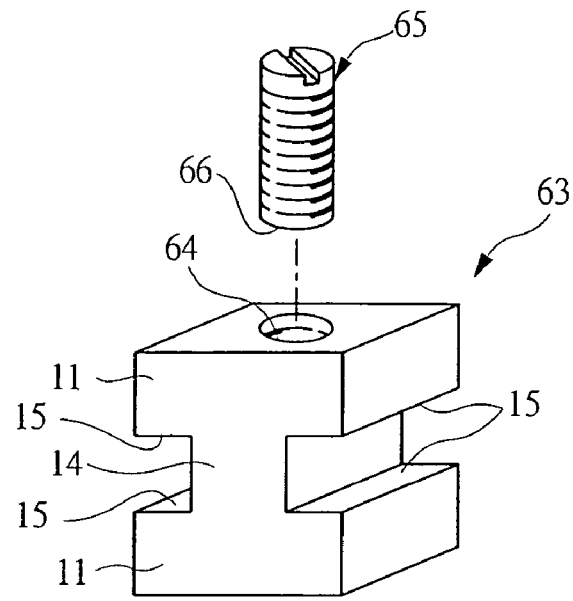
FIG. 11A is a perspective view of an entirety thereof and FIG. 11B is a front cross-sectional view of the H-shaped metal-fitting which is installed in the fastened state in each interior of the set of communication groove and engagement groove which are opposed to each other.
Figure 11B:
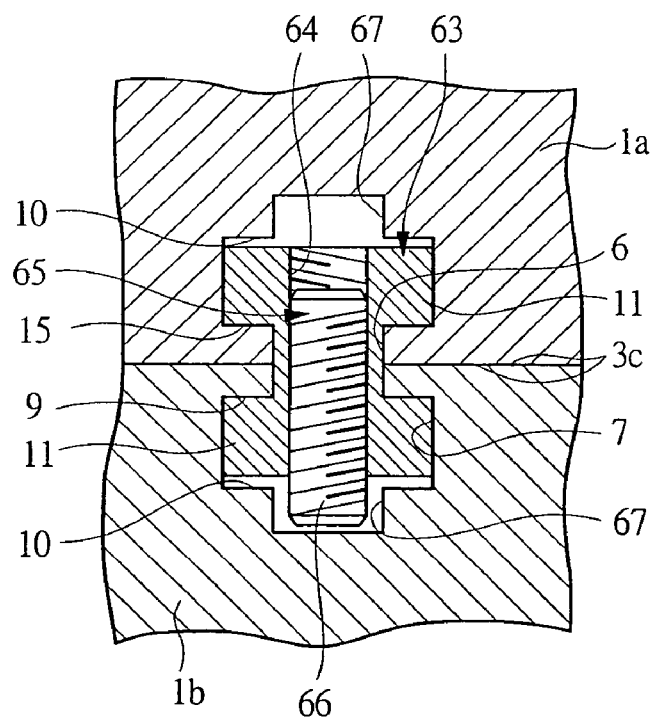

FIG. 11A is a perspective view of an entirety of an H-shaped metal-fitting serving as a fastener used in a fastening assembly according to a sixth embodiment, and FIG. 11B is a front cross-sectional view of the H-shaped metal-fitting installed in a state of being fastened in the interiors of one set of communication groove 6 and engagement groove 7 which are opposed to each other. If each length of the members to be fastened, the communication groove 6, and the engagement groove 7 is larger than that of an ordinary case in comparison with the width of each groove, the H-shaped metal-fitting 63 of the present embodiment is an intermediate fastener for fastening an intermediate position thereof. In these Figures, members and shapes used in common with the fastening assembly shown in FIG. 2 are denoted by the same reference numerals.

As shown in FIG. 11, the H-shaped metal-fitting 63 is formed integrally so that the two engaging pieces 11 capable of being inserted into the engagement grooves 7 are disposed symmetrically in the vertical direction of the Figures by sandwiching the connecting portion 14 therebetween. The H-shaped metal-fitting 63 with such a structure can be entirely inserted into the interiors of one set of communication groove 6 and engagement groove 7 which are opposed to and communicate with each other. Also, as shown in the Figures, a screw hole 64 penetrating the H-shaped metal-fitting 63 in a direction orthogonal to the outer surfaces 27 of the engaging pieces 11 is formed, and a setscrew 65 is attached to the inside thereof. Note that when this intermediate fastener is used, an accommodating groove 67 on which a tip 66 of the setscrew abuts is desirably formed on the bottom face 10 of the engagement groove as shown in the Figures.

In the procedure for attaching it, first, the engaging piece 11 on a side, on which the tip 66 of the setscrew is disposed in the engagement groove 7 of the lower-side block 1b of FIG. 11, is inserted from an opening of an end of the engagement groove 7, thereby being disposed at a predetermined middle position of the engagement groove 7 in its longitudinal direction. Then, the setscrew 65 is screwed thereto so as to abut the tip 66 of the setscrew and the bottom face of the accommodating groove 67, whereby the fastening surfaces 115 of the engaging pieces 11 is pressed against the engagement surfaces 9 of the engagement grooves 7 by a reaction force thereof and the H-shaped metal-fitting 63 is fixed to the communication groove 6 and engagement groove 7 of one block 1b. At this time, half of the connecting portion 14 and one of the engaging pieces 11 become in a state of protruding from the connection surface 3c. By making the other block (upper-side block 1a of FIG. 11B) to be fastened contact by both connection surfaces 3c and by inserting the H-shaped metal-fitting 63 into the communication groove 6 and the engagement groove 7 to be slid in the longitudinal direction, the fastening at the intermediate position can be achieved.

According to the fastening assembly of the present embodiment that has been thus assembled, even when the two blocks 1a and 1b to be fastened are long in the longitudinal direction, occurrence of displacement and a gap at the intermediate position thereof can be prevented, whereby the reliable fastening can be achieved.

Figure 12A:
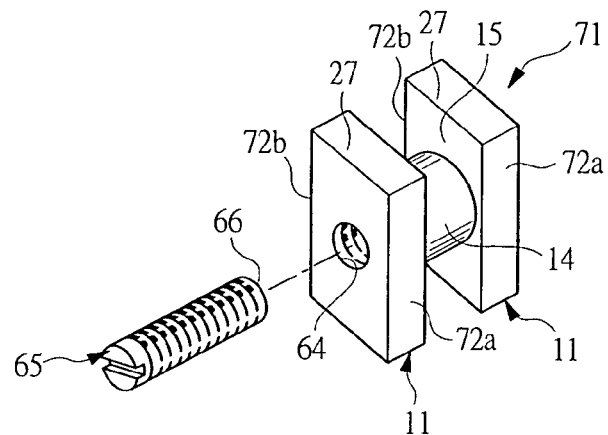
FIG. 12A is a perspective view of an entirety thereof.
Figure 12B:
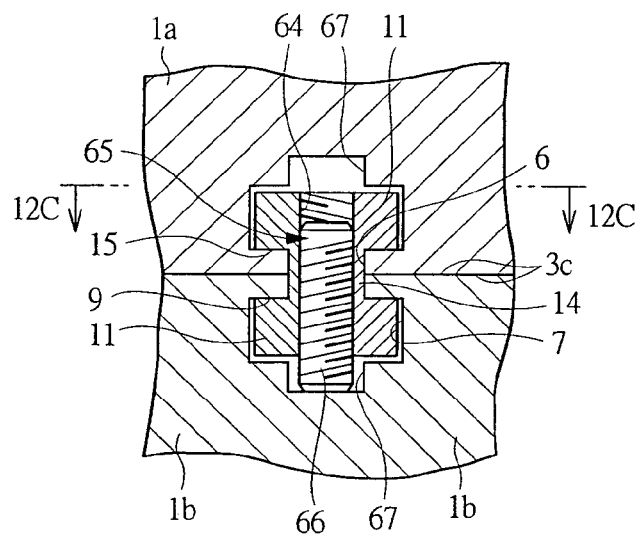
FIG. 12B is a front cross-sectional view taken along line 12B-12B of FIG. 12C for the flat inclination H-shaped metal-fitting installed in each interior of the set of communication groove and engagement groove which are opposed to each other.
Figure 12C:
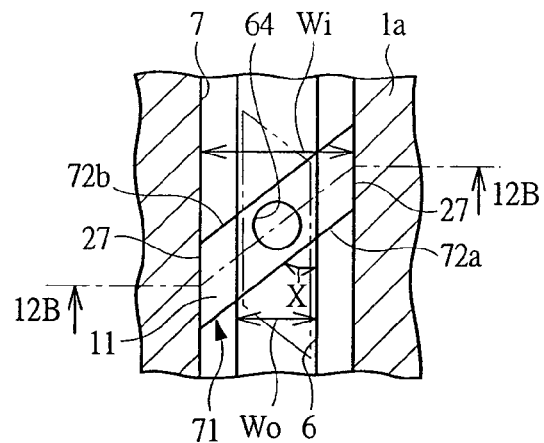
FIG. 12C is a plane cross-sectional view taken along line 12C-12C of FIG. 12B.

Further, the intermediate fastener used in the fastening assembly of the present embodiment may be constituted by the following modification example. FIG. 12A is a perspective view of an entirety of a flat inclination H-shaped metal-fitting which is a first modification example of the intermediate fastener; FIG. 12B is a front cross-sectional view taken along line 12B-12B of FIG. 12C showing the flat inclination H-shaped metal-fitting installed in the interiors of one set of communication groove 6 and engagement groove 7 which are opposed to each other; and FIG. 12C is a plane cross-sectional view taken along line 12C-12C of FIG. 12B. In these Figures, members and shapes used in common with the fastening assembly shown in FIG. 11 are denoted by the same reference numerals.

As shown in FIG. 12, a flat inclination H-shaped metal-fitting 71 has the two engaging pieces 11, each of which is formed into a prismatic shape having a parallelogram section in which front and rear end faces 72a and 72b viewed from the outer surface 27 thereof are inclined by an angle "X" with respect to the insertion direction, wherein the width in a direction orthogonal to the insertion direction is equal to the inner width "Wi" of the engagement groove 7 and a distance between the two parallel end faces 72a and 72b is formed to be equal to the opening width "Wo" of the communication groove 6. The connecting portion 14 is formed into a cylindrical shape with a diameter equal to the opening width "Wo" of the communication groove 6.

By virtue of such a structure, when the flat inclination H-shaped metal-fitting 71 is attached to the first block 1b, as shown by the chain double-dashed lines in FIG. 12C, one of the engaging pieces 11 can be passed through from the communication groove 6 by taking a posture of being rotated by an angle "X" about a central axis of the connecting portion 14. Thereafter, by returning the angle "X", as shown by the solid lines in FIG. 12C, a state of inserting one engaging piece 11 into the engagement groove 7 can be achieved while a good posture is maintained. After fixing the position and posture by the setscrew 65, the other block 1a is slid in the longitudinal direction, thereby being able to be fastened at the intermediate position.

As described above, according to the intermediate fastener of this modification example, even when the communication grooves 6 and the engagement grooves 7 are long in the longitudinal direction, the fastener can be readily installed from the longitudinal-directional intermediate positions without being inserted from the openings of the ends of the communication groove 6 and the engagement groove 7. Under a state of the good posture, the posture can be certainly fixed since both width-directional ends of each engaging piece 11 surface-contact with both width-directional side faces of the engagement groove 7. Note that one of the engaging pieces 11 may be formed into a prismatic shape having a parallelogram section capable of passing through the communication groove 6 and the other of the engaging pieces 11 may be formed into a cuboid as shown in FIG. 11.

Figure 13A:
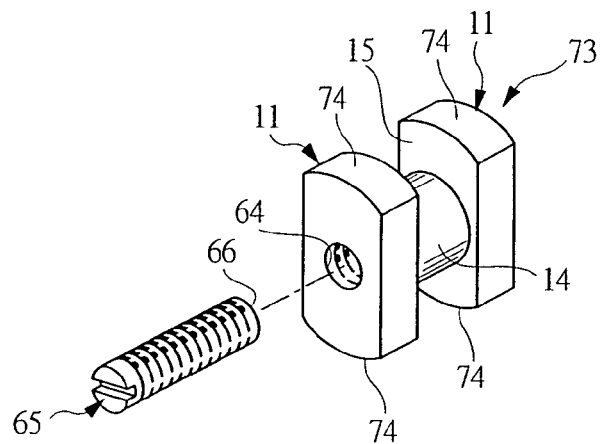
FIG. 13A is a perspective view of an entirety thereof.
Figure 13B:
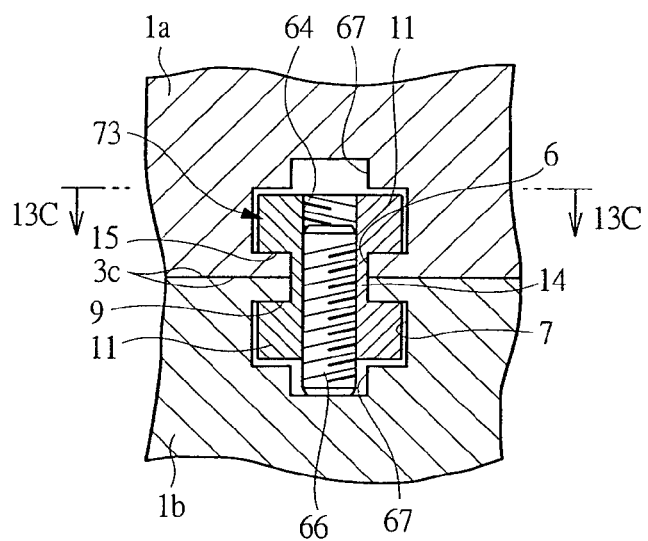
FIG. 13B is a front cross-sectional view taken along line 13B-13B of FIG. 13C for the flat round H-shaped metal-fitting installed in each interior of the set of communication groove and engagement groove which are opposed to each other.
Figure 13C:
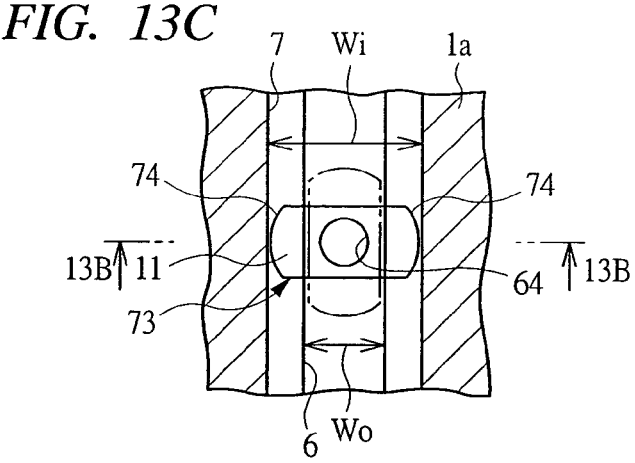
FIG. 13C is a plane cross-sectional view taken along line 13C-13C of FIG. 13B.

FIG. 13A is a perspective view of an entirety of a flat round H-shaped metal-fitting which is a second modification example of the intermediate fastener; FIG. 13B is a front cross-sectional view taken along line 13B-13B of FIG. 13C showing the flat round H-shaped metal-fitting installed in the interiors of one set of communication groove 6 and engagement groove 7 which are opposed to each other; and FIG. 13C is a plane cross-sectional view taken along line 13C-13C of FIG. 13B. In these Figures, members and shapes used in common with the fastening assembly shown in FIG. 11 are denoted by the same reference numerals.

As shown in FIG. 13, a flat round H-shaped metal-fitting 73, in which the entire thickness with respect to the insertion direction is equal to the opening width "Wo" of the communication groove 6 and both width-directional ends of each engaging piece 11 each have a cylindrical side face 74 with a diameter equal to the inner width "Wi" of the engagement groove 7.

By virtue of such a structure, when the flat round H-shaped metal-fitting 73 is attached to the first block 1b, as shown by the chain double-dashed lines in FIG. 13C, one of the engaging pieces 11 can be passed through and inserted into the communication groove 6 by taking a posture of rotating by an angle of 90 degrees about the central axis of the connecting portion 14. Thereafter, by returning 90 degrees, as shown by the solid lines in FIG. 13C, one of the engaging pieces 11 can be inserted into the engagement groove 7 under a state of maintaining a good posture. After fixing the position and posture by the setscrew 65, the other block 1a can be slid in the longitudinal direction, thereby being able to be fastened at the intermediate position.

As described above, according to the intermediate fastener of this modification example, similarly to the intermediate fastener of the first modification example, the fastener can be readily installed from the intermediate positions of the communication groove 6 and the engagement groove 7 in the longitudinal direction. Note that only one of the engaging pieces may be formed to have such thickness as to be capable of passing through the communication groove 6.

Fastening by use of the fastening assemblies of the above-described embodiments is not limited to the case where mere blocks are fastened as shown in FIG. 1, and is also suitable for, for example, mutually fastening manifolds 20 in a stacking valve 19 as shown in FIG. 14. In this case, externally fixed rails etc. for fixing the manifolds 20 are not particularly required, and many manifolds 20 can be added and fixed without being limited by the length of such externally fixed rails. This case is advantageous in that the manifolds 20 and solenoid valves 21 fixed thereon can be easily attached, detached, or replaced by thrusting into or pulling out the fasteners (insertion fasteners 8).

Figure 15:
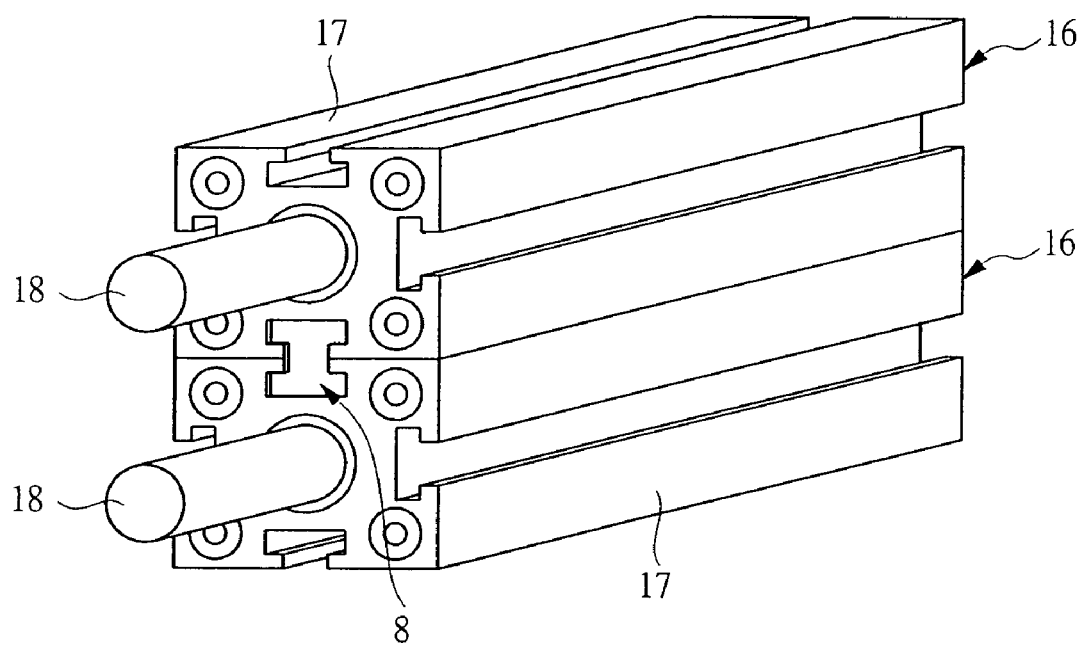
FIG. 15 is a perspective view showing two fluid pressure cylinders fastened by the fastening assembly according to the first embodiment.

In addition, fastening by use of the fastening assemblies of the above-described embodiments is also suitable for, for example, as shown in FIG. 15, the case where a plurality of fluid pressure cylinders 16 are mutually fastened by cylinder tubes 17 so as to constitute a fluid pressure cylinder unit. In this case, by fastening piston rods 18 so as to be disposed on the same side, as shown in the Figure, and by actuating and controlling the same object using both of the piston rods 18, a driving force can be increased. Or, by fastening the piston rods 18 so as to be mutually disposed on the opposite side, as described blow, the total length of a stroke can be doubled. Also, in addition to mutually fastening of the two cylinder tubes 17 as shown in the figure, even the case of constituting another fluid pressure cylinder unit by fastening one cylinder tube 17 to a casing and bracket, etc., or by fastening it to an attachment etc. may be applied. Even in this case, there is an advantage in that the fluid pressure cylinders 16 can be readily attached, detached, and replaced.

Hereinafter, embodiments of a fluid pressure cylinder unit fastened and constituted by the above-described fastening assembly will be described. FIG. 16 is a perspective view of an entirety of a fluid pressure cylinder unit according to a first embodiment of the present invention, wherein FIG. 16A is a perspective view showing a before-assembly state and FIG. 16B is a perspective view showing an assembled state. Each of two fluid pressure cylinders 101a and 101b is a pneumatic cylinder employing compressed air as working fluid (fluid pressure), wherein a piston rod 104 protrudes from one end face 103 of each of the cylinder tubes 102 serving as two members to be fastened. The piston rod 104 is provided so that an object to be driven can be driven reciprocally in a straight-line direction when the compressed air is fed or discharged through an unshown feed/discharge port. Hereinafter, the fluid pressure cylinders used in the embodiments are assumed to be pneumatic cylinders.

As shown in FIG. 16, in the two pneumatic cylinders 101a and 101b, the piston rods 104 thereof are disposed in the same direction and in parallel to each other, the cylinder tubes 102 are made to contact with each other by connection surfaces 105c thereof to be fastened via the insertion fastener 8 serving as a fastener, and a common tip plate 107a serving as a linking member is attached to the tips of the piston rods 104, whereby a twin rod cylinder is constituted. In this structure, the two cylinder tubes 102 to be fastened serve mutually as attachments.

Each of the cylinder tubes 102 is such that its end face 103 is substantially square and its entirety is a long cuboid shape in an axial direction of the piston rod 104. The communication groove 6 opened and extending in a longitudinal direction along an axial direction and the engagement groove 7 communicating therewith are formed in each of four side faces 105 thereof, and the communication grooves 6 and the engagement grooves 7 of the connection surfaces 105c contacting with each other are coupled via the insertion fasteners 8 serving as fasteners. In this linking state, the entirety of the insertion fastener 8 is inserted into and installed in the interiors of the set of communication groove 6 and engagement groove 7 which are in opposed and communicated states. In each of the cylinder tubes 102 shown in FIG. 16, although the communication groove 6 and the engagement groove 7 are formed in each of the four side faces 105, the communication groove 6 and the engagement groove 7 may be formed at least only in the connection surfaces 105c by which the cylinder tubes 102 contact with each other. Note that although shapes of the end faces 103 of the cylinder tubes 102 are square, they may be rectangular.

The pneumatic cylinder unit of the present embodiment shown in FIG. 16 has a structure in which the insertion fasteners 8 serving as fasteners are accommodated and disposed in the interiors of the two cylinder tubes 102 and there is nothing protruding from the surfaces of the cylinder tubes 102 in spite of a fastened state. Therefore, the pneumatic cylinder unit of the present embodiment has a fastening structure suitable for saving the installation spaces depending on recently downsizing of the devices.

In addition, if the communication grooves 6 and the engagement grooves 7 provided long in the two cylinder tubes 102 are in states of even partially being opposed to and communicating with each other, the insertion fastener 8 can be inserted into and fastened on such a communicating location. Therefore, even when the relative arrangement between the two cylinder tubes 102 is arbitrarily changed depending on a direction of forming the communication grooves 6, fastening can be carried out by inserting the insertion fastener 8. In addition, if a region in which the communication grooves 6 are mutually communicated is sufficiently long, the insertion fastener 8 can be inserted at arbitrary position within the communicating region. Therefore, fastening locations can be also set at arbitrary positions.

In addition, the pneumatic cylinder unit of the present embodiment has a structure in which since the two pneumatic cylinders 101a and 101b disposed parallel are certainly fastened in the above-described manner and the same tip plate 107a is driven, the driving force is almost doubled in comparison with the case of being driven by one pneumatic cylinder and rigidity is enhanced.

FIG. 17 is a perspective view of an entirety of a pneumatic cylinder unit according to a second embodiment of the present invention, wherein FIG. 17A is a perspective view showing a before-assembly state and FIG. 17B is a perspective view showing an assembled state. In these Figures, members and shapes used in common with the pneumatic cylinder unit shown in FIG. 16 are denoted by the same reference numerals.

As shown in FIG. 17, in a state in which one guide rod 115 is disposed in parallel with and installed in the guide units 114a and 114b, the respective connection surfaces 105c are fastened to each other through the insertion fastener 8 and a common tip plate 107b serving as a linking member is attached to the tips of the piston rod 104 and the guide rod 115, whereby the guide-installed cylinder is constituted. Also, this structure serves as an attachment in which guide blocks 116 of the two guide units 114a and 114b are fastened to the cylinder tube 102.

The guide units 114a and 114b are such that, with respect to the guide blocks 116 serving as members to be fastened, the same guide rods 115 between both ends thereof is made to pierce and protrude and be installed extendably and retractably and the guide rod 115 is supported in the guide block 116 by a ball bearing (not shown) so as to be slid smoothly. The guide block 116 has end faces, each of which has the same shape as that of the cylinder tube 102, and is a cuboid shape axially shorter in length than the cylinder tube 102, wherein the communication groove 6 and the engagement groove 7 are formed in each of the four side faces thereof. By inserting the entirety of the insertion fastener 8 into the interiors of one set of communication groove 6 and engagement groove 7 which are opposed to and communicate with each other at the connection surface 105c of the cylinder tube 102, each guide block 116 becomes in a state of being fastened to the cylinder tube 102.

The above-described pneumatic cylinder unit of the present embodiment has a fastening structure suitable for saving the installation spaces similarly to the above-described first embodiment and is constituted so that since two guide units 114a and 114b guide the pneumatic cylinder 101a, a stable operation can be obtained even if the tip plate 107b is long. The guide block 116 may be formed with the same length as that of the cylinder tube 102, and the ball bearing provided in the guide block 116 may be a slide bearing.

Figure 18A:
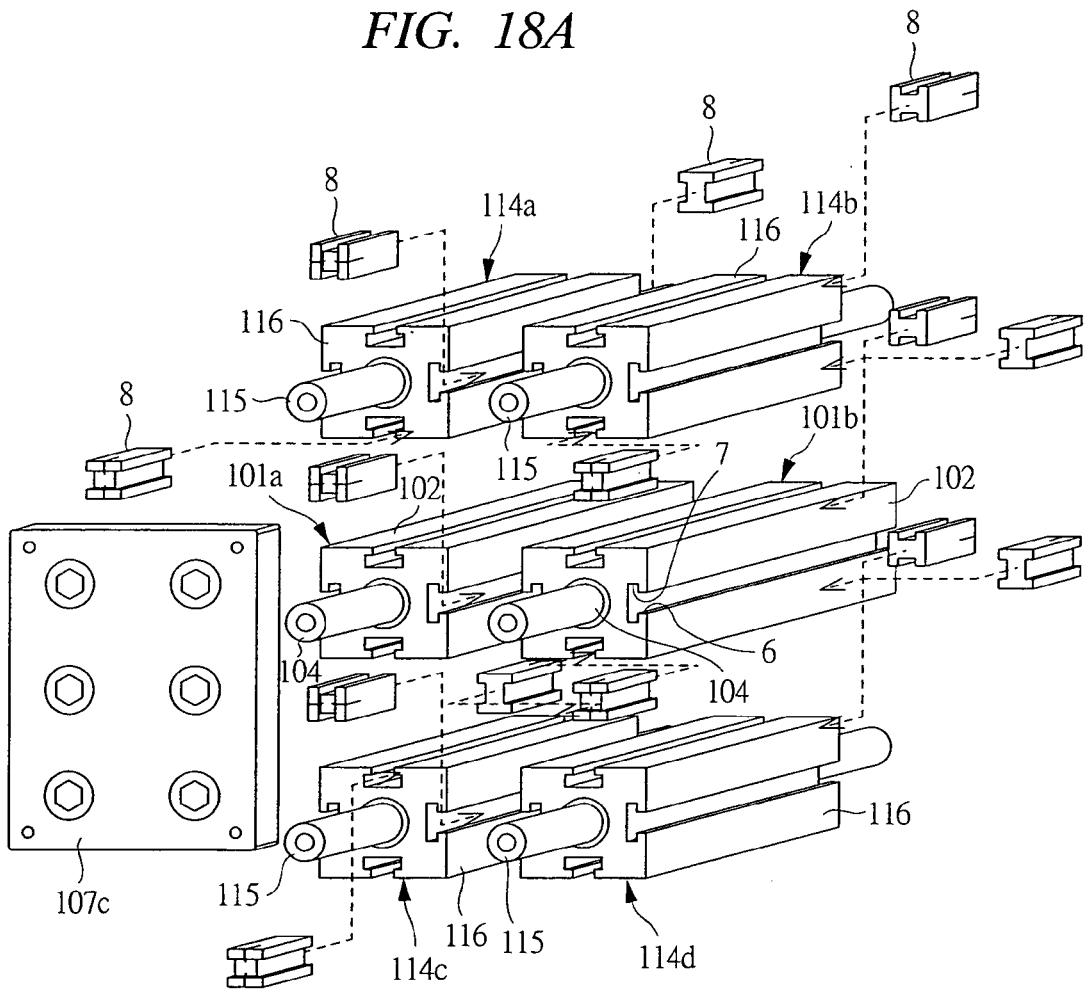
FIG. 18A is a perspective view showing a before-assembly state and FIG. 18B is a perspective view showing an assembled state.
Figure 18B:
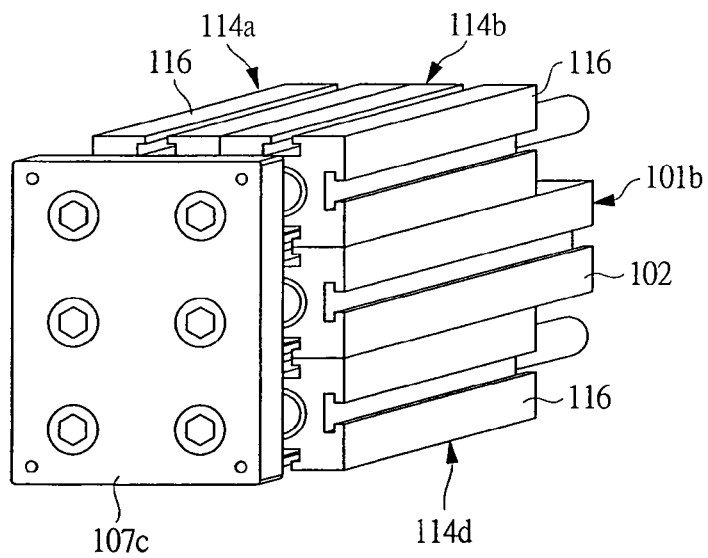

FIG. 18 is a perspective view of an entirety of a pneumatic cylinder unit according to a third embodiment of the present invention, wherein FIG. 18A is a perspective view showing a before-assembly state and FIG. 18B is a perspective view showing an assembled state. In these Figures, members and shapes used in common with the pneumatic cylinder unit shown in FIG. 16 are denoted by the same reference numerals.

As shown in FIG. 18, in the two pneumatic cylinders 101a and 101b, the piston rods 104 are arranged parallel and in the same direction, and the cylinder tubes 102 are made to contact with each other by the connection surfaces 105c and are fastened via the insertion fastener 8. Two sets of guide unit pairs 114a and 114b, and 114c and 114d, that is, the respective two guide units 114a to 114d being arranged in parallel to each other and fastened, sandwich a cylinder pair 101a and 101b therebetween parallel and from an upper and lower directions of the Figures to be arranged in 2×3 and all of the contacting connection surfaces 105c are mutually fastened by the insertion fasteners 8. A common tip plate 107c serving as a linking member is attached to all the tips of the piston rods 104 and the guide rods 115, whereby a lifter cylinder is constituted. In this structure, the two fastened cylinder tubes 102 serve mutually as attachments, and other four guide blocks 116 serves as attachments that are fastened on the two cylinder tubes 102.

The above-described pneumatic cylinder unit has a fastening structure suitable for saving the installation spaces similarly to the above-described first embodiment, and is constituted so that since two sets of guide unit pairs 114a and 114b, and 114c and 114d guide one set of pneumatic cylinder pair 101a and 101b, a doubled driving force and a stable operation can be obtained with respect to the tip plate 107c having an area approximately 2×3 times larger than a section of the cylinder tube 102.

FIG. 19 is a perspective view of an entirety of a pneumatic cylinder unit according to a fourth embodiment of the present invention, wherein FIG. 19A is a perspective view showing a before-assembly state and FIG. 19B is a perspective view showing a assembled state. In these Figures, members and shapes used in common with the pneumatic cylinder unit shown in FIG. 16 are denoted by the same reference numerals.

As shown in FIG. 19, in the two pneumatic cylinders 101a and 101b, the respective piston rods 104 are arranged in opposite direction and in parallel to each other, the cylinder tubes 102 are made to contact with each other by the connection surfaces 105c and fastened via the insertion fasteners 8, and chuck plates 117 serving as chuck members are attached to the respective piston rods 104, whereby an air chuck is constituted. In this structure, the two cylinder tubes 102 fastened serve mutually as attachments.

Each chuck plate 117 has a gripper 118 formed to extend from a connection position with the piston rod 104 in a lower direction of the Figures, and a support rod 119 is attached to each chuck plate 117. In each cylinder tube 102, a support rod hole 120 is formed in an end face 103 located on a side opposite to an extension side of the piston rod 104, and the support rod 119 is slidably inserted into the support rod hole 120 in being assembled. That is, each chuck plate 117 is stably supported by two members of the piston rod 104 and the support rod 119, and drive for reciprocation with respect to the cylinder tubes 102 is carried out by movement of the piston rods 104. When the two chuck plates 117 are reciprocated, an opening/closing operation between the chuck plates 117 is carried out.

The above-described pneumatic cylinder unit of the present embodiment has a fastening structure suitable for saving the installation spaces similarly to the above-described first embodiment, and is constituted so that by performing the opening/closing operation between the chuck plates 117, some workpiece etc. therebetween can be gripped.

FIG. 20 is a perspective view of an entirety of a pneumatic cylinder unit according to a fifth embodiment of the present invention, wherein FIG. 20A is a perspective view showing a before-assembly state and FIG. 20B is a perspective view showing an assembled state. In these Figures, members and shapes used in common with the pneumatic cylinder unit shown in FIG. 16 are denoted by the same reference numerals.

As shown in FIG. 20, in the two pneumatic cylinders 101a and 101b, the respective piston rods 104 are arranged parallel and in the same direction, the cylinder tubes 102 are made to contact with each other by the connection surfaces 105c to be fastened via the insertion fasteners 8 serving as fasteners, and a common tip plate 107d serving as a linking member is attached to the tips of the piston rods 104. Guide rails 121 are disposed parallel on the two side faces 105 located parallel on the respective pneumatic cylinders 101a and 101b, two guide plates 122 are slidably installed on each of the guide rails 121, and a common slide table 123a attached to the guide plates 122 is connected to the piston rods 104 via the tip plate 107d, whereby a table-attached twin guide cylinder is constituted. In this structure, the two cylinder tubes 102 to be fastened serve mutually as attachments.

The guide rail 121 is formed into a cuboid having a rail width "Wr" larger than the opening width "Wo" and a rail height "Hr", i.e., almost the same height as that of the cylinder tube 102 so as not to pierce the communication groove 6, and therefore is disposed so as to overlap with the communication groove 6 and combined and fixed with the nut and screw inserted into the engagement groove 7, thereby being fixed. The guide plate 122 is a plate material formed into a square whose one side has almost the same width as that of the cylinder tube 102. On a lower surface thereof, a rail groove 124 with a groove width almost equal to the rail width "Wr" and groove depth shallower than the rail height "Hr" is formed so as to fit the guide rail 121 therein and be slid. The slide table 123a is a rectangular plate material having almost the same width as that of a total of two pneumatic cylinders 101a and 101b, and is screwed on the four guide plates 122, whose two are serially arranged on each guide rail 121, and is fixed to one side face of the tip plate 107d attached to the piston rods 104. That is, the slide table 123a can apply a load to the side faces 105 of the cylinder tubes 102 via the guide plates 122 and the guide rails 121 and reciprocate axially by the operations of the piston rods 104.

The above-described pneumatic cylinder unit of the present embodiment has a fastening structure suitable for saving the installation spaces similarly to the above-described first embodiment and has a structure in which a stably reciprocating operation can be carried out by a doubled driving force while the loads are applied from the vertical and lateral directions of the cylinder tubes 102.

Figure 21:
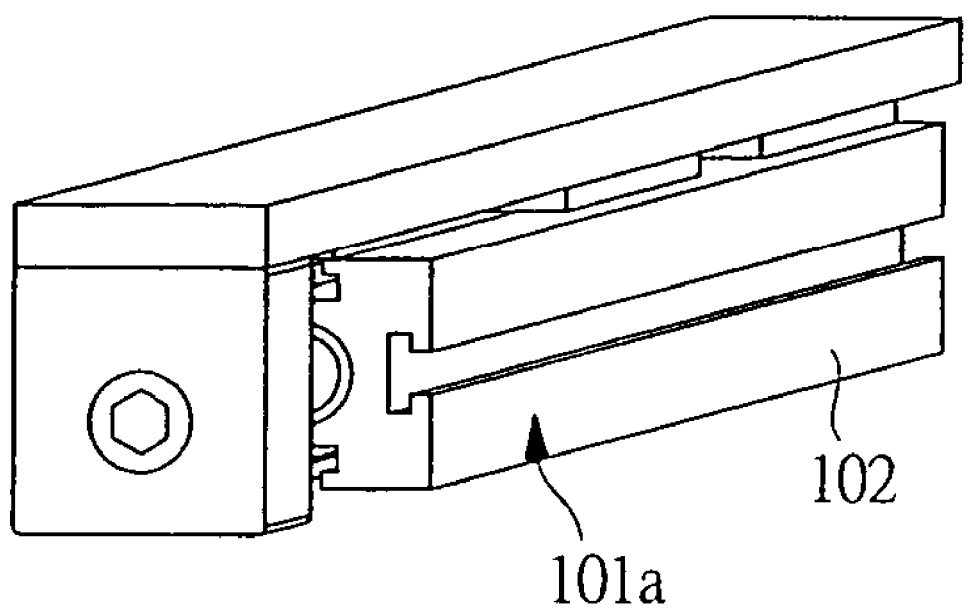
FIG. 21 is a perspective view of an entirety of a table-attached single guide cylinder.

In addition, the table-attached guide cylinder includes a structure of a table-attached single guide cylinder having only one pneumatic cylinder 101a and formed with half of the entire width, as shown in FIG. 21.

FIG. 22 is a perspective view of an entirety of a pneumatic cylinder unit according to a sixth embodiment of the present invention, wherein FIG. 22A is a perspective view showing a before-assembly state and FIG. 22B is a perspective view showing an assembled state. In these Figures, members and shapes used in common with the pneumatic cylinder unit shown in FIG. 16 are denoted by the same reference numerals.

As shown in FIG. 22, in the two pneumatic cylinders 101a and 101b, the respective piston rods 104 are mutually arranged parallel and in an opposite direction, the cylinder tubes 102 are made to contact with each other by the connection surfaces 105c to be fastened via the insertion fasteners 8, and a tip plate 107e is attached to the respective piston rods 104. Two guide rails 121 and four guide plates 122 are installed on each of upper and lower surfaces of the entire pneumatic cylinder pair 101a and 101b, and the slide tables 123a attached to the faces are linked to the piston rods 104 via the tip plates 107e located on the opposite side, whereby a double-stroke cylinder is constituted. In this structure, the two cylinder tubes 102 to be fastened serve mutually as attachments.

The above-described pneumatic cylinder unit of the present embodiment has a fastening structure suitable for saving the installation spaces similarly to the above-described first embodiment, and is constituted so that the staple reciprocating operation can be carried out by the doubled stroke while the loads are applied from the vertical and lateral directions of the cylinder tubes 102.

Figure 23A:
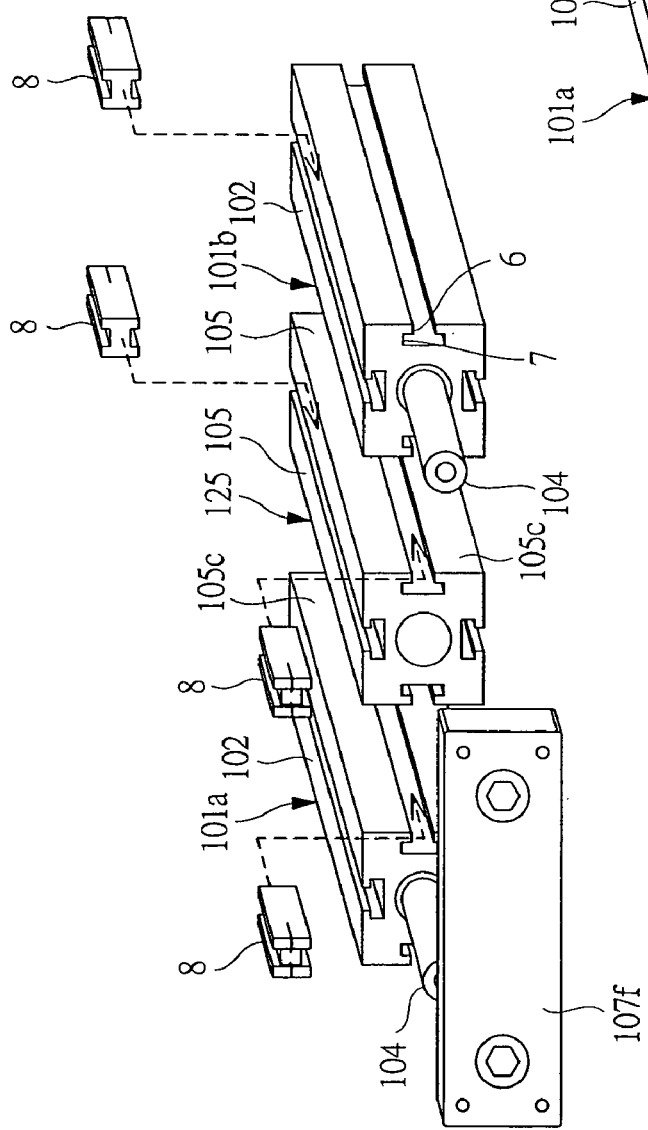
FIG. 23A is a perspective view showing a before-assembly state and FIG. 23B is a perspective view showing an assembled state.
Figure 23B:
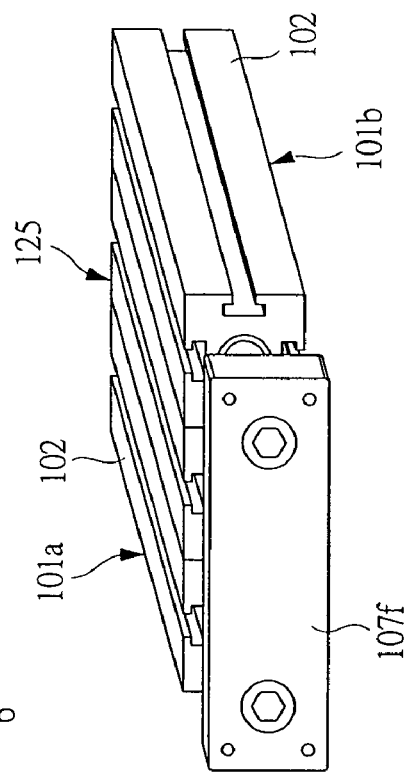

FIG. 23 is a perspective view of an entirety of a pneumatic cylinder unit according to a seventh embodiment of the present invention, wherein FIG. 23A is a perspective view showing a before-assembly state and FIG. 23B is a perspective view showing an assembled state. In these Figures, members and shapes used in common with the pneumatic cylinder unit shown in FIG. 16 are denoted by the same reference numerals.

As shown in FIG. 23, in the two pneumatic cylinders 101a and 101b, the respective piston rods 104 are directed to the same direction and are all arranged parallel so as to sandwich a spacer block 125 therebetween. The two pneumatic cylinders 101a and 101b and the spacer block 125 are mutually made to contact with each other by the connection surfaces 105c and fastened via the insertion fasteners 8 serving as fasteners, and a common tip plate 107f serving as a linking member is attached to the tips of the two piston rods 104, whereby a spacer-attached twin-rod cylinder is constituted. In this structure, the spacer block 125 and the two cylinder tubes 102 to be fastened serve mutually as attachments.

Figure 24:
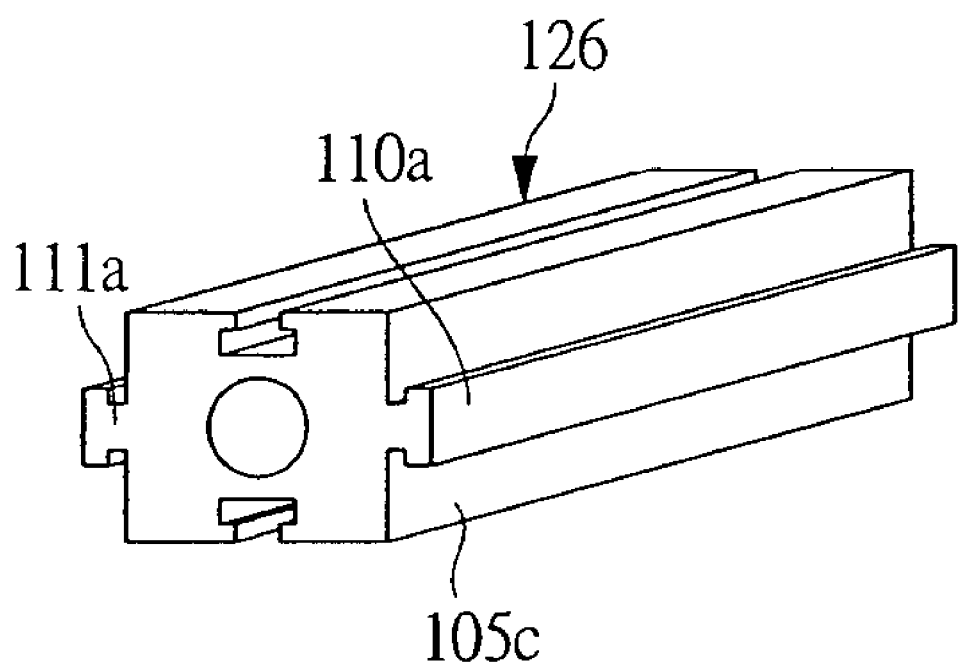
FIG. 24 is a perspective view of an entirety of a modification example of a spacer block.

The spacer block 125 has a cuboid shape with the same dimensions as those of the cylinder tube 102, wherein the communication groove 6 and the engagement groove 7 are formed in each of four side faces 105 thereof. In the spacer block 125 shown in FIG. 23, although the communication groove 6 and the engagement groove 7 are formed in each of the four side faces 105, the communication groove 6 and the engagement groove 7 may be formed only in at least the respective connection surfaces 105c connected to the cylinder tubes 102. In addition, as shown in FIG. 24, the spacer block may be a spacer block 126 having preliminarily a shape of a half portion of a fastener on the connection surfaces 105c with the cylinder tubes, i.e., having a shape of halves of the connecting portion 14 and the engaging pieces 11. In this case, the fastener does not require being prepared as independent parts.

The above-described pneumatic cylinder unit of the present embodiment has a fastening structure suitable for saving the installation spaces similarly to the above-described first embodiment, and is constituted so that the driving force is doubled and further the rigidity is enhanced.

FIG. 25 is a perspective view of an entirety of a pneumatic cylinder unit according to an eighth embodiment of the present invention, wherein FIG. 25A is a perspective view showing a before-assembly state and FIG. 25B is a perspective view showing an assembled state. In these Figures, members and shapes used in common with the pneumatic cylinder units shown in FIG. 16 and FIG. 23 are denoted by the same reference numerals.

As shown in FIG. 25, the guide units 114a and 114b are disposed on both sides of one pneumatic cylinder 101a regarded as a center, and the pneumatic cylinder 111a and the guide units 114a and 114b sandwich the spacer block 125 therebetween and all are disposed parallel. They are made to contact with each other by the connection surfaces 105c and fastened via the insertion fasteners 8 serving as fasteners, and a common tip plate 107g serving as a linking member is attached to the all tips of the piston rods 104 and the guide rods 115, whereby a spacer-and-guide-attached cylinder is constituted. In this structure, the two spacer blocks 125 and the two guide blocks 116 serve as an attachment fastened to the cylinder tube 102.

The above-described pneumatic cylinder unit of the present embodiment has a fastening structure suitable for saving the installation spaces similarly to the above-described first embodiment, and is constituted so that an stable operation can be carried out with high rigidity even if the tip plate 107g is formed into an elongated shape equal to a total of sectional dimensions of the five cylinder tubes 102.

Figure 26A:
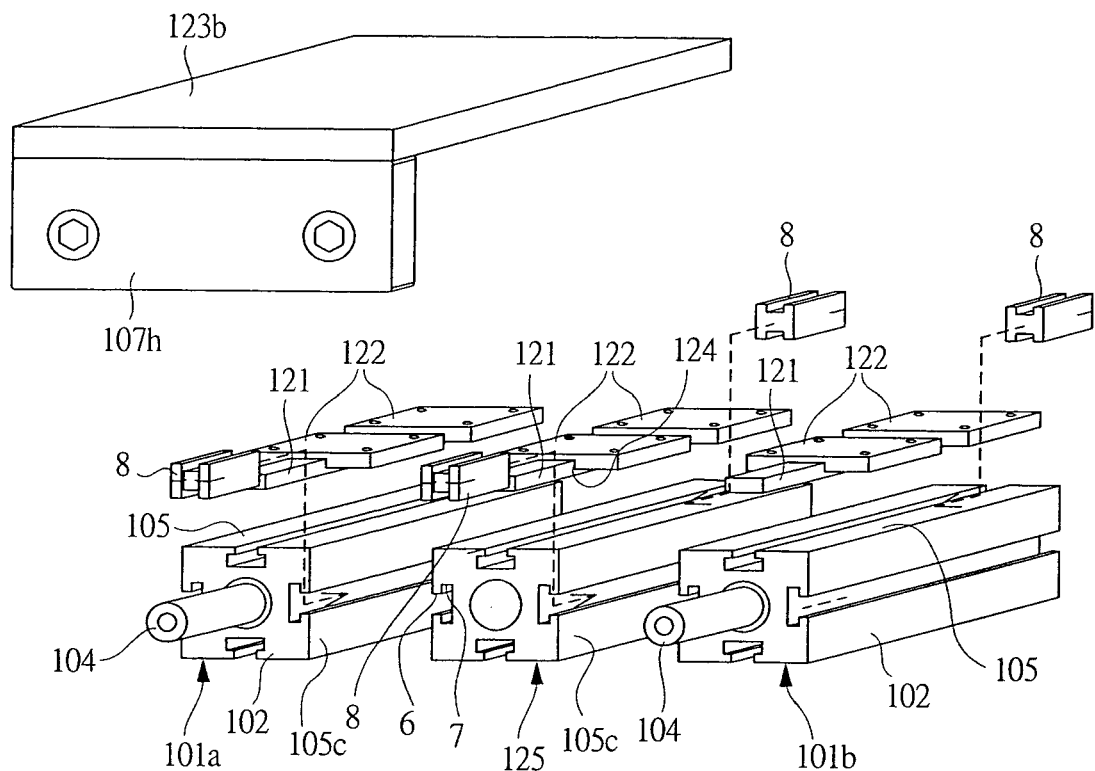
FIG. 26A is a perspective view showing a before-assembly state and FIG. 26B is a perspective view showing an assembled state.
Figure 26B:
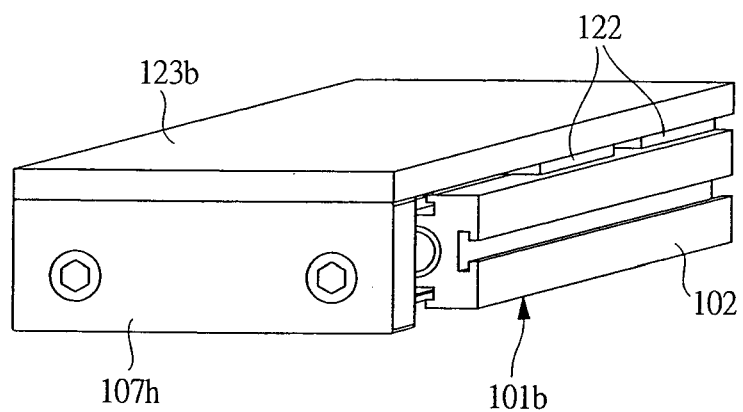

FIG. 26 is a perspective view of an entirety of a pneumatic cylinder unit according to a ninth embodiment of the present invention, wherein FIG. 26A is a perspective view showing a before-assembly state and FIG. 26B is a perspective view showing an assembled state. In these Figures, members and shapes used in common with the pneumatic cylinder units shown in FIGS. 16, 20, and 23 are denoted by the same reference numerals.

As shown in FIG. 26, in the two pneumatic cylinders 101a and 101b, the piston rods 104 are respectively directed to the same direction and sandwich the spacer block 125 therebetween, whereby all are arranged parallel. They are made to contact with each other by the connection surfaces 105c and fastened via the insertion fasteners 8 serving as fasteners, and a common tip plate 107h serving as a linking member is attached to the tips of the two piston rods 104. In addition, the guide rail 121 is installed parallel on each of the two side faces 105 located in parallel to the respective pneumatic cylinders 101a and 101b, two guide plates 122 are slidably installed on each of the guide rails 121, and a common slide table 123b attached to the guide plates 122 is connected to the piston rods 104 via the tip plate 107h, whereby a table-and-spacer-attached twin guide cylinder is constituted. In this structure, the spacer block 125 and the two cylinder tubes 102 to be fastened serve mutually as attachments.

The above-described pneumatic cylinder unit of the present embodiment has a fastening structure suitable for saving the installation spaces similarly to the above-described first embodiment, and is constituted so that the driving force is doubled and further the rigidity is enhanced while the loads are applied from the vertical and lateral directions of the cylinder tubes 102.

Figure 27:
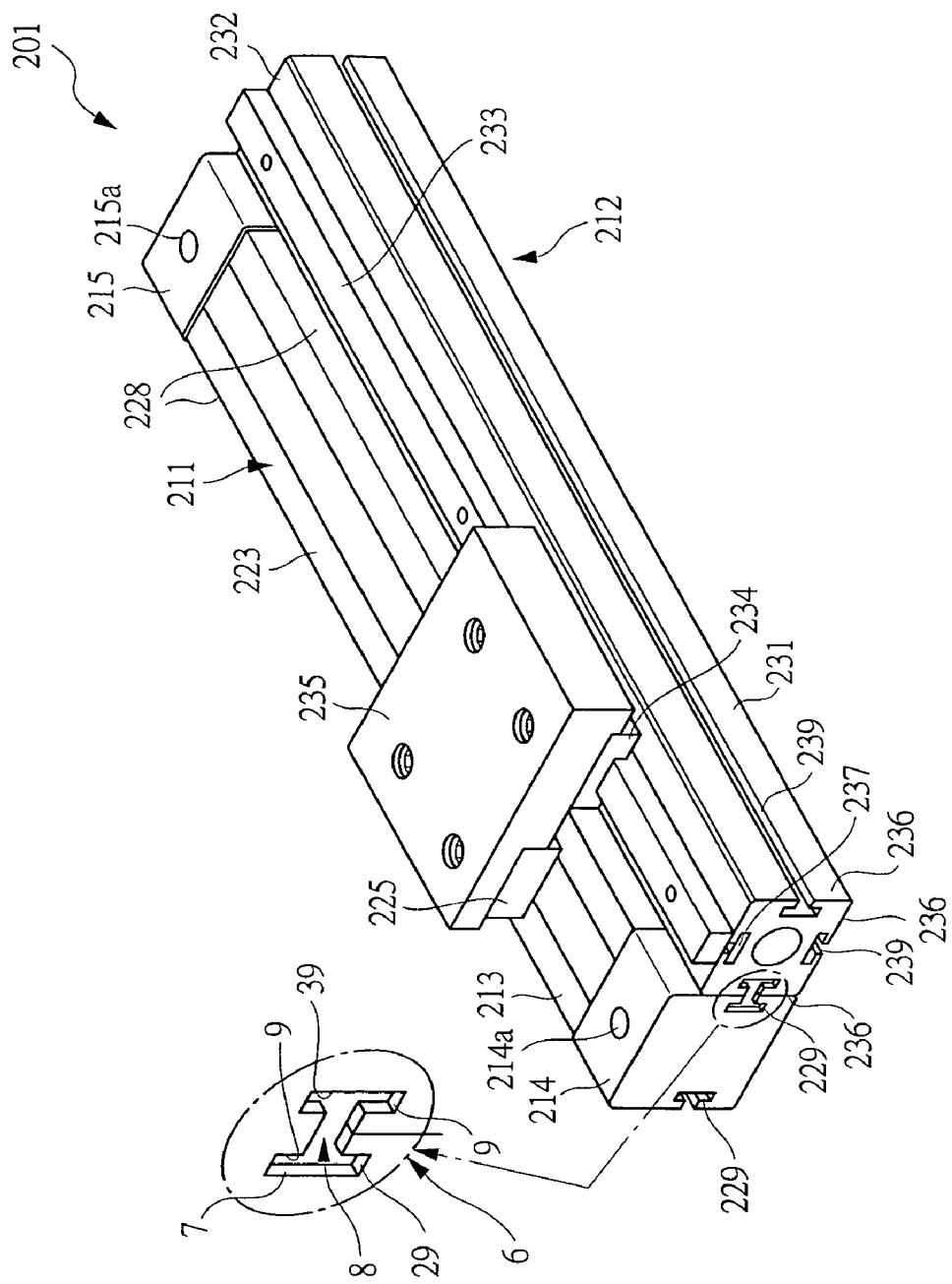
FIG. 27 is a perspective view showing an entirety of a pneumatic cylinder unit employing a rodless cylinder according to a tenth embodiment.
Figure 28:
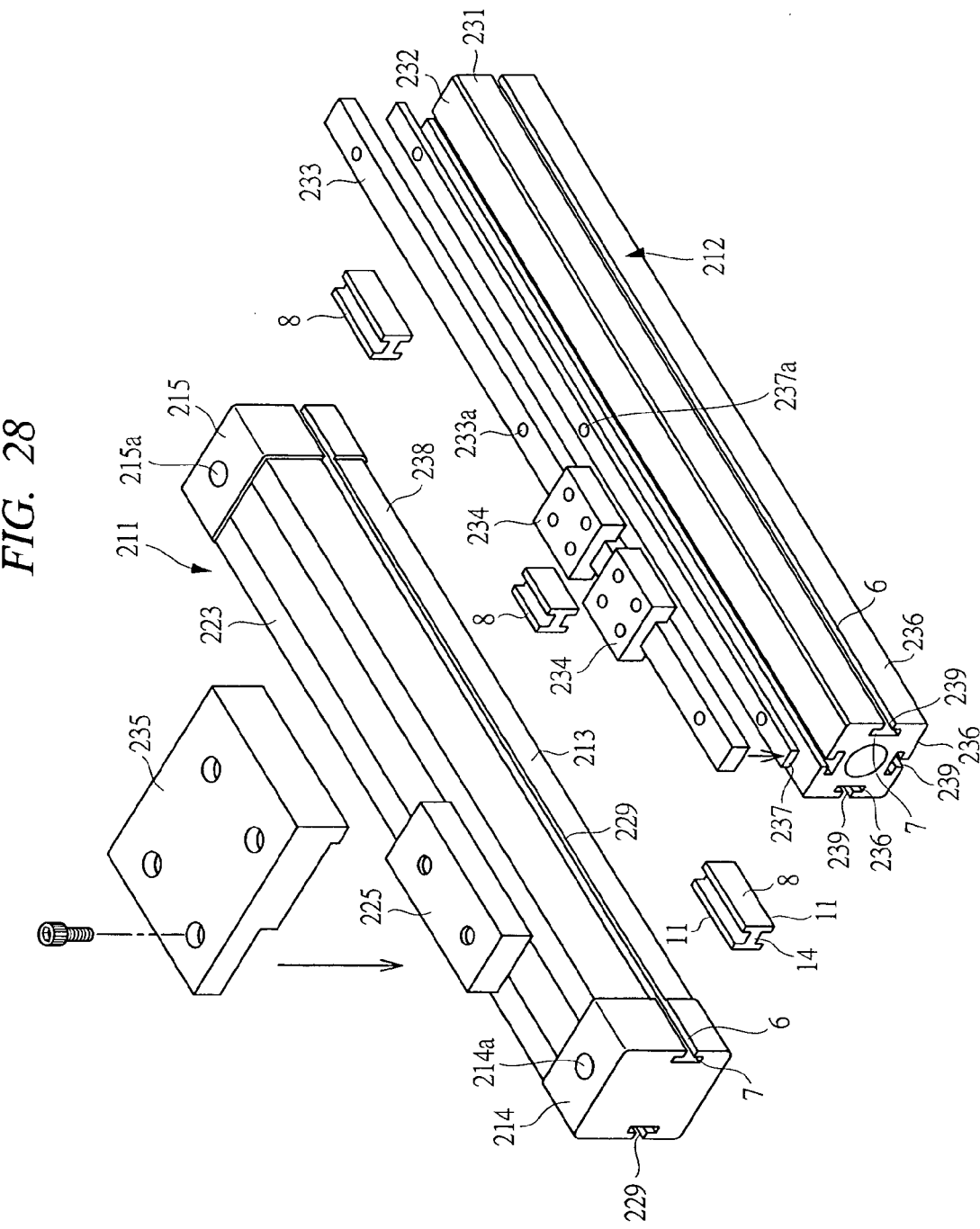
FIG. 28 is an exploded perspective view of FIG. 27.
Figure 29:
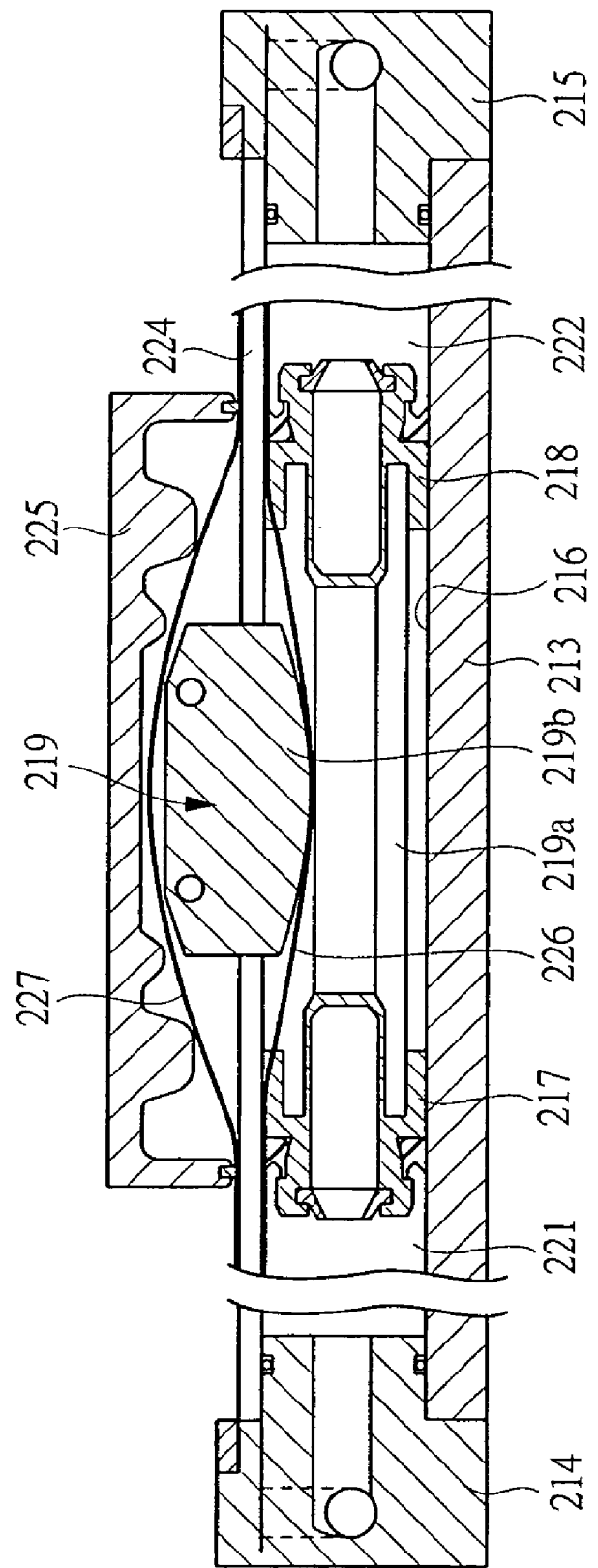
FIG. 29 is a partially-omitted vertical cross-sectional view showing the rodless cylinder shown in FIG. 27.
Figure 30:
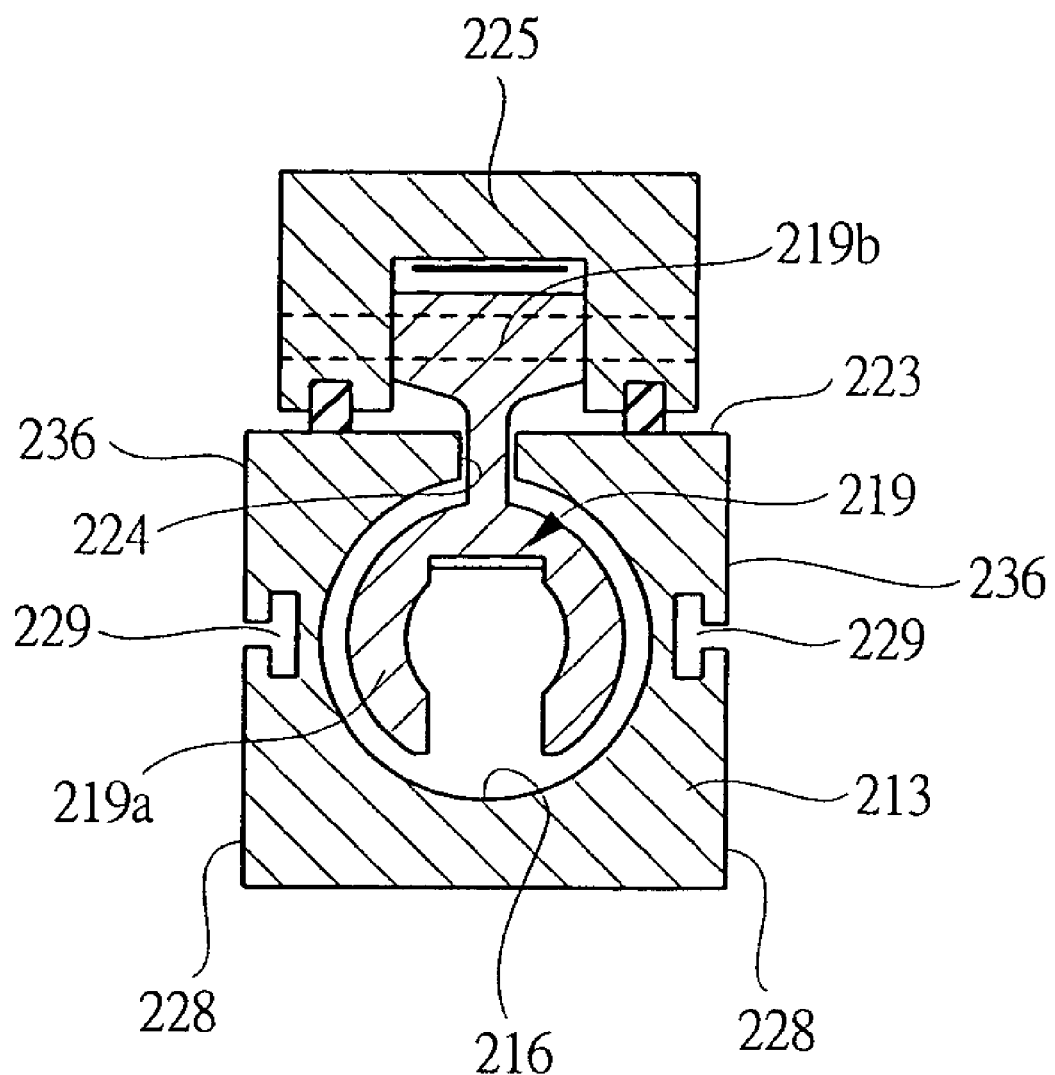
FIG. 30 is a transverse cross-sectional view of FIG. 29.

In addition, hereinafter, an embodiment of the case of applying a rodless cylinder to the pneumatic cylinder to be fastened by the above-described fastening assemblies will be described. FIG. 27 is a perspective view showing a pneumatic cylinder according to a tenth embodiment of the present invention; FIG. 28 is an exploded perspective view of FIG. 27; FIG. 29 is a partially-omitted vertical cross-sectional view showing the rodless cylinder shown in FIGS. 27 and 28; and FIG. 30 is a transverse cross-sectional view of FIG. 29. In these Figures, members and shapes used in common with the pneumatic cylinder unit shown in FIG. 16 are denoted by the same reference numerals.

This pneumatic cylinder unit 201 has a rodless cylinder 211 and a linear guide 212 serving as an attachment connected thereto, i.e., a guide member. The rodless cylinder 211 is a slit type and, as shown in FIG. 29, has a cylinder tube whose outer circumferential shape in transverse section is a quadrangle, i.e., a casing 213, and end covers 214 and 215 are attached to both ends thereof. Two pistons 217 and 218 are attached to a circular-transverse-sectional cylinder chamber 216 formed in the casing 213 so as to reciprocate axially, and these pistons 217 and 218 are connected by a piston yoke 219.

A pneumatic chamber 221 is formed between the end cover 214 and the piston 217. When compressed air is fed from a feed/discharge port 214a communicating with the pneumatic chamber 221 and formed in the end cover 214, the pistons 217 and 218 and the piston yoke 219 are driven rightward in FIG. 29. A feed/discharge port 215a is formed in the end cover 215 so as to communicate with a pneumatic chamber 222 formed between the end cover 215 and the piston 218. When compressed air is fed from the feed/discharge port 215a, the pistons 217 and 218 and the piston yoke 219 are driven leftward.

The piston yoke 219 includes, as shown in FIG. 30, a cylindrical portion 219a in which a notch portion is formed and to both ends of which the pistons 217 and 218 are fixed, and a connecting portion 219b protruding to the outside of the casing through a slit 224 formed in a reciprocation guide surface 223 of the casing 213, wherein a reciprocating body 225 sliding along the reciprocation guide surface 223 of the casing 213 is attached to the connecting portion 219b.

In order to prevent an air leakage from the pneumatic chambers 221 and 222 through the slit 224 when the reciprocating body 225 is driven by the compressed air fed to each of the pneumatic chambers 221 and 222, an inner sealing band 226 is fixed to both ends of the casing 213 and the inner sealing band 226 passes through an interior of the cylindrical portion 219a of the piston yoke 219. Meanwhile, in order to prevent dusts etc. from entering into the interior of the slit 224 from the outside, an outer sealing band 227 is fixed to both ends of the casing 213, and the outer sealing band 227 contacts with an outer surface of the piston yoke 219.

A T-slot 229 having the communication groove 6 and the engagement groove 7 is formed in whole and in a longitudinal direction on each of two mutually-opposing side faces 228 of the casing 213, each of which forms a right angle with respect to the reciprocation guide surface 223, thereby linearly extending along each side face 228.

The linear guide 212 connected to such a slit-type rodless cylinder 211 has a rod-like attachment member 231 whose outer shape in transverse section is quadrate, wherein a guide rail 233 is attached to an attachment surface 232 of the attachment member 231 by unshown screw members penetrating attachment holes formed therein. As shown in FIG. 28, sliders 234 are slidably mounted on the guide rail 233, and the sliders 234 and the reciprocating body 225 are provided with a reciprocating table 235 for connecting them. Therefore, when the pistons 217 and 218 are driven by feeding the compressed air to the pneumatic chambers 221 and 222, the reciprocating table 235 moves in a straight-line direction and its movement is guided by the guide rail 233.

T-shaped slots 239 are formed in whole and in the longitudinal direction on the attachment surface 232 and other three side faces 236 of the attachment member 231, thereby being linearly extending along the attachment surface 232 and the side faces 236, respectively. A rod-like spacer 237 is assembled into the T-shaped slot 239 formed in the attachment surface 232 and screw holes 237a, through which the screw members for attaching the guide rail 233 to the attachment member 231 pass, are formed in the spacer 237. However, the T-shaped slots 239 may be formed only in other three side faces 236 without forming the T-shaped slot 39 in the attachment surface 32. In this case, female screw holes may be directly provided on the attachment surface 232.

The casing 213 of the rodless cylinder 211 and the attachment member 231 of the linear guide 212 are connected, in a state in which the side faces 228 and 236 serving as connection surfaces are opposed to each other, by the insertion fasteners 8 to be embedded in the T-shaped slots 229 and 239 formed in the respective connection surfaces. Three insertion fasteners 8 are embedded in both ends and a longitudinal-directional intermediate position of the T-shaped slots 229 and 239.

The T-shaped slot 229 is formed on each of the two mutually-parallel connection surfaces, i.e., the side faces 228 of the casing 213, so that the linear guide 212 may be connected to any of the above surfaces or faces.

The above-described pneumatic cylinder unit 201 of the present embodiment, which is one obtained by fastening the attachment to the casing 213 of the rodless cylinder 211, has a fastening structure suitable for saving the installation spaces similarly to the above-described first embodiment and is constituted so that rigidity is improved. In addition, since the linear guide 212 is attached as an attachment, the reciprocating body 225 can be moved with high accuracy when the reciprocating body 225 driven by the rodless cylinder 211 is guided by the linear guide 212.

Figure 31:
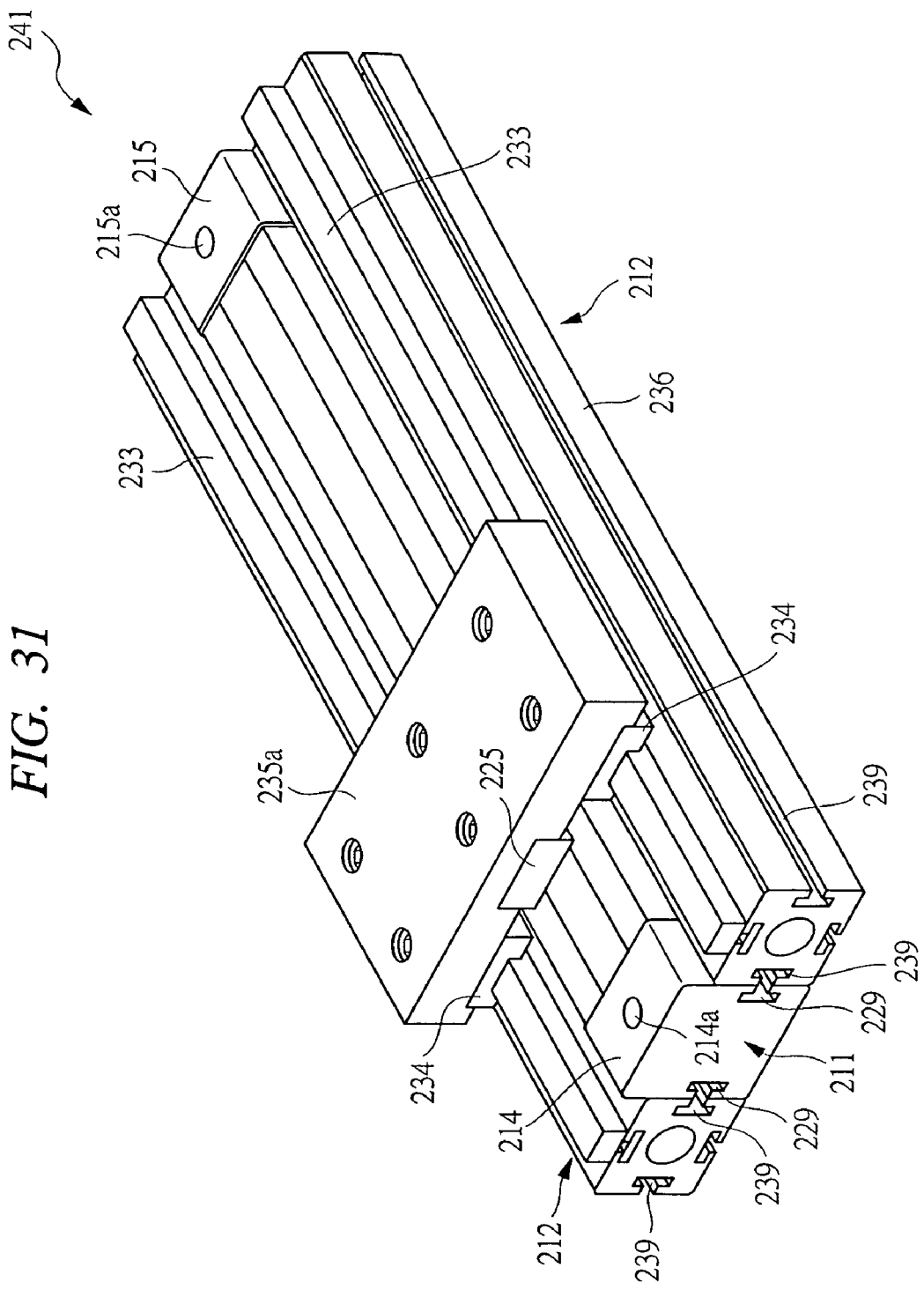
FIG. 31 is a perspective view showing a pneumatic cylinder unit employing a rodless cylinder, which is a modification example of the tenth embodiment.

FIG. 31 is a perspective view showing a modification example of the above-described pneumatic cylinder unit 201 according to the tenth embodiment. In this pneumatic cylinder unit 241, the linear guides 212 are disposed respectively on both sides of one rodless cylinder 211, and they are directly fastened by the insertion fasteners 8, which are embedded in the respective T-shaped slots 229 and 239, similarly to the pneumatic cylinder unit 201 shown in FIG. 27. Therefore, a reciprocating table 235a attached to the reciprocating body 225 can be linearly reciprocated with higher accuracy since guided by two guide rails 233 on both sides. Further, although not illustrated, as another modification example of the pneumatic cylinder unit employing the rodless cylinder, two rodless cylinders 211 in which the two rodless cylinders 211 are directly fastened using the insertion fasteners 8 may be formed.

Next, a pneumatic cylinder to which a rod cover provided with a functional component corresponding to a use application is selectively attachable, and a pneumatic cylinder unit constituted by using the pneumatic cylinder will be described in the following eleventh to fourteenth embodiments.

Figure 32A:
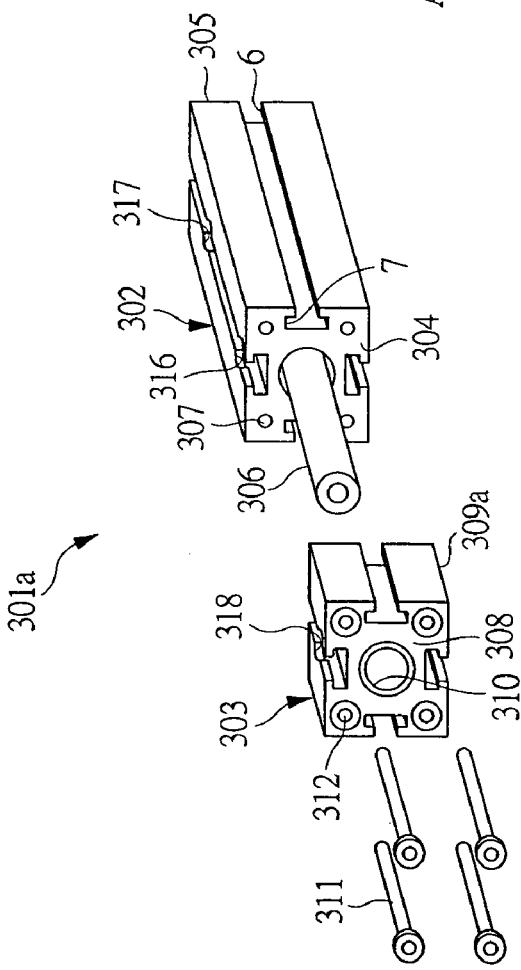
FIG. 32A is a perspective view showing an exploded state before assembling and FIG. 32B is a perspective view showing an assembled state.
Figure 32B:
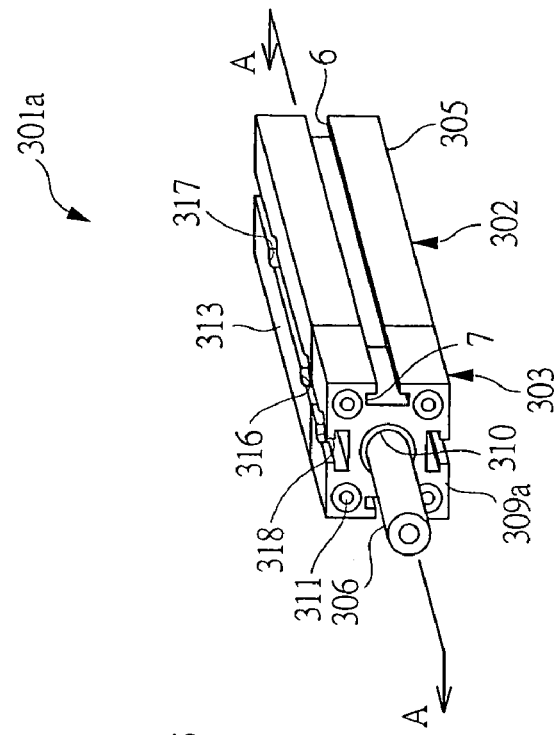
Figure 33:
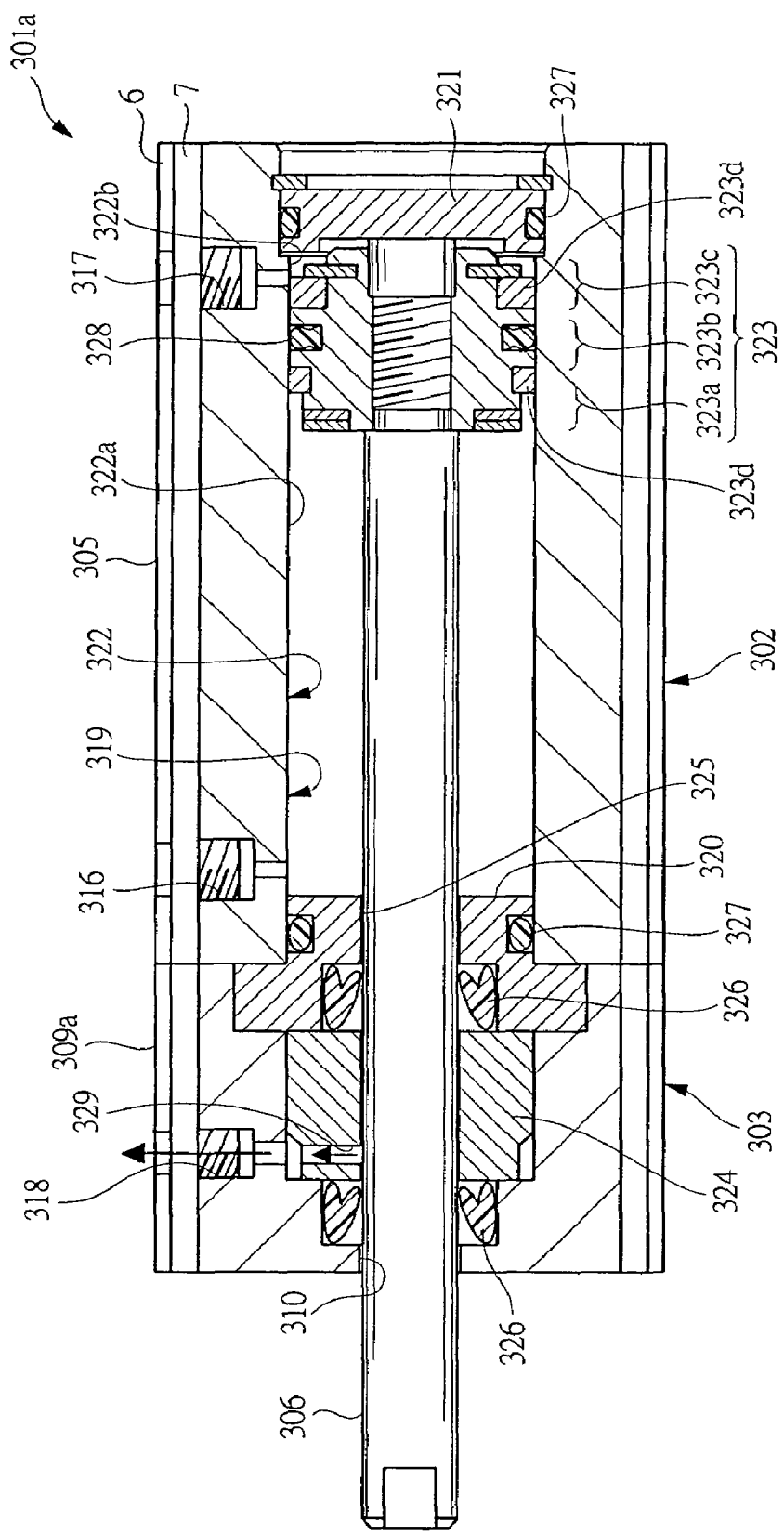
FIG. 33 is an axial-directional cross-sectional view taken along line A-A of the fluid pressure cylinder assembled in FIG. 32B.

FIG. 32 is a perspective view of an entirety of a pneumatic cylinder used in a pneumatic cylinder unit according to an eleventh embodiment of the present invention, wherein FIG. 32A is a perspective view showing an exploded state before assembling and FIG. 32B is a perspective view showing an assembled state. FIG. 33 is an axial-directional cross-sectional view taken along line A-A of the assembled pneumatic cylinder of FIG. 32B.

In FIG. 32A, the pneumatic cylinder 301a in an exploded state before assembling includes a rod cover 303 for discharging dusts and a basic cylinder 302, as individual assembly parts. The basic cylinder 302 has a cylinder tube 305, whose both axial-directional end faces 304 are substantially square and whose entirety has an axially long cuboid shape, and is provided with a piston rod 306 protruding from a center of one of the end faces (end face 304 on a front side of the Figures). In addition, screw holes 307 are formed at four corners of the same end face. Note that although the end faces 304 of the basic cylinder 302 are substantially square, they may be rectangular and the screw holes 307 may be formed not at the four corners of the end face but at two corners on a diagonal line thereof.

The rod cover 303 for discharging dusts has a rod cover 309a formed into a cuboid whose end face 308 has the same shape as that of the cylinder tube 305, and a later-described functional component is provided to an interior thereof. A rod through hole into which the piston rod 306 can be inserted and a bolt through hole 312 into which a bolt 311 can be inserted are formed at a central position of the end face 308 and at each of the four corners or two corners on a diagonal line of the end face 308, respectively, so as to penetrate axially the rod cover 309a.

By inserting the piston rod 306 into the rod through hole 310 and being fastened by four or two bolts 311 in a state of contacting serially with the basic cylinder 302 and the rod cover 309a, the pneumatic cylinder 301a as shown in FIG. 32B is assembled integrally.

In each of four side faces 313 of the pneumatic cylinder 301a integrally assembled thus, the communication groove 6 opened so as to extend linearly through the length in an axial direction and the engagement groove 7 communicating with it are formed. Feed/discharge ports 316 and 317 for feeding and discharging compressed air are formed at two locations overlapping the communication groove 6 in one side face of the cylinder tube 305. A dust outlet 318 serving as an air discharge port is formed at one location overlapping the communication groove 6 on one side face of the rod cover 309a.

As shown in FIG. 33, a piston accommodating hole 319 is formed axially in an interior of the cylinder tube 305. A packing case 320 with which the rod cover 303 for discharging dusts is provided is fitted in an opening on a side on which the piston rod 306 protrudes. A head cover 321 is provided at an end of the cylinder tube 305 located on an opposite side thereof. A space formed between the packing case 320 and the head cover 321 of the piston accommodating hole 319 constitutes a cylinder chamber 322. A piston 323 is attached to an interior of the cylinder chamber 322 so as to be reciprocable axially, and the piston 323 divides the interior of the cylinder chamber 322 into a fluid pressure chamber 322a for retraction and a fluid pressure chamber 322b for extension.

A rod bush 324 employing an oil-impregnated copper alloy as its material is provided in the rod cover 309a, and the piston rod 306 fixed to an end face of the piston 323 penetrates the packing case 320 and the rod bush 324 and slidably protrudes from the rod through hole 310.

The piston 323 is formed into a substantially cylindrical shape, wherein an outer diameter of an extension-side end 323a and a retraction-side end 323c thereof is slightly smaller than that of a slide-intermediate portion 323b therebetween and the slide-intermediate portion 323b is fitted in and slidably contacts with the piston accommodating hole 319 and the extension-side end 323a and the retraction-side end 323c form gaps with an inner circumferential surface of the piston accommodating hole 319. A wear ring 323d is attached to each outer periphery of the extension-side end 323a and the retraction-side end 323c so as to sandwich front and rear parts of the slide-intermediate portion 323b. These wear rings 323d are capable of reserving and maintaining the communication with the fluid pressure chamber 322a for retraction and the fluid pressure chamber 322b for extension without blocking the feed/discharge ports 316 and 317 even when each of the feed/discharge ports 316 and 317 coincides with the axial-directional position thereof in spite of slidably contacting with the piston housing hole 319.

The piston 323 is at an extension-side stroke end position in a state in which its extension-side end face contacts with the retraction-side end face of the packing case 320, and is at a retraction-side stroke end-position in a state in which the retraction-side end face of the piston 323 contacts with the extension-side end face of the head cover 321.

In a state in which the piston 323 is positioned at the extension-side stroke end position, the feed/discharge port 316 communicating with the fluid pressure chamber 322a for retraction is disposed at the same axial-directional position as that of the small-diameter extension-side end face 323a, so that the feed/discharge port 316 is not blocked by the slide-intermediate portion 323b of the piston 323 and the communication with the fluid pressure chamber 322a for retraction can be always ensured.

In a state in which the piston 323 is located at the retraction-side stroke end position, the feed/discharge port 317 communicating with the fluid pressure chamber 322b for extension is disposed at the same axial-directional position as that of the small-diameter retraction-side end face 323c, so that the feed/discharge port 317 is not blocked by the slide-intermediate portion 323b of the piston 323 and the communication with the fluid pressure chamber 322b for extension can be always ensured.

Packings 326 slidably contacting with the piston rods 306 are provided in a through hole 325 of the packing case 320 and a rod through hole 310 of the rod cover 309a. O rings 327 are provided on outer peripheries of the packing case 320 and the head cover 321, and a seal ring 328 is provided on an outer periphery of the slide-intermediate portion 323b of the piston 323.

In the rod bush 324, a dust passage 329 communicating with an outer circumferential surface of the piston rod 306 at the position near the packing 326 which is attached to the rod through hole 310 is formed, and this dust passage 329 communicates with the dust outlet 318 of the rod cover 309a so that these constitute altogether a discharge passage. This discharge passage is a functional component provided in the rod cover 303 for discharging dusts. When an unshown air suction device etc. is connected to the discharge passage, dusts generated by slidable contact between the piston rod 306 and the packing 326 can be discharged through this discharge passage.

As described above, the pneumatic cylinder 301a employed in this embodiment serves as a double-acting pneumatic cylinder for driving an object to be driven by controlling a supply of the compressed air to each of the two feed/discharge ports 316 and 317 so as to reciprocate the piston rod 306 in the straight-line direction, and has a structure suitable for use in a process which requires high cleanliness, such as a semiconductor manufacturing line, since the dusts generated by linear reciprocation of the piston rod 306 are not emitted to an outer surrounding area.

In addition, the rod cover 303 for discharging dusts, which is provided with the discharge passage serving as a functional component, can be attached to and detached from the basic cylinder 302 and arbitrarily replaced, so that even if failure occurs in either the dust discharge function of the rod cover 303 for discharging dusts or the rod drive function of the basic cylinder 302, this structure has high resource efficiency since the one in which the failure occurs has only to be replaced without changing the entirety.

Also in the above structured pneumatic cylinder 301a, the communication grooves 6 and the engagement grooves 7 are formed on the side faces 313, so that by being fastened to the attachment (including cylinder tube) etc. forming the communication grooves 6 and engagement grooves 7 via the insertion fasteners 8, whereby the pneumatic cylinder unit of the present embodiment can be formed. FIG. 34 is a perspective view of an entirety of a pneumatic cylinder unit of the present embodiment formed by fastening two pneumatic cylinders 301a, wherein FIG. 34A is a perspective view showing an exploded state before assembling and FIG. 34B is a perspective view showing an assembled state.

As shown in FIG. 34, in the two pneumatic cylinders 301a, the respective piston rods 306 are arranged parallel in the same direction, the cylinder tubes 305 and the rod covers 309a are made to contact with each other by side faces 313c and fastened via the insertion fasteners 8, and a common tip plate 332 serving as a linking member for mutually connecting both piston rods 306 is attached to the tips of the piston rods 306 thereof, whereby a twin-rod cylinder is constituted. When the pneumatic cylinders 301a are driven by air pressure, this tip plate 332 drives the piston rods 306 in the straight-line direction, thereby driving the object to be driven in the straight-line direction by a tip face of the tip plate 332. In this structure, the two cylinder tubes 305 to be fastened are mutually serving as attachments.

The pneumatic cylinder, which constitutes the above-mentioned pneumatic cylinder unit and to which the rod cover with a functional component is attachably and detachably provided, will include the following examples.

Figure 35A:
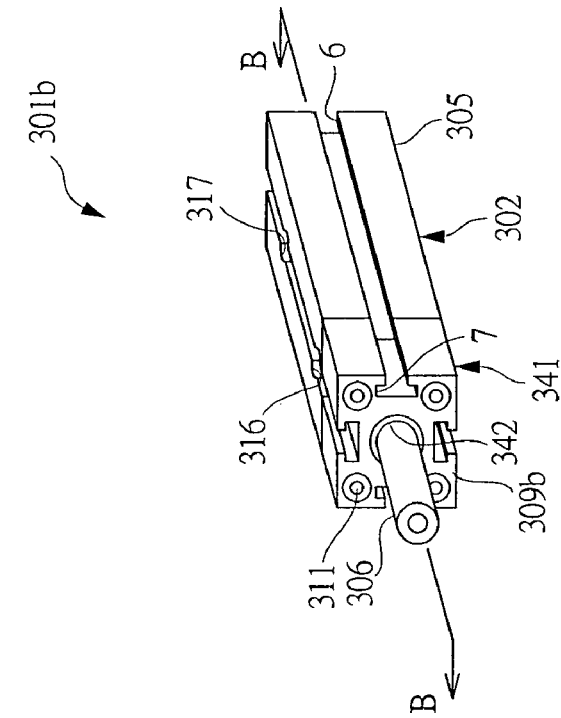
FIG. 35A is a perspective view showing an exploded state before assembling and FIG. 35B is a perspective view showing an assembled state.
Figure 35B:
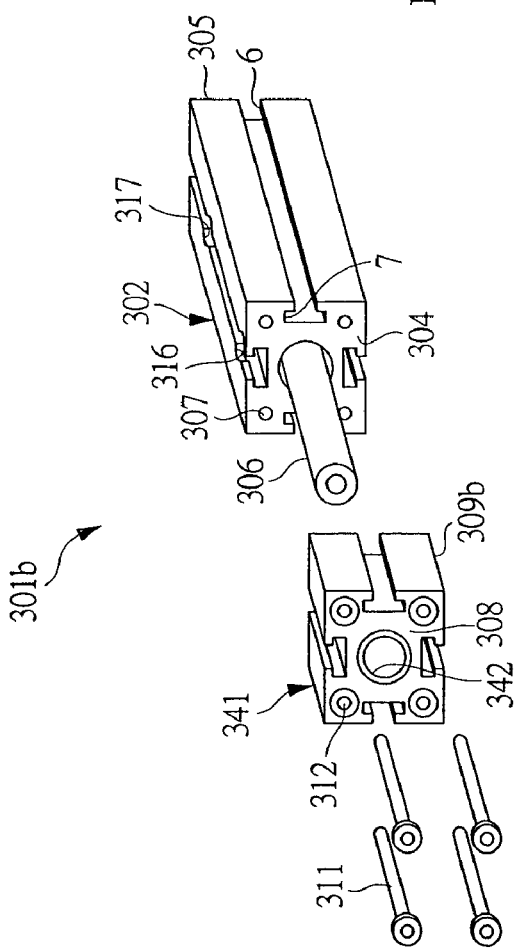
Figure 36:
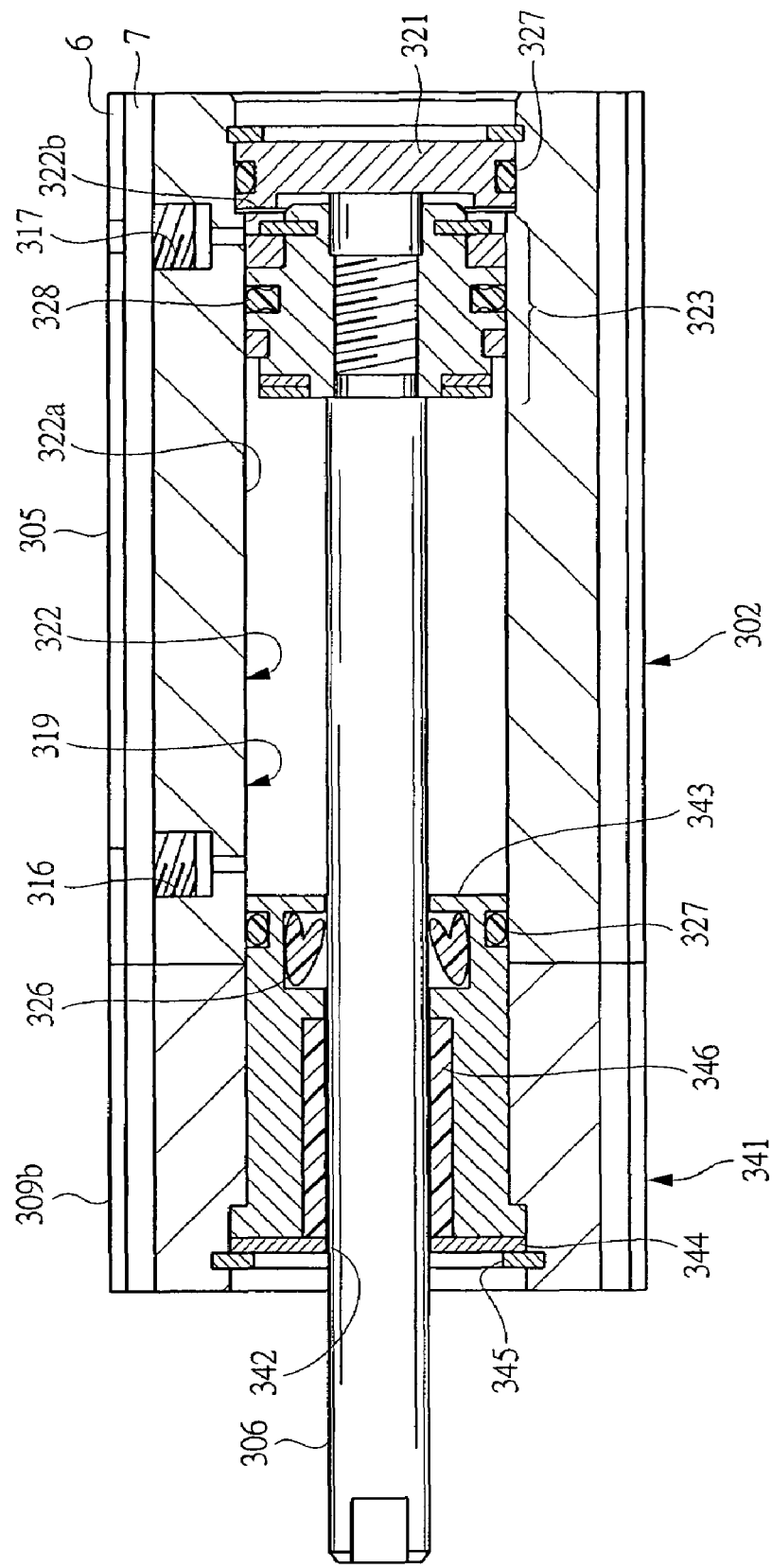
FIG. 36 is an axial-directional cross-sectional view taken along line B-B of the pneumatic cylinder assembled in FIG. 35B.

FIG. 35 is a perspective view of an entirety of a pneumatic cylinder 301b used in a pneumatic cylinder unit according to a twelfth embodiment of the present invention, wherein FIG. 35A is a perspective view showing an exploded state before assembling and FIG. 35B is a perspective view showing an assembled state. FIG. 36 is an axial-directional cross-sectional view taken along line B-B of the pneumatic cylinder 301b assembled in FIG. 35B. In these Figures, members and shapes common with the pneumatic cylinder 301a shown in FIGS. 32 and 33 are denoted by the same reference numerals.

In FIG. 35A, the pneumatic cylinder 301b in an exploded state before assembling has a rod cover 341 for oil-impregnated bearing which is provided with a later-described oil-impregnated bearing in an interior of a rod cover 309b, and the basic cylinder 302, as individual assembly parts. A rod through hole 342 through which the piston rod 306 can penetrate is formed at a center of the end face 308 of the rod cover 309b, so that by inserting the piston rod 306 into the rod through hole 342 and being fastened by four bolts 311 in a state in which the basic cylinder 302 and the rod cover 309b are made to serially contact with each other, the pneumatic cylinder 301b such as that shown in FIG. 35B is assembled integrally.

As shown in FIG. 36, a housing 343 provided with the rod cover 341 for oil-impregnated bearing is fitted in an opening of the piston accommodating hole 319 on a side on which the piston rod 306 protrudes, whereby a space formed between the housing 343 of the piston accommodating hole 319 and the head cover 321 is forming the cylinder chamber 322.

The housing 343 is secured and installed in the interior of the rod cover 309b by a seal holder 344 and a snap ring 345, whereby the piston rod 306 penetrates the housing 343 so as to slidably protrude from the rod cover 309b. The piston 323 is at the extension-side stroke end position in a state in which the extension-side end face thereof contacts with the retraction-side end face of the housing 343.

The oil-impregnated bearing 346 to which lubricating oil is impregnated is provided at a portion contacting with the outer circumferential surface of the piston rod 306 in the interior of the housing 343, and the oil-impregnated bearing 346 constitutes a functional component provided in the rod cover 341 for oil-impregnated bearing. Since this oil-impregnated bearing 346 contacts slidably with and supports the piston rod 306, the piston rod 306 can be smoothly slid while maintaining the airtightness of the cylinder chamber 322.

As described above, the pneumatic cylinder 301b employed in the present embodiment serves as a double-acting pneumatic cylinder, and has a structure in which the piston rod 306 can be driven with high efficiency with respect to supply pressure and supply amount of compressed air.

Figure 37A:
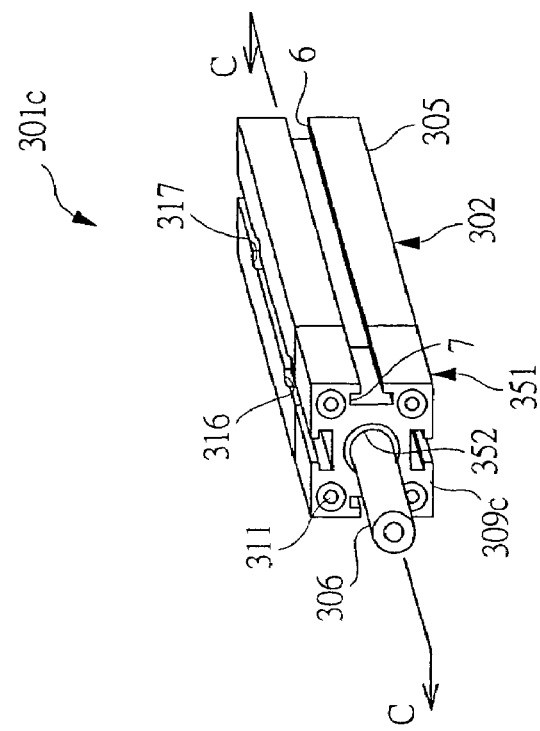
FIG. 37A is a perspective view showing an exploded state before assembling and FIG. 37B is a perspective view showing an assembled state.
Figure 37B:
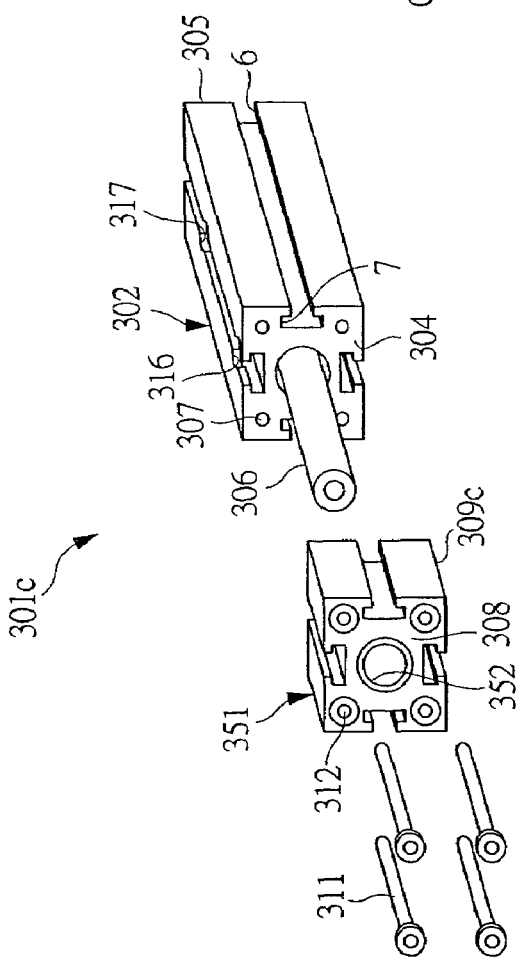
Figure 38:
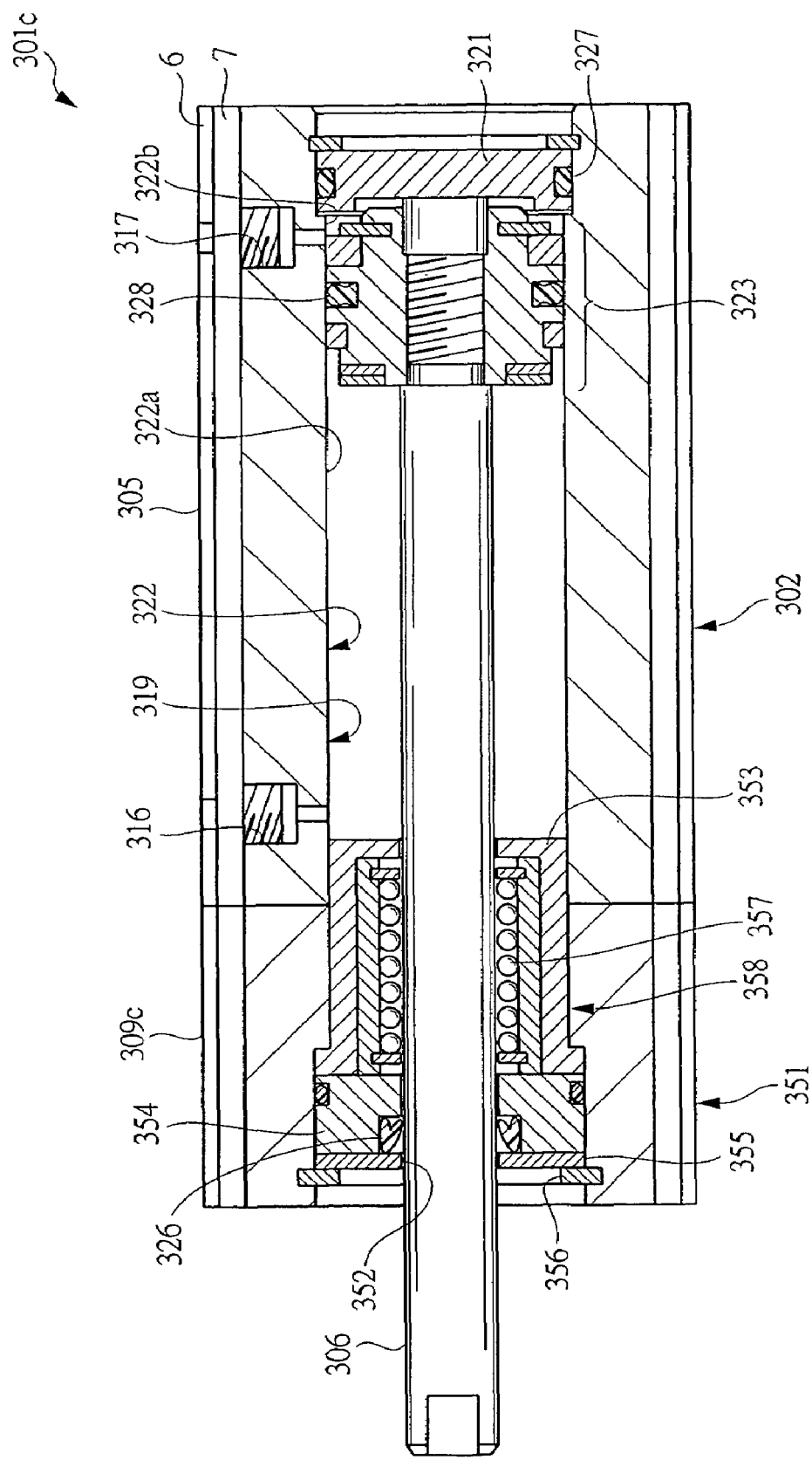
FIG. 38 is an axial-directional cross-sectional view taken along line C-C of the pneumatic cylinder assembled in FIG. 37B.

FIG. 37 is a perspective view of an entirety of a pneumatic cylinder 301c used in a pneumatic cylinder unit according to a thirteenth embodiment of the present invention, wherein FIG. 37A is a perspective view showing an exploded state before assembling and FIG. 37B is a perspective view showing an assembled state. FIG. 38 is an axial-directional cross-sectional view taken along line C-C of the pneumatic cylinder 301c assembled in FIG. 37B. In these Figures, members and shapes common with the pneumatic cylinder 301a shown in FIG. 32 and FIG. 33 are denoted by the same reference numerals.

In FIG. 37A, the pneumatic cylinder 301c which is in an exploded state before assembling has a ball-bearing rod cover 351 provided with a later-described ball bearing in the interior of the rod cover 309c, and the basic cylinder 302, as individual assembly parts. A rod through hole 352, through which the piston rod 306 can penetrate, is formed at a center of the end face 308 of the rod cover 309c, so that by inserting the piston rod 306 into the rod through hole 352 and being fastened by four bolts 311 in a state in which the basic cylinder 302 and the rod cover 309c are made to contact with each other, the pneumatic cylinder 301c such as that shown in FIG. 37B is assembled integrally.

As shown in FIG. 38, a sleeve 353 with which the ball-bearing rod cover 351 is provided is fitted in an opening of the piston housing hole 319 on the extension side of the piston rod 306, whereby a space formed between the sleeve 353 of the piston accommodating hole 319 and the head cover 321 constitutes the cylinder chamber 322.

The sleeve 353 is secured and installed in an interior of the rod cover 309c by a housing 354 for the packing 326, a seal holder 355, and a snap ring 356. The piston rod 306 penetrates the sleeve 353 and the housing 354 so as to slidably protrude from the rod cover 309c. The piston 323 is at the extension-side stroke end position in a state in which the extension-side end face thereof contacts with the retraction-side end face of the sleeve 353.

A large number of balls 357 contacting with the outer circumferential surface of the piston rod 306 for guiding the axial-directional movement of the piston rod 306 are installed in the sleeve 353, and a ball bearing 358 housing these balls 357 forms the sleeve 353, whereby a functional component provided in the ball-bearing rod cover 351 is constituted. Since the ball bearing 358 supports the piston rod 306, the piston rod 306 can be smoothly slid while certainly supported also with respect to a lateral direction.

As described above, the pneumatic cylinder 301c employed in the present embodiment serves as a double-acting pneumatic cylinder, and has a structure in which the piston rod 306 can be smoothly reciprocated while a large lateral load applied thereon is tolerated.

Figure 40A:
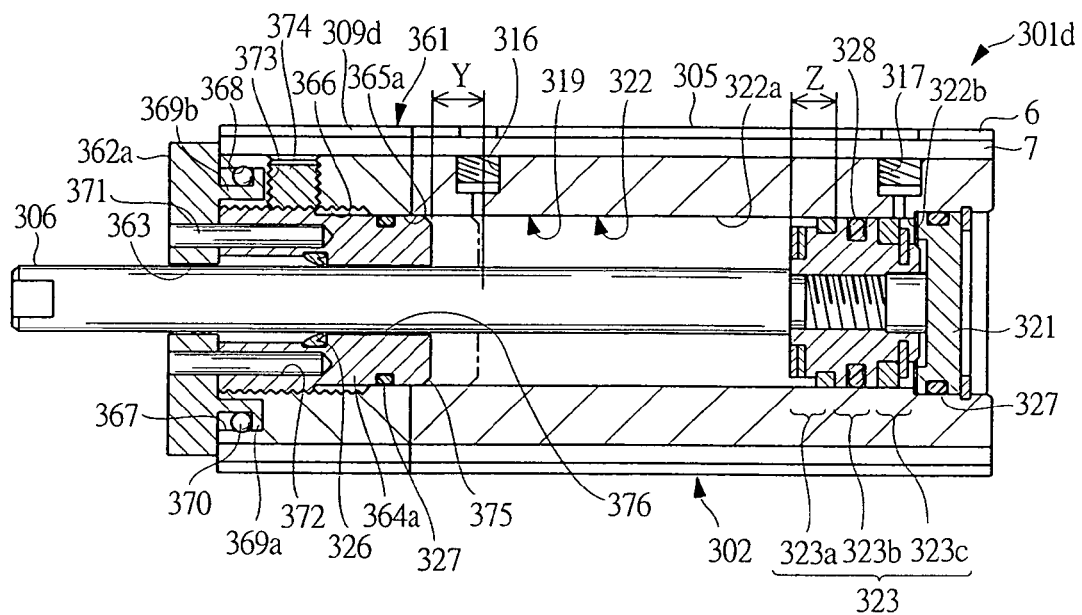
FIG. 40A is a cross-sectional view showing a state in which a movable stopper is at an extendable limit position and FIG. 40B is a cross-sectional view showing a state in which the movable stopper is at a retractable limit position.
Figure 40B:
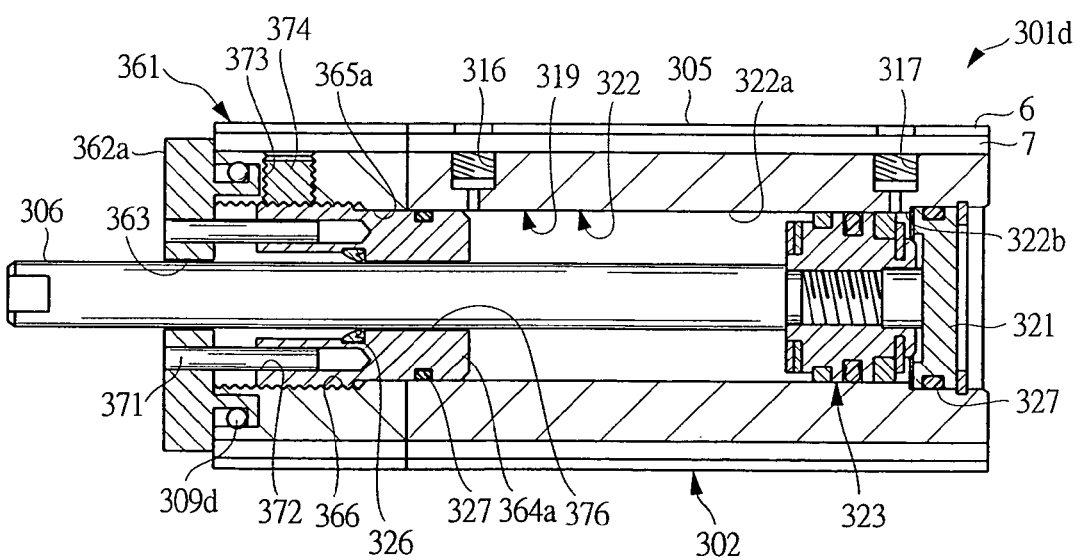

FIG. 39 is a perspective view of an entirety of a pneumatic cylinder 301d used in a pneumatic cylinder unit according to a fourteenth embodiment of the present invention, wherein FIG. 39A is a perspective view showing an exploded state before assembling and FIG. 39B is a perspective view showing an assembled state. FIG. 40 is an axial-directional cross-sectional view taken along line D-D of the pneumatic cylinder 301d assembled in FIG. 39B, wherein FIG. 40A is a cross-sectional view showing a state in which a movable stopper is at an extendable limit position and FIG. 40B is a cross-sectional view showing a state in which the movable stopper is at a retractable limit position. In these Figures, members and shapes common with the pneumatic cylinder 301a shown in FIGS. 32 and 33 are denoted by the same reference numerals.

In FIG. 39A, the pneumatic cylinder 301d, which is in an exploded state before assembling, has a rod cover 361 for stroke adjustment which is provided with a later-described movable stopper in an interior of the rod cover 309d, and the basic cylinder 302, as individual assembly parts. A rotating knob 362a with a shape of a circular plate is attached to a central position of the end face 308 of the rod cover 309d and further a rod through hole 363, through which the piston rod 306 can penetrate, is formed at the central position. By inserting the piston rod 306 into the rod through hole 363 and being fastened by the four bolts 311 in a state in which the basic cylinder 302 and the rod cover 309d are made to serially contact with each other, the pneumatic cylinder 301d such as that shown in FIG. 39B is assembled integrally.

As shown in FIG. 40, the movable stopper 364a, with which the rod cover 361 for stroke adjustment is provided, is fitted in the opening of the piston accommodating hole 319 on a side on which the piston rod 306 protrudes, and a space formed between the movable stopper 364a of the piston accommodating hole 319 and the head cover 321 constitute the cylinder chamber 322.

A stopper accommodating hole 365a, which is concentric with and has the same diameter as that of the piston accommodating hole 319, is formed in the rod cover 309d, and the movable stopper 364a is screwed in a female screw 366 formed on an extension-side inner periphery of the stopper accommodating hole 365. When rotating about its central axis, the movable stopper 364a is screwed so as to axially move forward or backward. The piston 323 is at the extension-side stroke end position in a state in which the extension-side end face thereof contacts with the retraction-side end face of the movable stopper 364a, and is at the retraction side stroke end position in a state in which the retraction-side end face of the piston 323 contacts with the extension-side end face of the head cover 321.

In addition, in the extension-side end face of the rod cover 309d, a retention groove 367 is formed along a circle disposed on an slightly outer circumferential side of and being concentric with the opening of the stopper accommodating hole 365a, and further a securing groove 368 is formed in a side wall on the outer circumferential side.

On the retraction-side end face of the rotating knob 362a, a cylindrical portion 369b whose tip is provided with a flange 369a capable of being fitted in the retention groove 367 is formed. Since a snap ring 370 is fitted into an outer periphery of the cylindrical portion 369b and the cylindrical portion 369b is press-inserted into the retention groove 367, the snap ring 370 is engaged with the securing groove 368 therein and the entirety of the rotating knob 362a is rotatably attached to the rod cover 309d. The piston rod 306 penetrates the movable stopper 364a and the rotating knob 362a and slidably protrudes from the rod cover 309d.

On the retraction-side end face of the rotating knob 362a, rotation transmission pins 371 are provided so as to protrude at two positions around the rod through hole 363 regarded as the center, and rotation transmission holes 372 are formed at two positions corresponding to the extension-side end face of the movable stopper 364a so that the respective rotation transmission pins 371 are slidably inserted therein.

As shown in FIG. 40B, in a state in which the movable stopper 364a is at a fully retracted position, a screw hole 373 is formed at the same axial-directional position as that of the extension-side end thereof on an upper surface of the rod cover 309d in the Figure, and a stopper setscrew 374 is screw-connected to an interior thereof.

Also, in a state in which the movable stopper 364a is at the nearest position to the retraction side, the feed/discharge port 316 communicating with the fluid pressure chamber 322a for retraction is disposed at the same axial-directional position as that of a chamfered portion 375 formed on the outer periphery of the retraction-side end face thereof, whereby even when the movable stopper 364a is at the retractable limit position, the communication from the feed/discharge port 316 to the fluid pressure chamber 322a for retraction is ensured.

An axial-directional length "Z" of the extension-side end 323a of the piston 323 with a small diameter is almost equal to a movable length "Y" (stroke adjustment width) of the movable stopper 364a, so that even when the movable stopper 364a is at the extendable limit position and the piston 323 is at the extension-side stroke end position, the feed/discharge port 316 is not blocked by the slide-intermediate portion 323b of the piston 323 and the communication with the fluid pressure chamber 322a for retraction is always ensured.

In addition, the O ring 327 is provided on the outer periphery of the movable stopper 364a, and the packing 326 is provided in a through hole 376 of the movable stopper 364a. In the above-described structure, the movable stopper 364a contacts with the piston 323 so as to constitute a stopper for restricting the stroke end position of the piston 323, the rotating knob 362a and the rotation transmission pin 371 constitute a position adjustment member for adjusting the position of the movable stopper 364a, and the entire mechanism in the rod cover 361 for stroke adjustment including those described above constitute an assembly for stroke adjustment serving as a functional component.

Next, an operation of the pneumatic cylinder 301d will be explained. First, as shown in FIG. 40A, in a state in which the movable stopper 364a is at the extendable limit position, the extension-side stroke end position of the piston 323 is at the fully extended position and the axial-directional length of the cylinder chamber 322, i.e., the movement stroke of the piston 323 becomes the longest one.

When the rotating knob 4 is rotated in this state, the movable stopper 364a is also rotated via the two rotation transmission pins 371 and, as a result, the movable stopper 364a is screwed so as to move backward. In executing this movement, although the movable stopper 364a simultaneously gets away from the rotating knob 362a, the rotation transmission pins 371 fixed to the rotating knob 362a maintain states of slidably contacting with and being inserted into the rotation transmission holes 372 of the movable stopper 364a. Therefore, the rotating knob 362a keeps transmitting the rotation to the movable stopper 364a. Thus, when the movable stopper 364a moves backward, the axial-directional position of the retraction-side end face thereof, i.e., the extension-side stroke end position of the piston 323 is also retracted and accordingly a movement stroke of the piston 323 also becomes shorter.

As described above, the pneumatic cylinder 301d employed in the present embodiment serves as a double-acting pneumatic cylinder, wherein the extension-side stroke end position and the movement stroke of the piston 323 can be adjusted by rotating the rotating knob 362a and changing the axial-directional position of the movable stopper 364a. In addition, even when the above-described adjustment is being made, the total length of the fixed portions, which includes the rotating knob 362a, the rod cover 309d, and the cylinder tube 305, is not changed and therefore can be installed even in an axially narrow space. Moreover, the movable stopper 364a can be fixed by tightening the stopper setscrew 374.

Figure 41:
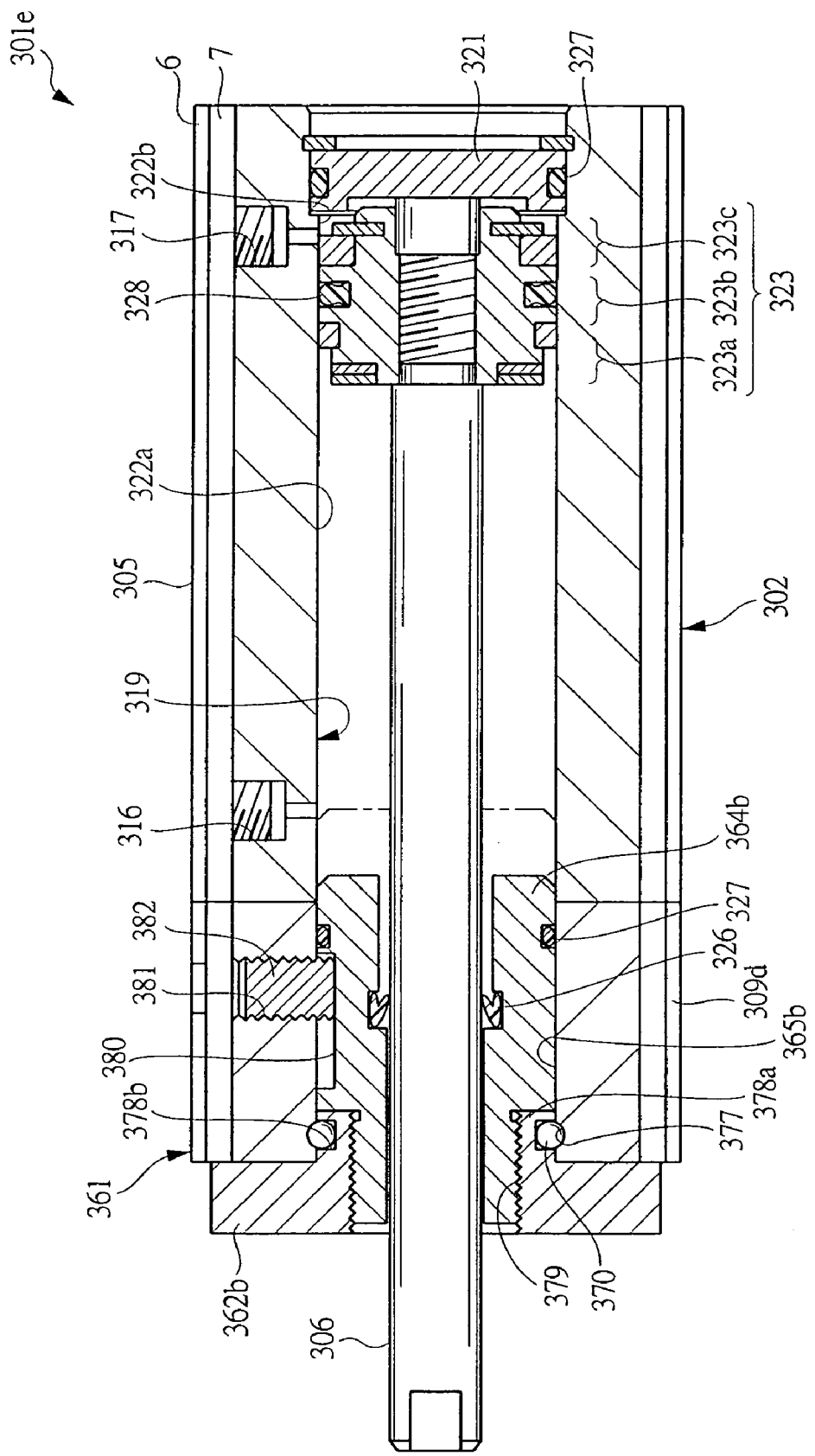
FIG. 41 is an axial-directional cross-sectional view of a modification example of the pneumatic cylinder used in the pneumatic cylinder unit according to the fourteenth embodiment.

FIG. 41 is an axial-directional cross-sectional view of a pneumatic cylinder 301e provided with a modification example of the above-described rod cover for stroke adjustment 361. In FIG. 41, members common with the pneumatic cylinder 301d shown in FIG. 40 are denoted by the same reference numerals.

As shown in FIG. 41, a securing groove 377 is formed in an extension-side inner periphery of a stopper accommodating hole 365b. A cylindrical portion 378a which can be fitted into the stopper accommodating hole 365b is formed in a retraction-side end face of a rotating knob 362b. When the snap ring 370 is fitted into a securing groove 378b formed in the outer periphery of the cylindrical portion 378a and the cylindrical portion 378a is press-inserted into the stopper accommodating hole 365b, the snap ring 370 is engaged with both the securing groove 378b in a side of the cylindrical portion 378a and the securing groove 377 in a side of the stopper accommodating hole 365b, whereby the entirety of the rotating knob 362b is rotatably attached to a rod cover 309e. A female screw 379 with a diameter larger than that of the piston rod 306 is formed in a center of the rotating knob 362b, whereby an extension-side part of the movable stopper 364b is screw-connected to the interior thereof and a retraction-side part thereof is slidably attached to the piston accommodating hole 319 and the stopper accommodating hole 365b. A rotation prevention groove 380 is axially formed on an upper side face of the movable stopper 364b in the Figure, and a stopper setscrew 382 serving as a rotation prevention member is screw-connected to a screw hole 381 formed in an upper end face of the rod cover 309e in the Figure so as to be engaged with the rotation prevention groove 380.

According to this modification example, the movable stopper 364b can move only axially without being rotated about the axis due to the engagement with the stopper setscrew 382 and therefore, by rotating the rotating knob 362b, can be certainly screwed so as to axially move forward or backward.

Therefore, similarly to the pneumatic cylinder 301d shown in FIG. 40, the extension-side stroke end position and the movement stroke of the piston 323 can be adjusted by changing the axial-directional position of the movable stopper 364b. Moreover, the movable stopper 364b can be fixed by tightening the stopper setscrew 382.

As described above in the eleventh to fourteenth embodiments, the pneumatic cylinders 301a to 301e have highly versatile structures capable of corresponding to various applications are provided, since the rod covers 309a to 309e equipped with functional components corresponding to use applications can be selectively attached to the basic cylinder 302 provided in common as a main driving unit. Accordingly, also in terms of designing and manufacturing, the functional components which are prepared in many types depending on the use applications can be provided as component parts which are independent from driving performance of the basic cylinder 302. Therefore, there is obtained also advantage of being capable of avoiding multiplication of types of product cylinders by virtue of such a combination and simplifying production management.

Figure 42:
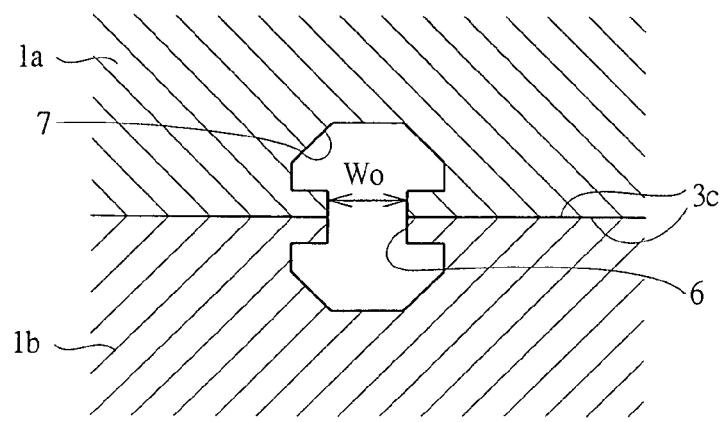
FIG. 42 is a front view of an example of a fastening assembly in which an engagement groove has a polygonal section.
Figure 43:
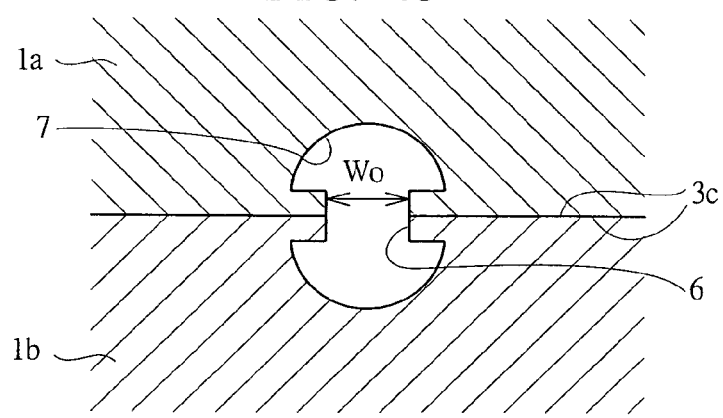
FIG. 43 is a front view of an example of a fastening assembly in which the engagement groove has a half-circular section.
Figure 44:
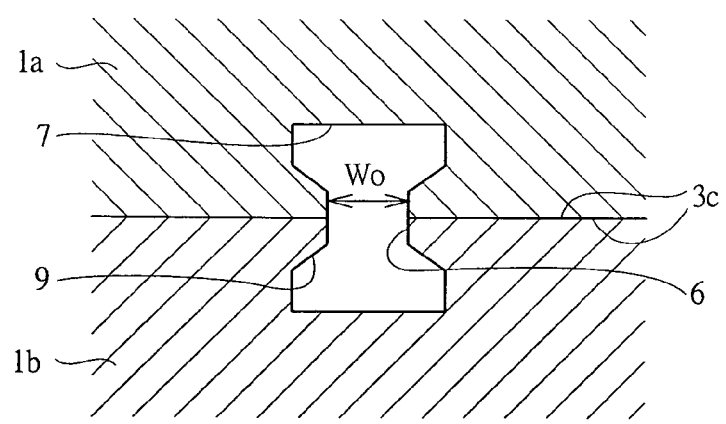
FIG. 44 is a front view of an example of a fastening assembly in which an engagement surface is not parallel to a connection surface.

The present invention is not limited to the above-described embodiments and can be variously modified without departing from the gist thereof. For example, although the above-described embodiments have shown only the case where the sectional shapes of the engagement grooves 7 and the engaging pieces 11 are formed to be rectangular, they are not limited thereto as long as each of them is formed to have a width larger than the opening width "Wo" of the communication groove 6 and the fastening surfaces 15 and the engagement surfaces 9 contact certainly with each other. For example, they may have a polygonal shape as shown in FIG. 42 or a half circular shape as shown in FIG. 43. Moreover, as long as the fastening surfaces 15 and the engagement surfaces 9 can certainly face-contact with each other, these are not limited to that formed to be parallel with the connection surfaces 3c. For example, they may be formed to be inclined with respect to the connection surfaces 3c as shown in FIG. 44.

Alternatively, the communication groove 6 and the engagement groove 7 do not require being formed throughout the entire length in the longitudinal direction of the member to be fastened, and may be cut at a middle position, bent at a middle position, curved in whole, or formed partially at a middle position of the connection surface. In such cases, the intermediate fasteners 71 and 73, as shown in FIGS. 12 and 13, which can be installed at the longitudinal-directional intermediate position, can be suitably utilized.

In addition, although the fasteners in the fastening assemblies of the above-described second to sixth embodiments are formed as metal-fittings which are metal-made molded products, they may be resin-made molded products.

In addition, regarding the guide units serving as attachments, the number thereof to be fastened can be arbitrarily set by being increased or reduced as required, and the tip plates may be also arbitrarily formed and installed according to the number and arrangement of rods.

Further, although the rodless cylinder 211 employed in the pneumatic cylinder unit of the tenth embodiment is a slit type, another type of rodless cylinder such as a magnetic type can be also applied.

Also, although the cases where the functional components comprise the dust discharging channel, the oil-impregnated bearing, the ball bearing, and the assembly for stroke adjustment in the pneumatic cylinders employed in the pneumatic cylinder units of the above-described eleventh to fourteenth embodiments have been described, structures other than these can be applied to the functional components.

In addition, in the above-described embodiments, the pneumatic cylinders employing the compressed air as the working fluid are shown as examples of the fluid pressure cylinder, but the present invention is not limited thereto and, for example, can be applied to that employing a liquid as working fluid such as oil hydraulic.

INDUSTRIAL APPLICABILITY

The fastening assembly and the fastener according to the present invention can be applied to any fastening structure in which the respective surfaces of two members are made to contact with each other and fastened therebetween, and particularly are useful in application to the cases where easy and reliable fastening is required and where space saving is required in a fastened state and to a fastening structure in which arbitrary and easy setting and change of the relative arrangement between the two members and the fastening position are required.

Further, the fluid pressure cylinder unit according to the present invention is particularly useful in the case where space saving is required and, at the same time, an attachment etc. has to be fastened in order to realize enhancement of rigidity and highly accurate reciprocation, such as an actuator employed in a device for conveying electronic components such as semiconductor chips.

The invention claimed is:

1. A fastening assembly comprising:
    two members, on each of which a connection surface is formed and in each of which a communication groove extending and opened in a longitudinal direction along each of said connection surfaces, and an engagement groove provided with an engagement surface parallel with each of said connection surfaces and communicating with said communication groove are formed; and
    a fastener including, in a state in which said communication grooves are opposed to each other and said two members are made to contact through each of said connection surfaces, a first engaging piece having a first fastening surface formed in the longitudinal direction and which is inserted into said engagement groove of one of said members in the longitudinal direction, a second engaging piece having a second fastening surface opposed to said first fastening surface and formed in the longitudinal direction and which is inserted into said engagement groove of the other of said members in the longitudinal direction, and a connecting portion which has a width smaller than those of said engaging pieces and at whose base end each of the engaging pieces are connected,
    wherein when said fastener is embedded in said two members and said engagement surfaces and said fastening surfaces contact with each other, said two members are connected,
    said fastener is an intermediate fastener which is installed at a longitudinal-directional middle position of said communication groove and said engagement groove, and
    said connecting portion is formed into a cylindrical shape with a diameter capable of being inserted into said communication groove, and a width in a state in which at least one of said first engaging piece and said second engaging piece is rotated about a central axis of said connecting portion by a predetermined angle is formed smaller than the width of said communication groove.

2. The fastening assembly according to claim 1, wherein said engagement grooves, said first engaging piece, and said second engaging piece are formed to become wider than said communication groove.

3. A fastener for fastening two members, the fastener comprising:
    a first engaging piece having a first fastening surface formed in a longitudinal direction;
    a second engaging piece having a second fastening surface opposed to said first fastening surface and formed in the longitudinal direction;
    a connecting portion having a width smaller than those of said engaging pieces and connecting the engaging pieces at a base end; and
    a fastening member for elastically deforming tips of said engaging pieces in a direction in which the respective fastening surfaces approach each other,
    wherein said fastening member is a screw member, which penetrates an outer surface parallel to said fastening surfaces and a tip face of said engaging piece, so as to be screw-connected to a screw hole formed in said engaging piece.

4. A fastener for fastening two members, the fastener comprising:
    a first engaging piece having a first fastening surface formed in a longitudinal direction;
    a second engaging piece having a second fastening surface opposed to said first fastening surface and formed in the longitudinal direction;
    a connecting portion having a width smaller than those of said engaging pieces and connecting the engaging pieces at a base end;
    a fastening member for elastically deforming tips of said engaging pieces in a direction in which the respective fastening surfaces approach each other; and
    a cut-in portion formed for dividing respective tips of said engaging pieces into an outer elastically deformable portion and an inner elastically deformable portion,
    wherein said fastening portion is a screw member to be screwed into a screw hole formed between said outer elastically deformable portion and said inner elastically deformable portion.

5. A fastener for fastening two members, the fastener comprising:
    a first engaging piece having a first fastening surface formed in a longitudinal direction;
    a second engaging piece having a second fastening surface opposed to said first fastening surface and formed in the longitudinal direction;
    a connecting portion having a width smaller than those of said engaging pieces and connecting the engaging pieces at a base end; and
    a fastening member for elastically deforming tips of said engaging pieces in a direction in which the respective fastening surfaces approach each other, wherein said fastening member is formed by a fastening piece in which an abutting face is formed abutting on an abutting face formed to be inclined at each tip of said engaging pieces, and by a screw member to be screw-connected to a screw hole formed in said fastening piece, through a through hole formed in said connecting portion.

6. A fastener for connecting two members, each having connection surfaces, communication grooves extending and opened in a longitudinal direction along each of said connection surfaces, and engagement grooves provided with an engagement surface parallel with each of the connection surfaces and communicating with the communication groove, the fastener comprising:
a first engaging piece integrally provided with a first connecting portion, and having a first fastening surface wider than said first connecting portion and formed in a longitudinal direction and a first abutting face formed so as to be inclined at a tip thereof;
a second engaging piece integrally provided with a second connecting portion, and having a second fastening surface wider than said second connecting portion and shifted in the longitudinal direction from and mutually opposed to said first fastening surface and formed in the longitudinal direction, and the second engaging piece having a second abutting face formed at a tip thereof and abutting on said first abutting face; and
a screw member screw-connected to a screw hole formed in one of said engaging pieces, penetrating a through hole formed in the other of said engaging piece with a diameter larger than that of said screw hole, and making said engaging pieces move along said abutting faces in a direction in which the respective fastening surfaces approach each other.

7. A fluid pressure cylinder unit for driving an object to be driven in a straight-line direction by a fluid pressure, the unit comprising:
a cylinder tube, in which a communication groove extending and opened in a longitudinal direction along a connection surface and an engagement groove provided with an engagement surface parallel to said connection surface and communicating with said communication groove are formed and a piston provided with a piston rod is accommodated axially and reciprocably;
an attachment, in which a communication groove extending and opened in the longitudinal direction along a connection surface contacting with said connection surface and an engagement groove provided with an engagement surface parallel to said connection surface and communicating with said communication groove are formed; and
a fastener including, in a state in which said communication grooves are opposed to each other and said cylinder tube and said attachment are made to contact by said connection surfaces, a first engaging piece having a first fastening surface formed in the longitudinal direction and which is inserted into said engagement groove of said cylinder tube in the longitudinal direction, a second engaging piece having a second fastening surface opposed to said first fastening surface and formed in the longitudinal direction and which is inserted into said engagement groove of said attachment in the longitudinal direction, and a connecting portion having a width smaller than those of said engaging pieces and connecting each of said engaging pieces at a base end thereof,
wherein when said fastener is embedded in said cylinder tube and said attachment and said engagement surfaces and said fastening surfaces contact with one another, said cylinder tube and said attachment are connected.

8. The fluid pressure cylinder unit according to claim 7, further comprising a fastening member for elastically deforming tips of said engaging pieces in a direction in which the respective fastening surfaces approach each other.

9. The fluid pressure cylinder unit according to claim 7, wherein a transverse section of said cylinder tube is a quadrangle, and respective mutually adjacent outer circumferential surfaces thereof serve as connection surfaces in which said communication grooves are formed.

10. The fluid pressure cylinder unit according to claim 7, wherein said attachment is a cylinder tube similar to said cylinder tube.

11. The fluid pressure cylinder unit according to claim 10, wherein a piston rod of said cylinder tube and a piston rod of said attachment are connected by a connecting member.

12. The fluid pressure cylinder unit according to claim 10, wherein said two cylinder tubes are fastened so that respective piston rods thereof are directed in reveres to each other, and a chuck member is attached to each of said piston rods.

13. The fluid pressure cylinder unit according to claim 10, wherein a guide rail is attached to each of said cylinder tubes, and a slide table attached to a sliding body which slides along said guide rail is connected to each of said piston rods.

14. The fluid pressure cylinder unit according to claim 7, wherein said attachment serves as a guide block for axially accommodating a guide rod reciprocably, and said guide rod and said piston rod are connected by a connecting member.

15. The fluid pressure cylinder unit according to claim 14, wherein a plurality of said cylinder tubes and a plurality of said attachments are fastened, respectively.

16. A fluid pressure cylinder unit employing a rodless cylinder for driving a reciprocating body in a straight-line direction by fluid pressure, the unit comprising:
a casing of the rodless cylinder in which a piston reciprocated in the straight-line direction by the fluid pressure and connected to said reciprocating body is incorporated and in which a communication groove extending and opened along a connection surface formed at an outer periphery and an engagement groove communicating with said communication groove and being wider than said communication groove are formed;
an attachment in which a communication groove extending and opened along a connection surface contacting with said connection surface and an engagement groove communicating with said communication groove and being wider than said communication groove are formed; and
a fastener including, in a state in which the respective communication grooves are opposed to each other and said casing and said attachment are made to contact respectively by said connection surfaces, a first engaging piece inserted into said engagement groove of said casing in a longitudinal direction, a second engaging piece inserted into said engagement groove of said attachment in the longitudinal direction, and a connecting portion for connecting those engaging pieces, the fastener being embedded in said casing and said attachment.

17. The fluid pressure cylinder unit according to claim 16, further comprising a fastening member provided to said fastener for applying a fastening force to said casing and said attachment via said fastener.

18. The fluid pressure cylinder unit according to claim 16, further comprising:
a piston yoke protruding, through a slit formed in a reciprocation guide surface formed in said casing, outwardly from said reciprocation guide surface and connecting said piston and said reciprocating body;

an inner sealing band fixed to both ends of said casing and sealing said slit from inside; and an outer sealing band fixed to the both ends of said casing and sealing said slit from outside.

19. The fluid pressure cylinder unit according to claim 16, wherein said attachment is a guide member provided with a rail for guiding said table.

20. The fluid pressure cylinder unit according to claim 19, wherein guide members are fastened on both sides of the casing of said rodless cylinder.

21. The fluid pressure cylinder unit according to claim 16, wherein said attachment is a casing of a rodless cylinder of the same type as that of said casing.

22. A fluid pressure cylinder unit for driving an object to be driven in a straight-line direction by fluid pressure, the unit comprising:

a cylinder tube for accommodating a piston;

a piston rod attached to said piston and protruding from an end face of said cylinder tube to outside; and a rod cover mounted attachably and detachably on the end face of said cylinder tube, wherein said rod cover is provided with a functional component exhibiting a functional effect in accordance with a use application, and wherein a first communication groove extending and opened in a longitudinal direction along a first connection surface and a first engagement groove provided with a first engagement surface parallel to said first connection surface and communicating with said first communication groove are formed in said cylinder tube, and wherein there are included:

an attachment in which a second communication groove extending and opened in the longitudinal direction along a second connection surface contacting with said first connection surface and a second engagement groove having a second engagement surface parallel to said second connection surface and communicating with said second communication groove are formed; and, a fastener provided with, in a state in which the respective communication grooves are opposed to each other and said cylinder tube and said attachment are made to contact respectively by said connection surfaces, a first engaging piece having a first fastening surface formed in the longitudinal direction and which is inserted into said first engagement groove of said cylinder tube in the longitudinal direction, a second engaging piece having a second fastening surface opposed to said first fastening surface and formed in the longitudinal direction and which is inserted into said second engagement groove of said attachment in the longitudinal direction, and a connecting portion having a width smaller than those of said engaging pieces and connecting the respective engaging pieces at a base end thereof, and when said fastener is embedded in said cylinder tube and said attachment and said engagement surfaces and said fastening surfaces are made to contact with one another, said cylinder tube and said attachment are connected.

23. The fluid pressure cylinder unit according to claim 22, wherein said functional component is a discharge passage, which is connected to a discharge port formed in said rod cover and discharges, to the outside, a dust generated by linear reciprocation of said piston in said fluid pressure cylinder unit.

24. The fluid pressure cylinder unit according to claim 22, wherein said functional component is an oil-impregnated bearing incorporated in said rod cover and contacting with an outer circumferential surface of said piston rod.

25. The fluid pressure cylinder unit according to claim 22, wherein said functional component is a linear ball bearing incorporated in said rod cover, contacting with a outer circumferential surface of said piston rod, and having a ball for guiding axial-directional movement of said piston rod.

26. The fluid pressure cylinder unit according to claim 22, wherein said functional component is an assembly for stroke adjustment, which has a stopper incorporated in said rod cover and restricting a stroke end position of said piston by contacting with said piston and a position adjustment member attached to said rod cover and adjusting a position of said stopper.

27. The fluid pressure cylinder unit according to claim 22, wherein any of a rod cover for discharging dusts provided with said discharging passage, a rod cover for oil-impregnated bearing provided with said oil-impregnated bearing, a linear-ball-bearing rod cover provided with said linear ball bearing, and a rod cover for stroke adjustment provided with said assembly for stroke adjustment can be attached to the end face of said cylinder tube.

28. The fluid pressure cylinder unit according to claim 22, further comprising a fastening member provided to said fastener and applying a fastening force to said cylinder tube and said attachment via said fastener.

* * * * *

UNITED STATES PATENT AND TRADEMARK OFFICE
CERTIFICATE OF CORRECTION

PATENT NO. : 7,444,922 B2
APPLICATION NO. : 10/543457
DATED : November 4, 2008
INVENTOR(S) : Harashima et al.

It is certified that error appears in the above-identified patent and that said Letters Patent is hereby corrected as shown below:

Title Page, Item (56) Ref. Cited:
Under FOREIGN PATENT DOCUMENTS on the front page please delete "DE 0837253 A1" and replace with "EP 0837253 A1"

Signed and Sealed this

Thirtieth Day of December, 2008

JON W. DUDAS
*Director of the United States Patent and Trademark Office*